(12) United States Patent  
Zhang et al.

(10) Patent No.: US 12,528,123 B2  
(45) Date of Patent: Jan. 20, 2026

(54) METHOD OF FABRICATING A MAGNETIC DEFORMABLE MACHINE AND DEFORMABLE 3D MAGNETIC MACHINE

(71) Applicant: MAX-PLANCK-GESELLSCHAFT ZUR FÖRDERUNG DER WISSENSCHAFTEN E.V., Munich (DE)

(72) Inventors: Jiachen Zhang, Toronto (CA); Ziyu Ren, Vahingen (DE); Wenqi Hu, Leonberg (DE); Metin Sitti, Stuttgart (DE)

(73) Assignee: Max-Planck-Gesellschaft zur Förderung der Wissenschaften e. V., Munich (DE)

( * ) Notice: Subject to any disclaimer, the term of this patent is extended or adjusted under 35 U.S.C. 154(b) by 349 days.

(21) Appl. No.: 18/020,161

(22) PCT Filed: Aug. 4, 2021

(86) PCT No.: PCT/EP2021/071716  
§ 371 (c)(1),  
(2) Date: Feb. 7, 2023

(87) PCT Pub. No.: WO2022/033933  
PCT Pub. Date: Feb. 17, 2022

(65) Prior Publication Data  
US 2023/0286048 A1    Sep. 14, 2023

(30) Foreign Application Priority Data  
Aug. 10, 2020 (EP) .................... 20190336

(51) Int. Cl.  
*B22F 10/10* (2021.01)  
*B22F 10/80* (2021.01)  
(Continued)

(52) U.S. Cl.  
CPC .............. *B22F 10/10* (2021.01); *B22F 10/80* (2021.01); *F16B 1/00* (2013.01); *F16B 11/006* (2013.01);  
(Continued)

(58) Field of Classification Search  
CPC ...... B22F 10/10; B22F 10/80; B22F 2999/00; F16B 1/00; F16B 11/006; F16B 2200/83;  
(Continued)

(56) References Cited

U.S. PATENT DOCUMENTS

2015/0259099 A1    9/2015  Segal  
2018/0354120 A1    12/2018 Diller et al.

OTHER PUBLICATIONS

Kim et al. ("Printing ferromagnetic domains for untethered fast-transforming soft materials" Nature vol. 558, Jun. 2018). (Year: 2018).*

(Continued)

*Primary Examiner* — Ricardo D Morales  
(74) *Attorney, Agent, or Firm* — Dickinson Wright PLLC

(57) ABSTRACT

The present invention relates to a method of fabricating magnetic deformable machines comprising heterogeneous voxels, as well as to a deformable 3D magnetic machine, the magnetic machine having a size of less than 10000 mm, the magnetic machine comprising a plurality of voxels of which at least some are magnetic, with at least some of the voxels having a Young's modulus of less than 500 MPa, the plurality of voxels being bonded one to another with a bonding agent, wherein each voxel is of predefined shape, size, has predefined magnetic properties and predefined material properties.

26 Claims, 27 Drawing Sheets

(51) Int. Cl.
  *B33Y 50/00*   (2015.01)
  *B33Y 80/00*   (2015.01)
  *F16B 1/00*    (2006.01)
  *F16B 11/00*   (2006.01)
(52) U.S. Cl.
  CPC ........... *B22F 2999/00* (2013.01); *B33Y 50/00* (2014.12); *B33Y 80/00* (2014.12); *C22C 2202/02* (2013.01); *F16B 2200/83* (2023.08)
(58) Field of Classification Search
  CPC ..... B33Y 50/00; B33Y 80/00; C22C 2202/02; Y02P 10/25
  See application file for complete search history.

(56) References Cited

OTHER PUBLICATIONS

International Search Report corresponding to International Application No. PCT/EP2021/071716 dated Nov. 11, 2021, 18 pages.
Extended European Search Report corresponding to European Application No. 20190336.6 dated Feb. 1, 2021, 11 pages.
Macrae Montgomery S et al: "Magneto-Mechanical Metamaterials with widely Tunable Mechanical Properties and Acoustic Bandgaps", Arxiv.Org, Cornell University Library, 201 Olin Library Cornell University Ithaca, NY 14853, [Online], Jun. 23, 2020, XP081708284, Retrieved from the internet: URL: https://arxiv.org/abs/2006.12721v1, 20 pages.
Shuai Wu et al: "Evolutionary Algorithm-Guided Voxel-Encoding Printing of Functional Hard-Magnetic Soft Active Materials", Advanced Intelligent Systems, vol. 2, No. 8, May 26, 2020, p. 2000060, XP055766056, ISSN: 2640-4567, DOI: 10.1002/aisy.202000060, 10 pages.
Kim Yoonho et al: "Printing ferromagnetic domains for untethered fast-transforming soft materials", Nature, Macmillan Journals Ltd, London, vol. 558, No. 7709, Jun. 13, 2018, pp. 274-279, XP036524881, ISSN: 0028-0836, DOI: 10.1038/S41586-018-0185-0, 18 pages.
Office Action dated Nov. 23, 2023 corresponding to European Application No. 20190336.6, 8 pages.
Wu Shuai et al:"Symmetry-Breaking Actuation Mechanism for Soft Robotics and Active Metamaterials", Applied Materials Interfaces, vol. 11, No. 44, Nov. 6, 2019 (Nov. 6, 2019), pp. 41649-41658, XP093103381, ISSN: 1944-8244, DOI: 10.1021/acsami.9b13840.

* cited by examiner

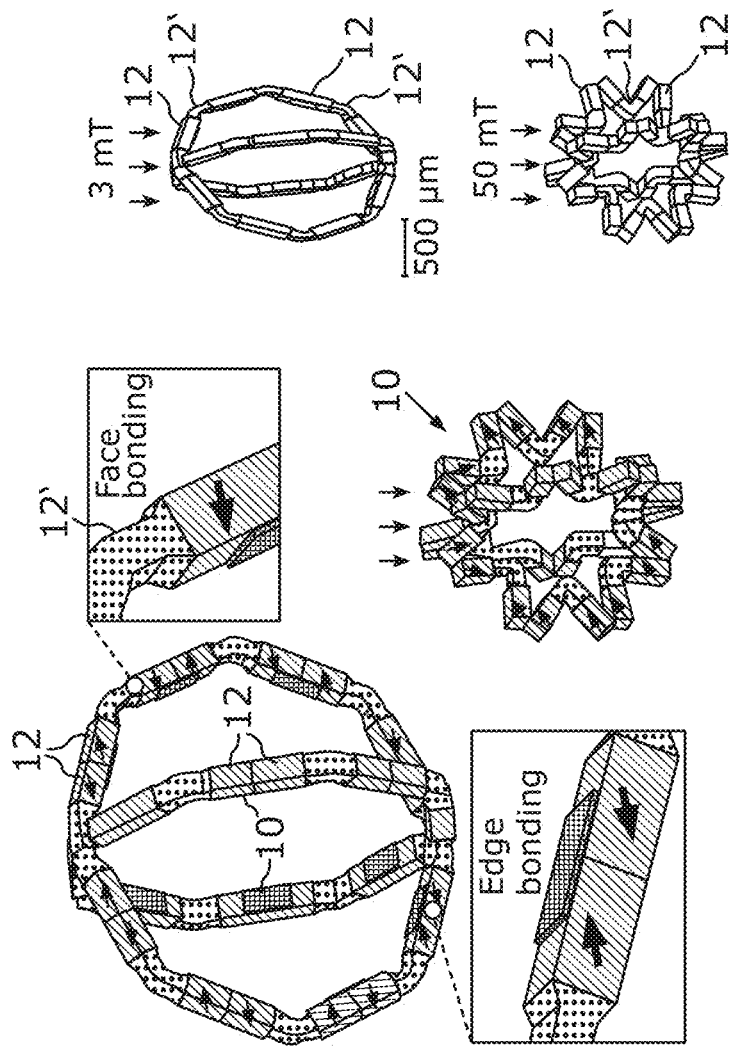
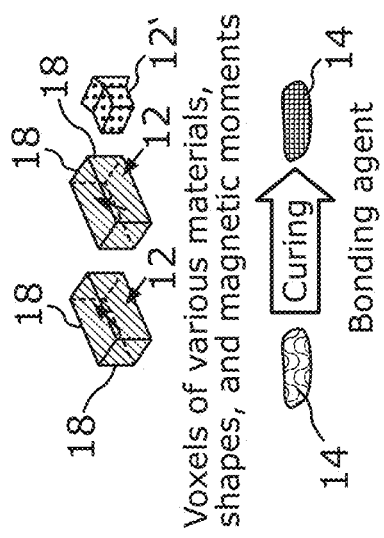
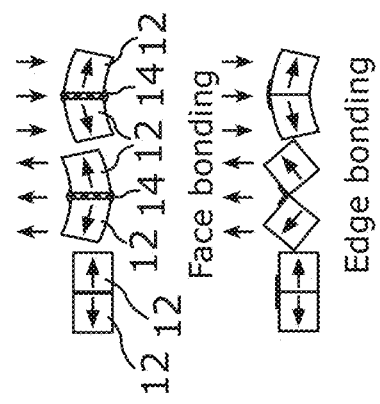
Fig. 1a  Fig. 1b  Fig. 1c  Fig. 1d

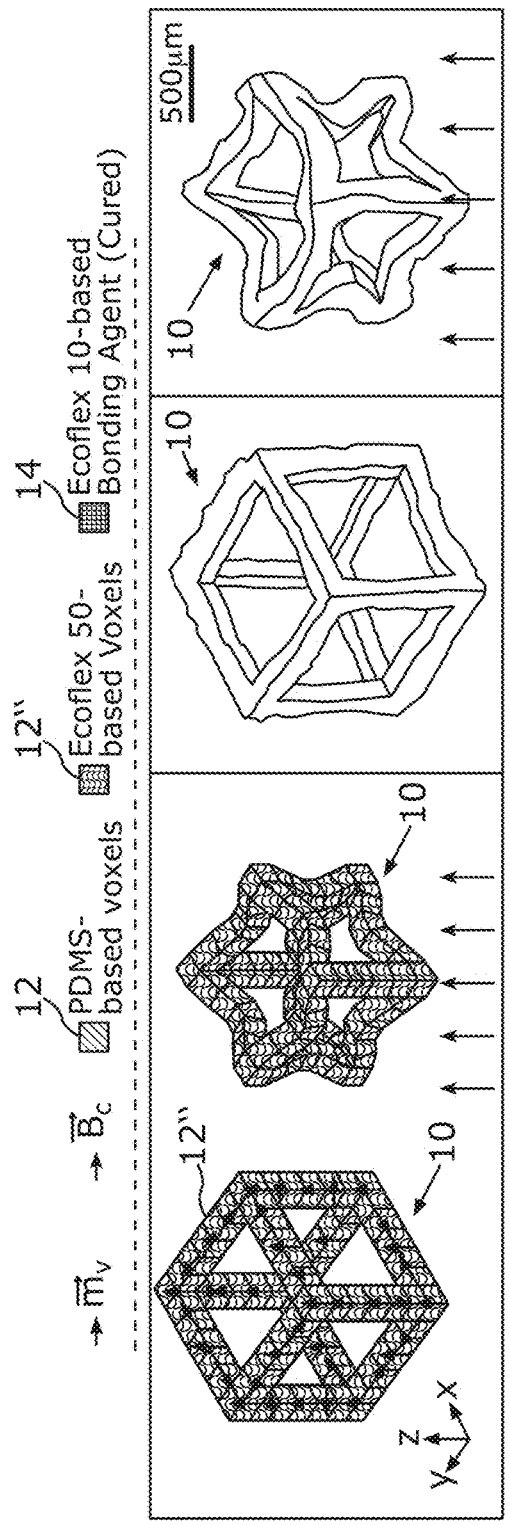
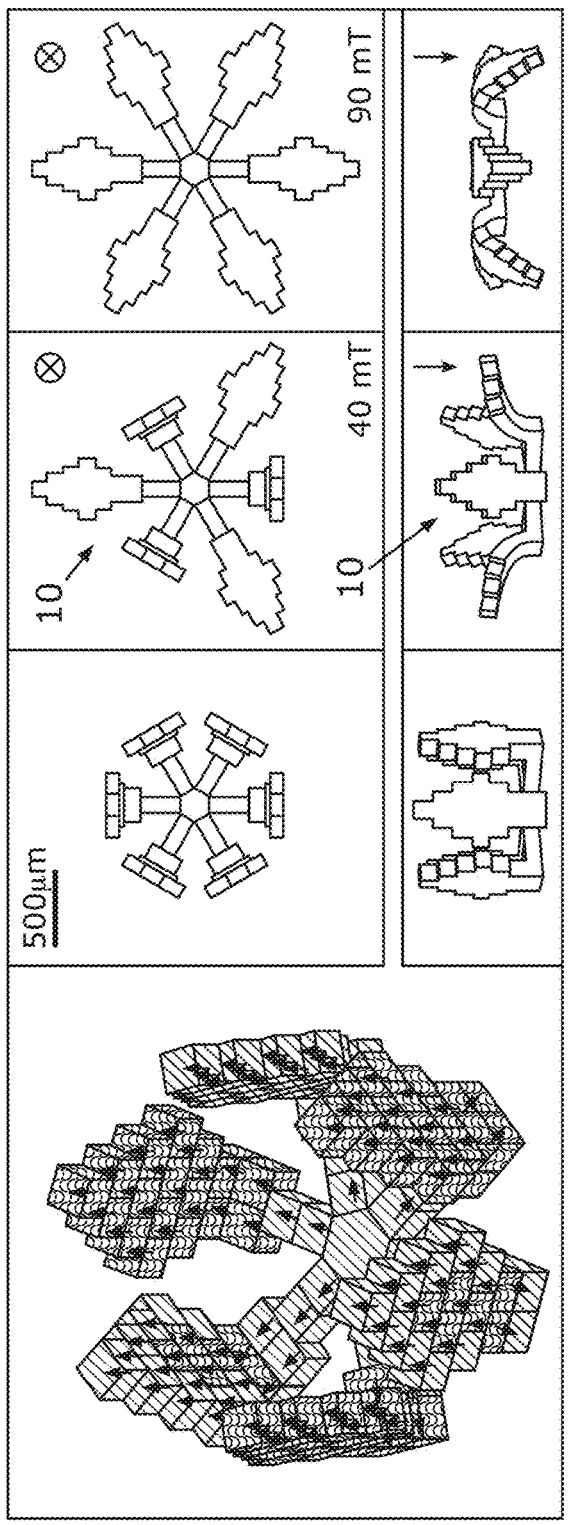
Fig. 3a
Fig. 3b

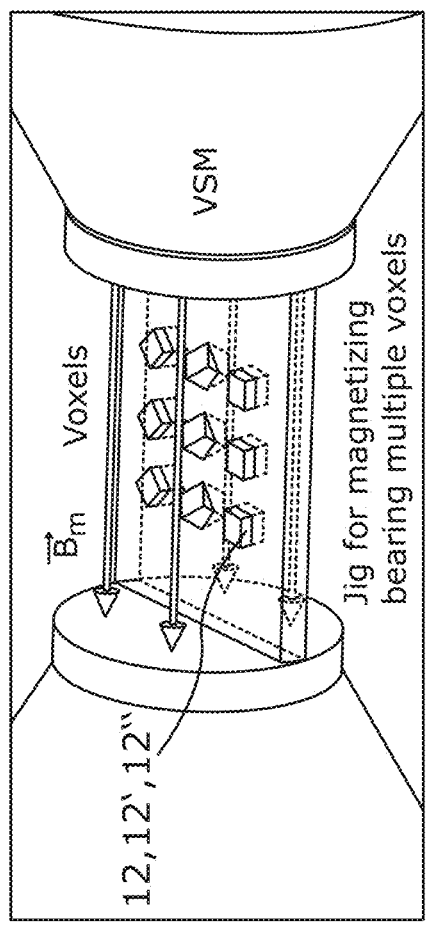
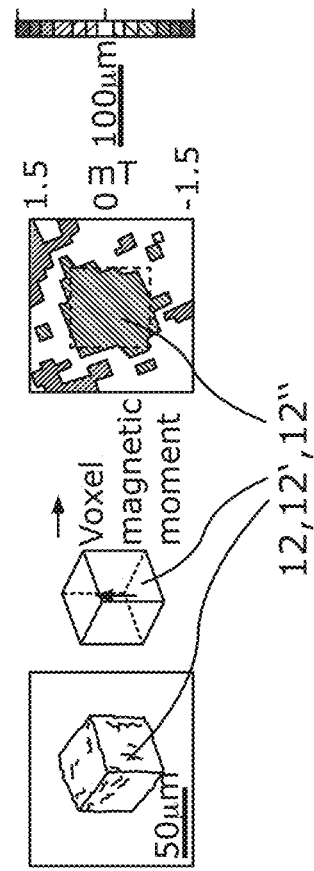
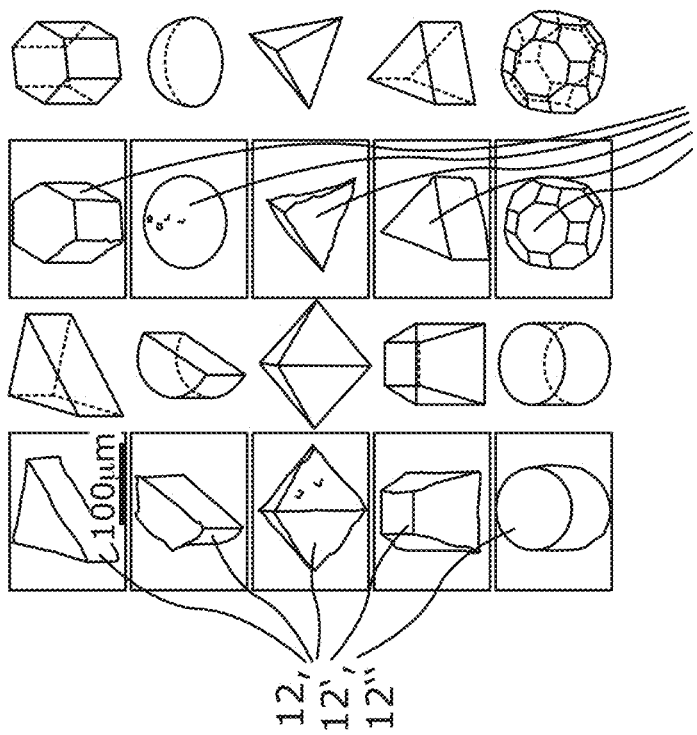
Fig.5d
Fig.5e
Fig.5c

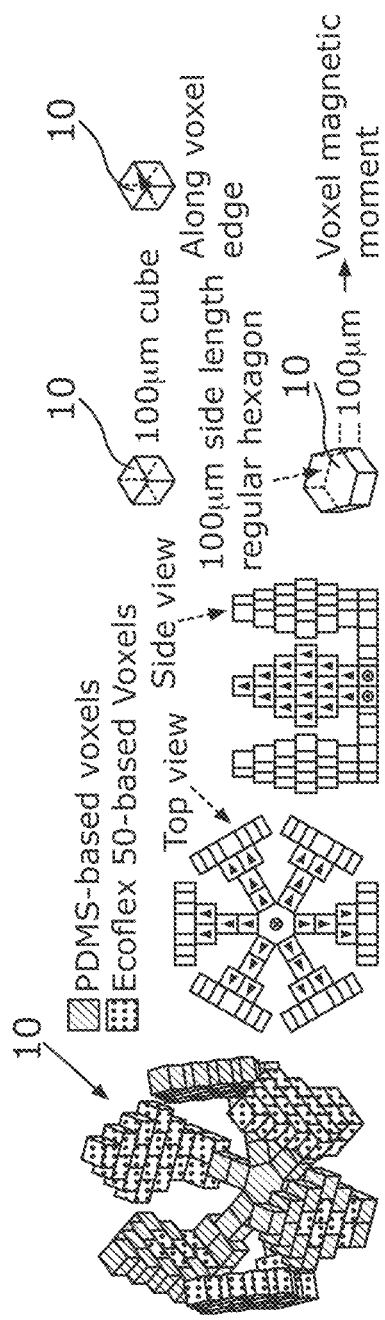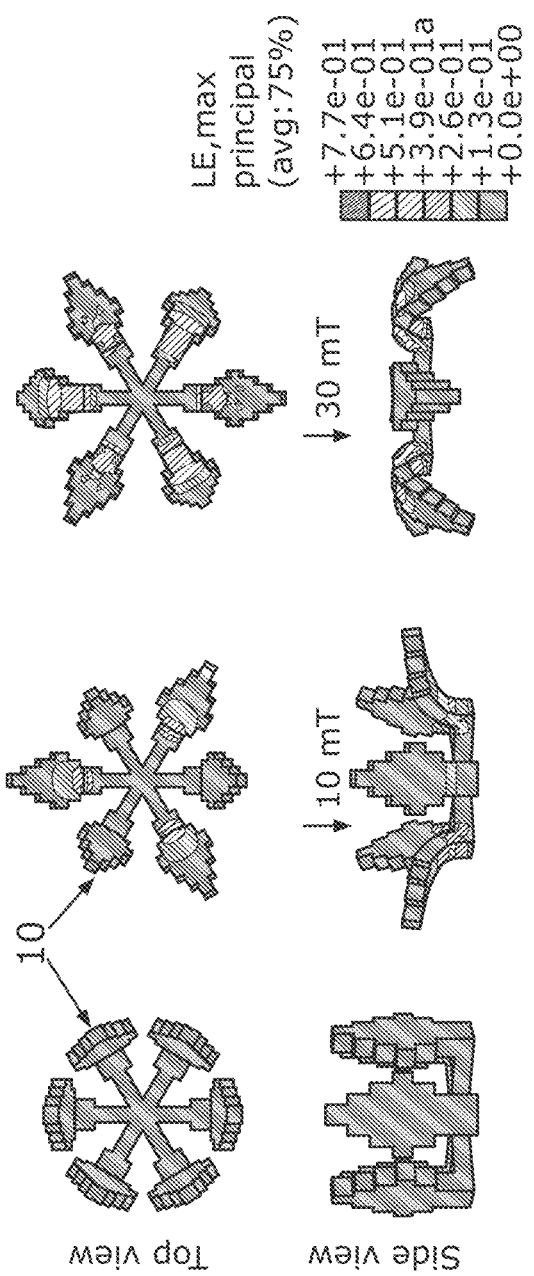
Fig. 8a
Fig. 8b

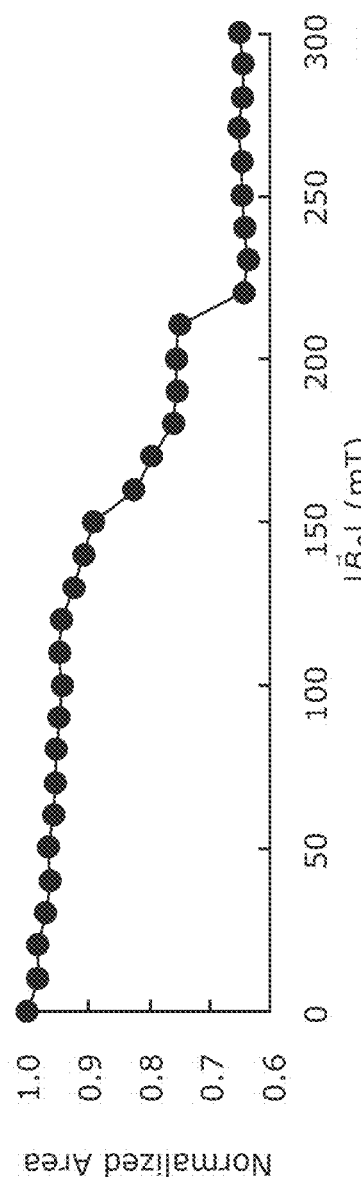
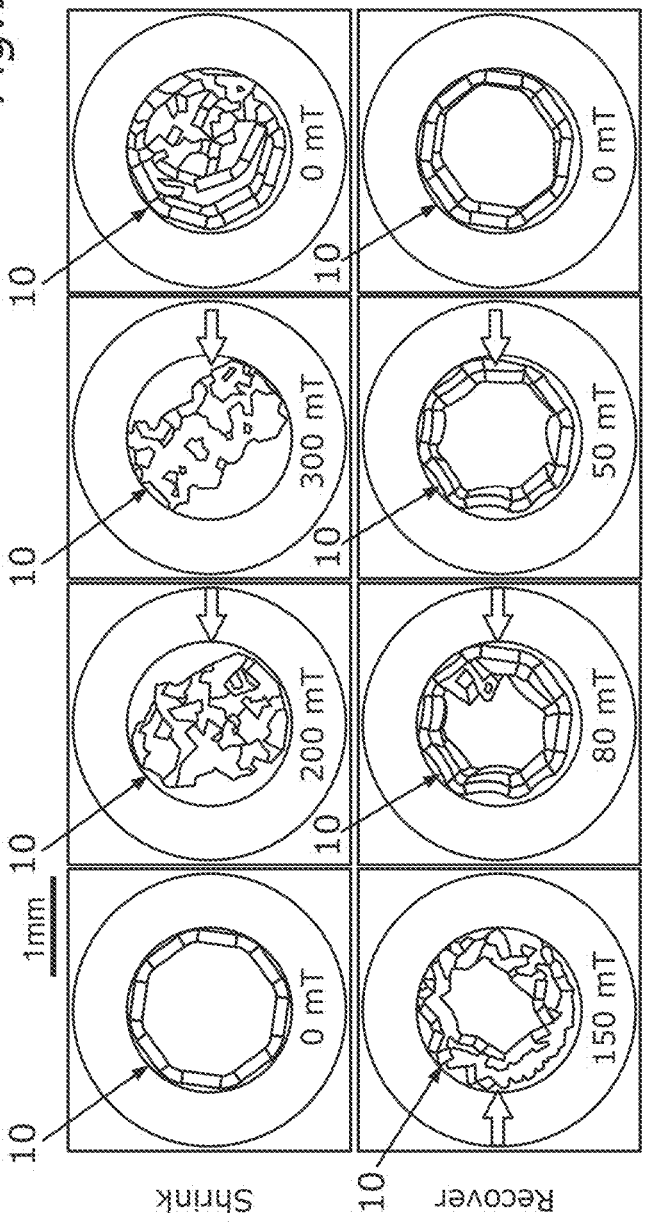
Fig.11a
Fig.11b

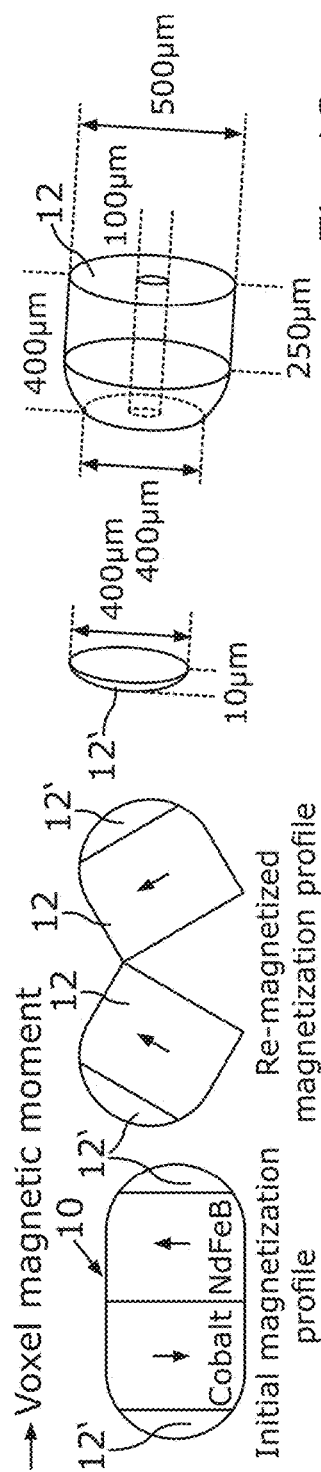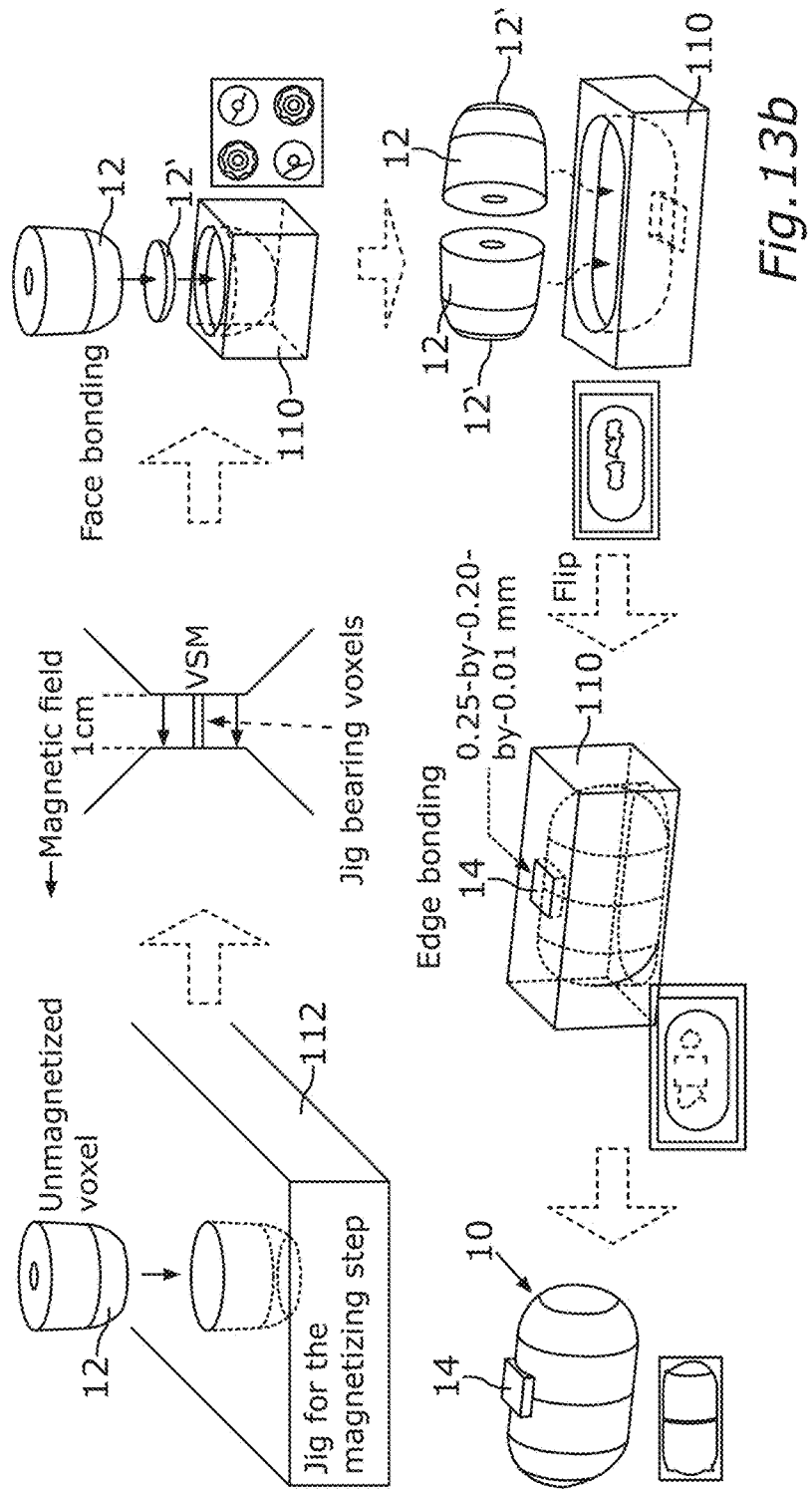
Fig. 13a
Fig. 13b

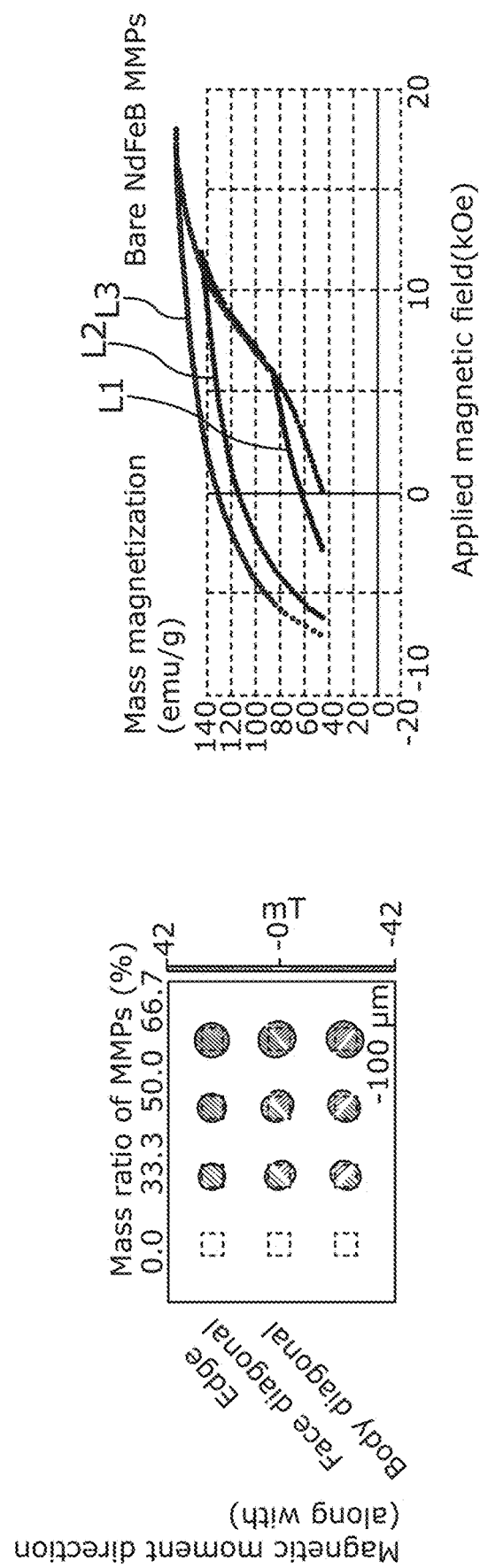

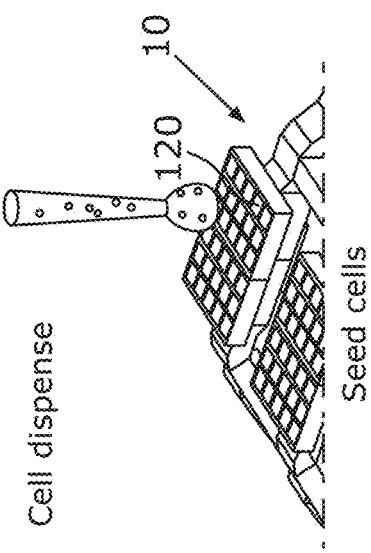
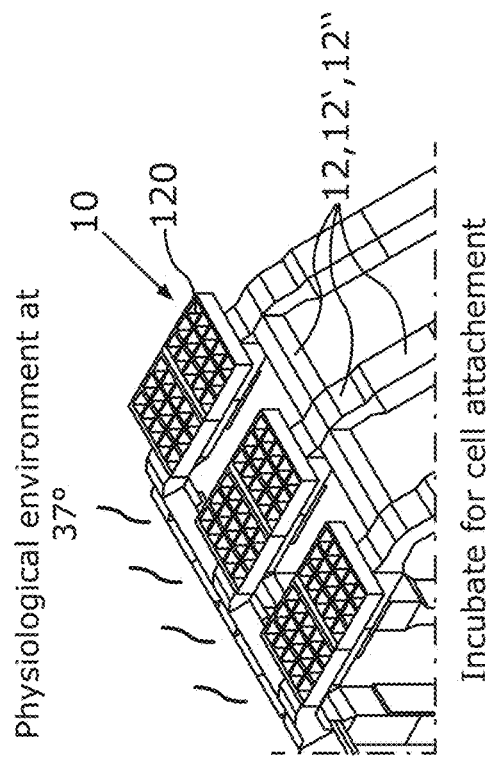
Fig.17b
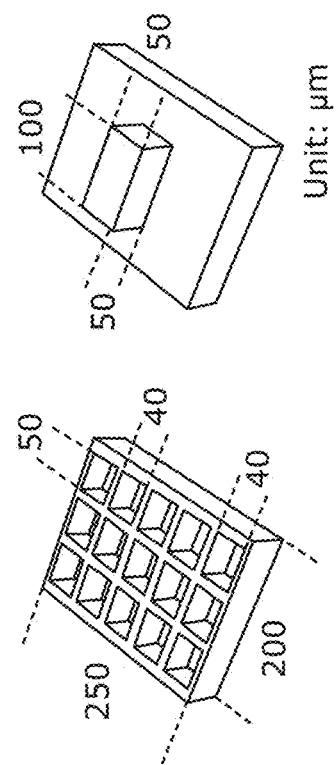
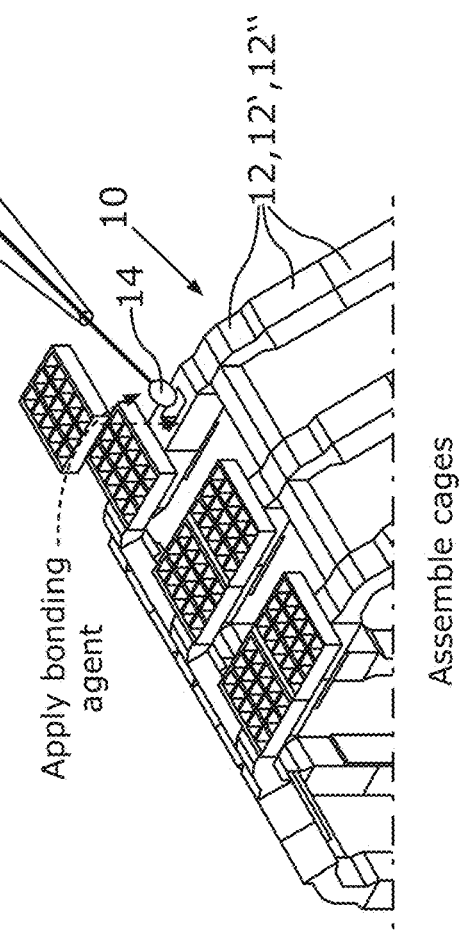
Fig.17c
Fig.17a

US 12,528,123 B2

METHOD OF FABRICATING A MAGNETIC DEFORMABLE MACHINE AND DEFORMABLE 3D MAGNETIC MACHINE

CROSS-REFERENCES TO RELATED APPLICATIONS

This application is a 371 National Phase Application of International Application PCT/EP2021/071716, filed on Aug. 4, 2021 which claims priority to European Application No. 20190336.6, filed on Aug. 10, 2020, each of which is incorporated herein by reference, in their entirety.

The present invention relates to a method of fabricating magnetic deformable machines comprising heterogeneous voxels, as well as to a deformable 3D magnetic machine, the magnetic machine having a size of less than 10000 mm, the magnetic machine comprising a plurality of voxels of which at least some are magnetic, with at least one of the voxels having a Young's modulus of less than 500 MPa, the plurality of voxels being bonded one to another with a bonding agent, wherein each voxel is of predefined shape, size, has predefined magnetic properties and predefined material properties.

Small-scale soft-bodied machines that respond to external stimuli promise groundbreaking applications in bioinspired robotics, micro-factories, and minimally invasive medical devices. The external magnetic field has emerged as a promising stimulus choice for safe, fast, precise, dexterous, and wireless actuation of soft machines. When the overall size of such magnetic machines gets smaller down to the sub-millimeter scale, their design and functionalities have been severely constrained by the available fabrication methods, which only work with a limited selection of materials, geometries, and magnetization profiles.

While recent research has advanced the fabrication of small-scale magnetic soft machines from two-dimensional (2D) mold-casting and laser cutting methods to extrusion-based and ultraviolet (UV) lithography-based 3D printing methods, the integration of multiple arbitrary material compositions with arbitrary 3D magnetic programming and geometry has not yet been achieved. Moreover, the existing methods suffer from some fundamental constraints that limit them to be further improved. Specifically, the extrusion-based approaches cannot fabricate finer magnetic soft fibers to weave complex structures because of the demanding requirement of storage modulus, the deterioration of performance caused by the added magnetic particles, and the extrudate swell of the soft elastomers. And the strong local interaction of magnetic particles inside uncured liquid photoresists restricts programming arbitrary magnetization of the neighboring voxels by lithography-based approaches.

In view of these challenges, it is an object of the present invention to make available a method of fabricating magnetic deformable machines, that can be produced in an as facile and reproducible method as possible, even at scales below the mm range which overcome the above drawbacks. It is a further object of the present invention to make available magnetic machines that can be deformed remotely at target sites and that can be moved through various environments prior to arriving at the target site.

This object is satisfied by a method and a magnetic deformable machine in accordance with the subject matter of the respective independent claim.

Such a method of fabricating magnetic deformable machines comprising heterogeneous voxels, i.e. voxels of different characteristics, properties and compositions, comprises the following sequence of steps:

defining deformation characteristics of the magnetic machine;

producing a blueprint of the magnetic machine with reference to the deformation characteristics of the magnetic machine;

providing a plurality of voxels of which at least one, preferably, some are magnetic and with at least one voxel of the plurality of voxels having a Young's modulus of less than 500 MPa;

bonding the plurality of voxels one to another using a bonding agent in accordance with the produced blueprint to assemble the magnetic machine; and curing the bonding agent.

The present invention thus makes available a bottom up assembly method in which individual voxels are bonded one to another step by step to form the deformable magnetic machine. In contrast to prior art methods which use top down approaches a hitherto unknown accuracy of formation of magnetic machines is made available. Moreover, the present method is very simple to implement, as individual building blocks, i.e. the voxels can be tailored to a specific function of the magnetic machine, and are then simply connected to their directly neighbouring voxels according to the blueprint.

For example, certain voxels can be configured in order to permit a transport of the magnetic machine between first and second positions by their magnetic properties through the application of a first magnetic field, whereas other voxels can be configured to alter an appearance of the magnetic machine, i.e. by allowing the magnetic machine to deform, for example through expansion, restriction in size, or by allowing a component of the magnetic machine to move relative to a further part of the magnetic machine, e.g. through the application of a second magnetic field differing from the first magnetic field.

Depending on the type of magnetic machine, the deformation of the magnetic machine is required in order to be able to move the magnetic machine, and/or to alter its appearance for its precise application. By being able to fabricate magnetic machines that can deform and which can thereby carry out specific functions the present invention also enables the production of programmable magnetic machines.

For example, If an encapsulated magnetic machine is selected, in order to transport a payload from a first position to a second position in order to unload the payload at the second position, then a size of the magnetic machine has to be selected in dependence on the payload, a stiffness property of the magnetic device has to be selected in order to be able to reliably transport the payload, magnetic properties of the magnetic machine have to be selected in order to be able to move the magnetic machine from the first to the second position, and a deformation characteristic has to be selected in order to be able to load the payload at a first position and to release the payload from the magnetic machine at the second position, i.e. a second kind of magnetic field may be applied in order to deform the magnetic machine in addition to the way in which it may be deformed in order to move the magnetic machine from a first position to a second position.

In order to determine the size, the environment of use is examined, e.g. if a capsule is intended to be used to transport a payload in a persons' stomach then an average capsule size of e.g. 5 to 20 mm is selected. The stiffness property is then determined for example by the amount of payload that has to be transported etc. These are the steps that may be carried out to define the deformation characteristics of the magnetic machine and then to produce the blueprint of the magnetic machine.

In this connection it should be noted that the blueprint is an instruction manual of how the different building blocks, i.e. voxels, are assembled relative to one another and bonded to one another using the bonding agent with reference to the deformation characteristics of the magnetic machine to form the desired magnetic machine.

The current bottom-up fabrication method allows a heterogeneous assembly-based three-dimensional (3D) microfabrication strategy to create complex 3D miniature wireless magnetic soft machines with arbitrary multi-material compositions, arbitrary 3D geometries, and arbitrary programmable 3D magnetization profiles in high resolution. Such an approach helps realizing diverse characteristics on the prototyped machines, such as programmable shape-morphing, negative Poisson's ratio, complex stiffness distribution, directional joint bending, and re-magnetization for shape-reconfiguration. These characteristics further liberate the design and enable various biomedical device-related functions, such as peristaltic pumping, active cargo transport and delivery, controlled surface anchoring and releasing, and information encryption. This 3D heterogeneous integration approach significantly improves the achievable complexity level of 3D magnetic soft machines and thus boost their future capabilities and performance for applications in robotics, biomedical devices, and bioengineering. As the unique advantage of assembly methods, such voxels can be fabricated by arbitrary/different microfabrication processes with arbitrary geometries, materials, and magnetic programming.

The step of defining deformation characteristics of the magnetic machine may comprise at least one of the steps selected from the group of members consisting of:
  defining an application of the magnetic machine;
  defining a working environment of the application respectively of the magnetic machine;
  defining deformation parameters of the magnetic machine;
  selecting a size of the magnetic machine;
  selecting a shape of the magnetic machine;
and combinations of the foregoing. In this way a user of the method can tailor the fabrication of the magnetic machine to its precise working environment and produce tailor made magnetic machines.

The blueprint may comprise a number of the respective voxels used to form the magnetic machine, an arrangement of the respective voxels used to form the magnetic machine, properties (e.g., Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, stimulus (e.g., pH, chemicals, temperature, humidity, flow, pressure, glucose) response, biocompatibility, biological or other degradability or solubility, visibility in a specific imaging technique (e.g., fluorescence imaging, near-infrared imaging, magnetic resonance imaging, positron emission tomography, ultrasound imaging, photoacoustic imaging, fluoroscopy, computed tomography), immune response property, protein absorption property, enzyme response property, temporary or permanent adhesion to other voxels, biological tissues or other surfaces) of the respective voxels used to form the machine, an arrangement of the curing agent at the voxels used to form the magnetic machine.

Thus, the blueprint comprises the instructions of which kind of voxels are required in what arrangement in order to produce the magnetic machine tailored to the respective working environment.

In this connection it should be noted that the magnetization profile defines a spatial profile of the vector field of the magnetic field of a voxel that expresses the density of permanent or induced magnetic dipole moments in a magnetic material.

The step of producing the blueprint of the magnetic machine may comprise at least one of the steps selected from the group of members consisting of:
  selecting materials of different voxels to define a stiffness property of the magnetic machine;
  selecting one or more materials for the respective voxels of the magnetic machine;
  selecting uniform or non-uniform 3D magnetization profiles of magnetic voxels to define magnetic torque- or force-based deformation property of the magnetic machine;
  selecting a size of the respective voxel;
  selecting a shape of the respective voxel;
  selecting a magnetic property of the respective voxel;
  selecting a material property of the respective voxel;
  simulating a behaviour and/or deformation of the magnetic machine on the basis of the blueprint;
  adapting the blueprint of the magnetic machine in dependence on results of a simulation of a behaviour and/or deformation of the magnetic machine;
and combinations of the foregoing.

In this way specific building blocks of the magnetic machine can be assembled to produce the magnetic machine tailored to the respective working environment.

Each voxel may have a 3D shape and may be of predefined shape, size, may have predefined magnetic properties and predefined material properties, e.g. Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, stimulus (e.g., pH, chemicals, temperature, humidity, flow, pressure, glucose) response, biocompatibility, biological or other degradability or solubility, visibility in a specific imaging technique (e.g., fluorescence imaging, near-infrared imaging, magnetic resonance imaging, positron emission tomography, ultrasound imaging, photoacoustic imaging, fluoroscopy, computed tomography), immune response property, protein absorption property, enzyme response property, temporary or permanent adhesion to other voxels, biological tissues or other surfaces.

Through the use of voxels of the above kind, each building block can be tailored to a very specific function, e.g. stability of the magnetic machine, for the transport of the magnetic machine, for the deformation of the magnetic machine etc.

Magnetization profiles of the magnetic voxels of the magnetic machine may be visible by a magnetic sensing or imaging technique (e.g., magneto-optical sensing using the Kerr and/or Faraday effect, magnetic force microscopy, magnetic x-ray microscopy). In this way some of the voxels of the magnetic machine may be invisible to imaging techniques while at the same time being visible to tracking techniques or vice versa. This can be beneficial for track and place applications that may be carried out with the magnetic machine if deploying them as miniature robots e.g. in the medical field.

The step of bonding the plurality of voxels one to another may take place at one or more faces and/or one or more edges of the voxels. In this way the accuracy of working of the deformable magnetic machine can be improved, as e.g. a movement of the voxels relative to one another can be influenced in dependence of how these are bonded one to another.

The step of bonding the plurality of voxels one to another may comprise bonding one voxel to another voxel in subsequent steps; and/or the step of bonding the plurality of voxels one to another may comprises bonding one group of voxels group wise to another. In this way individual voxels can be attached to one another in subsequent steps, if e.g. a very flexible and/or sensitive part of the machine is being assembled, whereas if a solid not particularly flexible or sensitive part of the magnetic machine is being assembled then the voxels forming this part of the machine can be bonded one to another in a batch like process by bonding several voxels one to another at the same point in time.

In this connection a batch like process can be a process in which several voxels are placed into a support and molded one to another at the same point in time, with the support having a pre-defined shape and size matching at least a part of the magnetic machine to be formed.

The respective voxels may be magnetized prior to being bonded to its neighbouring voxel, while being bonded to its neighbouring voxel, or after having been bonded to its neighbouring voxel. In this way the method can be more versatile on forming the machines.

The step of bonding the plurality of voxels one to another may comprise the step of providing a jig, in particular one or more jigs, having a negative shape of at least a part of the magnetic deformable machine and placing a pre-defined amount of the plurality of voxels into said jig and then bonding the pre-defined amount of the plurality of voxels in said jig. The use of a jig enables an improved and more accurate placement of voxels and hence a more accurately formed machine.

One or more of the pre-defined amount of the plurality of voxels may be placed into the jig at one point in time by means of a robot (not shown). Using a robot to place the voxels can increase an accuracy of placement and aid in maintaining a sterile environment if e.g. medical machines are being formed.

One or more of the pre-defined amount of the plurality of voxels may be magnetized prior to being placed into said jig, or after having been placed into said jig and having been bonded to its neighbouring voxels. Hence a jig can also be used to magnetize a voxel in order to provide this with a desired pre-defined orientation of magnetization.

The step of curing the bonding agent may take place at room temperature or at another specific temperature and within the environment in which the step of bonding takes place, the step of curing the bonding agent can take place by ultraviolet (UV) or another wavelength light source, or the step of curing the bonding agent can take place within an oven, or at a hot plate. Such bonding methods ensure a reliable and facile method of manufacture of the magnetic machine.

A respective side length of the magnetic machine may have a size of less than 10000 mm, especially less than 100 mm; and/or each voxel may have a 3D shape with a size of a respective side length of the 3D shape being selected in the range of 2500 mm to 5 nm, especially in the range of 25 mm to 1 μm; and/or each voxel can have a shape selected from the group of members consisting of square voxels, rectangular voxels, round voxels, polygonal voxels triangular voxels, and any arbitrary 3D-shaped voxels and combinations of the foregoing. In this way a plethora of kinds of magnetic machines can be formed both in the sub mm range and also for larger kinds of applications. In this connection it should be noted that voxels having sizes of greater than 10 mm may be formed in corresponding molds into which a corresponding material of the voxel is cast.

In this connection it should be noted that such shapes can beneficially be formed using techniques such as 3D printing, and/or two photon laser lithography or photolithography, and/or casting techniques. Generally speaking any form of production method can be used to form the voxels, in as far as it makes available voxels having the desired shape, size and properties.

According to a further aspect the present invention further relates to a deformable 3D magnetic machine, the magnetic machine having a size of less than 10000 mm, the magnetic machine comprising a plurality of voxels of which at least one, preferably some, are magnetic, with at least one of the voxels having a Young's modulus of less than 500 MPa, the plurality of voxels being bonded one to another with a bonding agent, wherein each voxel is of predefined shape, size, has predefined magnetic properties and predefined material properties, e.g., Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, stimulus (e.g., pH, chemicals, temperature, humidity, flow, pressure, glucose) response, biocompatibility, biological or other degradability or solubility, visibility in a specific imaging technique (e.g., fluorescence imaging, near-infrared imaging, magnetic resonance imaging, positron emission tomography, ultrasound imaging, photoacoustic imaging, fluoroscopy, computed tomography), immune response property, protein absorption property, enzyme response property, temporary or permanent adhesion to other voxels, biological tissues or other surfaces.

By means of the method discussed in the foregoing magnetic machines can thus be formed having an improved accuracy of movement and deployment in contrast to prior art machines. This is because they can be formed with a significantly improved resolution in contrast to the state of the art which uses a top down assembly rather than a bottom up approach. Moreover, the above method can advantageously be used to integrate multiple different kinds of materials into a single device. The advantages discussed in the foregoing naturally also apply to the magnetic machine discussed in the following.

By providing a plurality of voxels of which at least one, preferably some, are magnetic, the magnetic machine can be moved between different positions located spatially apart and the magnetic machine can be actuated such that it is able to change its shape if a certain desired function is to be carried out by the magnetic machine.

The individual voxels can be made of materials having different Youngs Modulus to define a stiffness pattern of the magnetic machine. By defining the stiffness pattern enables the deformation of the magnetic machine such that it can be actuated to carry out a desired change in shape of the magnetic machine for carrying out the desired function.

In this connection it should be noted that a voxel is a building block which can be of magnetized material hard/soft material biodegradable or non-biogradable material which is selected to carry out a bottom up fabrication process rather than a top down fabrication approach and to tailor each part of the magnetic machine to its specific function of movement and/or actuation of the magnetic machine.

A respective side length of the magnetic machine may have a size of less than 100 mm, in particular less than 5 mm; and/or each voxel may have a 3D shape with a size of a respective side length of the 3D shape being selected in the range of 500 mm to 5 nm, especially in the range of 10 mm to 1 µm; and/or each voxel can have a shape selected from the group of members consisting of square voxels, rectangular voxels, round voxels, polygonal voxels triangular voxels, and any arbitrary 3D-shaped voxels.

The magnetic machine may be a cargo (e.g., drug, stem cell, gene, imaging agent, T-cell, macrophage) delivery device which can transport the cargo and release it by deforming or opening the device at a target site; or the magnetic machine may be one of an anchoring device, a stent, a soft peristaltic or other type of liquid pump, a soft cubic frame, an information encryption device, a deformable metamaterial, a shape-adaptable or shape-programmable robot, a gripper, a foldable device, a clogging device, a swimming robot, an organ model, a synthetic heart or other organ, and a shrinkable ring flower. Such magnetic machines can be used for a plethora of different kinds of applications in a variety of environments.

A material of at least some of the non-magnetic voxels of the magnetic machine may respectively be selected from the group of non-magnetic materials consisting of elastomers, thermoplastic elastomers, rubbers, duroplastics, thermoplastics, e.g., polydimethylsiloxane, aliphatic aromatic copolyester or modified polyester, or modified copolyester, polyurethane elastomer, silicone rubber, natural rubber, latex, styrene ethylene butylene styrene, butyl rubber, fluorosilicone rubber, polyester, nylon, thermoplastic polyurethane; biodegradable synthetic material, e.g., polyglycolide polylactides, poly(caprolactone), poly(dioxanone), poly(ethylene glycol)diacrylate, poly(N-isopropylacrylamide); biomaterial, e.g., gelatin, chitosan, alginate, agarose, hyaluronic acid derivatives, elastin, chitosan, fibrin glue, cellulose, fibronectin, collagen, silk; hydrogel; ionic gel; liquid crystal polymer, elastomer or gel; shape memory polymer; photoresist polymer, e.g., SU-8; biological protein, e.g., squid ring teeth protein; fabric material; non-magnetic metal; silicon; silica; glass; wood; carbon fibre; and derivates and combinations of the foregoing. Thereby the magnetic machine can be tailored to its specific use.

A material of at least some of the magnetic voxels may be selected from the group of members consisting of magnetic materials present in bulk, particle form, disc form, wire form, fiber form or in the form of Janus particles, such as magnetic materials of chromium dioxide ($CrO_2$), samarium-cobalt (SmCo), neodymium-iron-boron (NdFeB), cobalt (Co), ferrite, permalloy (NiFe), carbon steel, tungsten steel, Alnico, iron, stainless steel, nickel (Ni), iron platinum (FePt), iron oxide, barium ferrite, magnetite; combinations or composites of the foregoing; and/or voxels coated with magnetic films or layers made of above magnetic materials or their combinations. Moreover, a magnetic composite material may be embedded inside or covered or deposited on aforementioned non-magnetic voxel materials to form a voxel. Also combinations of the various magnetic voxels can be used to form the magnetic machine.

A material of the bonding agent may be selected from the group of members consisting of uncured silicone rubber, PDMS, polyurethane, modified copolyester, silicone rubber and other uncured polymer of the aforementioned materials, temperature curable polymers, UV or another wavelength light curable polymers, chemically curable polymers, wax, adhesive tape, super glue, surgical glue, various kind of biological polymers e.g., gelatin, desoxyribonucleic acid (DNA) and based bonding agent, and combinations of the foregoing. Such bonding agents permit the formation of more precise and higher resolution magnetic machines which are adapted to carry out their respective application.

The magnetic voxels may have any arbitrary 3D magnetization profile, such as for uniform magnetic voxels, each voxel may have an average surface magnetic field strength selected in the range of 0 to 1 T, preferably selected in the range of 0 to 50 mT, with each voxel having a predefined orientation of the magnetic field strength, for example in parallel to a face of the respective voxel or perpendicular to a face of a respective voxel, or inclined with respect to one or more faces of the respective voxel, for non-uniform magnetic voxels, each voxel may have a nonuniform magnetization distribution throughout the voxel with varying magnetic orientations throughout the voxel.

Through the selection of the respective shape, size and material composition of the respective voxel and bonding agent, a high resolution magnetic machine can be formed. In this way magnetic machines are made available that can be moved in a fast and efficient manner between various positions spatially separated from one another and such that they change their shape and/or size at a desired target position in order to carry out their desired function.

According to an aspect the present invention also relates to a use of the magnetic machine as at least one of a cargo (e.g., drug, stem cell, gene, imaging agent, T-cell, macrophage) delivery device which can transport the cargo and release it by deforming or opening the magnetic machine at a target site, an anchoring device, a stent, a soft peristaltic or other type of liquid pump, a soft cubic frame, an information encryption device, a deformable metamaterial, a shape-adaptable or shape-programmable robot, a gripper, a foldable device, a clogging device, a swimming robot, an organ model, a synthetic heart or other organ, and a shrinkable ring flower.

The present invention will be described in detail with reference to the following drawings. There is shown:

FIG. 1a to e steps of a schematic process of the heterogeneous integration-based 3D fabrication of small-scale magnetic soft machines, with FIG. 1e showing representative steps of the jig-assisted assembly process for one of the 3D rings shown in FIG. 1c;

FIG. 2a to d resolution characterization and capability of creating arbitrary 3D magnetization profiles of the proposed fabrication method, FIG. 2a, a checkerboard assembly of four 35 µm side-length cubic magnetic voxels, a SEM image shows the high-fidelity shape of the voxels, the checkerboard has a heterogeneous magnetization profile that was verified by the measurement of the normal component of its near-surface magnetic field $\vec{B}_v$, FIG. 2b, three 100 µm side-length cubic voxels were magnetized to have $\vec{m}_v$ with different 3D directions, their respective $\vec{m}_v$ were verified by the measurement of their respective $\vec{B}_v$, FIG. 2c, the measured and theoretical magnetization values of 100 µm side-length cubic magnetic voxels with different MMP concentrations and various magnetizing magnetic field strengths, the columns and bars represent the mean and the standard deviation (SD) values of the measurement of three samples in the same set, respectively, "*" marks the measurements that cannot be distinguished from background noises, FIG. 2d, a hollow cube has letters and symbols programmed into the magnetization profiles of its six faces, the invisible letters and symbols were revealed by imaging each face using a magnetic-field imaging (magneto-optical sensor) instrument (MagView S with type B sensor, Matesy GmbH)

FIG. 3a to d various miniature magnetic soft machines demonstrating different diverse characteristics;

FIG. 4a to c various miniature magnetic soft machines with potential biomedical functionalities;

FIG. 5a to e illustrations of the mold-casting and magnetizing steps of the proposed fabrication approach and its versatility. FIG. 5a, Two-photon polymerization (TPP), i.e., 3D-microprinting, and mold-casting were used to create the voxel molds and eventually the voxels. Scanning electron microscope (SEM) images are provided for NdFeB and Cobalt magnetic microparticles (MMPs). FIG. 5b, SEM images of exemplar voxels made of PDMS with embedded NdFeB (left) and Cobalt MMPs (right). FIG. 5c, SEM images and schematics of some example voxels with various shapes fabricated using the proposed strategy. The SEM image is taken using LEO Gemini 1530 VP at 3 kV acceleration voltage. All SEM images were adjusted using GIMP for better visibility. FIG. 5d, Multiple voxels were fixed in a jig to their respective 3D angles and magnetized in batches inside a VSM to program individual $\vec{m}_v$ with desired 3D magnetization. FIG. 5e, An exemplar 100 μm side-length cubic voxel made of PDMS with embedded MNPs (Cobalt iron oxide, 30 nm particle size, Merck KGaA) at a 10:1 mass ratio and magnetized in a magnetic field of 1.8 T;

FIG. 6a to c deformation of a magnetic machine in the form of a shrinkable ring under increasing applied $\vec{B}_c$, FIGS. 7a & b finite element analysis (FEA) simulation (a) and experimental demonstration (b) of the soft cubic frame;

FIG. 8a to c designs of a flower-shaped machine, simulation verification, and fabrication process, FIG. 8a, the design of the overall magnetization profile of the machine and the geometric design of the voxel, FIG. 8b, simulated shape-morphing behavior of this machine, FIG. 8c, designs of the assistant jigs and a sketch of the fabrication of machine with experimental photographs;

FIG. 9a to b observations of side and top profiles of a magnetic machine designed as a peristaltic pump and the design and results of a modified version of the pump;

FIG. 10 measured critical $\vec{B}_c$ magnitude and $\vec{B}_c$ spatial gradient ($\nabla \vec{B}_c$) values that could eject the loaded liquid fluids out of the soft miniature capsule;

FIGS. 11 a & b deformation of a magnetic machine in the form of an anchoring device in a tube (a), the relation between the normalized area and the applied $\vec{B}_c$ magnitude and (b) indicating how the anchoring device could recover to its initial configuration by repeatedly applying $\vec{B}_c$ with a small magnitude;

FIGS. 12a & b designs of the starfish-shaped machine, simulation verification, and fabrication process, FIG. 12a, the design of the overall magnetization profile of the machine and the geometric design of the voxel, FIG. 12b, designs of the assistant jigs and a sketch of the fabrication of the starfish-shaped machine with experimental photographs;

FIGS. 13a & b designs of a capsule-shaped machine and its fabrication process, FIG. 13a, the overall magnetization profile of the machine and the geometric design of the voxels, FIG. 13b, designs of the assistant jigs and a sketch of the fabrication of the machine with experimental photographs;

FIGS. 14a & b designs of a peristaltic pump and illustrations of its fabrication process, FIG. 14a, the design of the overall magnetization profile of the pump and the design of its voxels, the deformation is verified by simulation, FIG. 14b, illustrations of the designs of the assistant jigs and a sketch of the fabrication process with experimental photographs;

FIG. 15a to c magnetic characterization of the MMPs utilized in this work, FIG. 15a, imaging (MagView S with type B sensor, Matesy GmbH) of the magnetic fields generated by 100 μm voxels with different mass ratio of MMPs (NdFeB, MQP-15-7, Magnequench) and magnetized along different directions. FIG. 15b, magnetic characterization results of the samples of the bare MMPs (NdFeB, MQP-15-7, Magnequench) were measured using the VSM at a maximum field strength of 0.6 T (I1), 1.2 T (I2), and 1.8 T (I3) respectively, FIG. 15c, magnetic characterization results of the samples of two kinds of MMPs, i.e., NdFeB and Cobalt (Sigma-Aldrich), in three kinds of base polymers were measured using the VSM at a maximum field strength of 1.8 T;

FIGS. 16a & b schematic illustrations of face and edge bonding methods, FIG. 16a, three configurations of performing face bonding and the removal of excess bonding agent using a tweezer, the approach of applying the bonding agent to the face of a voxel is illustrated in the inset, FIG. 16b, the procedure of preforming edge bonding using an assistance jig with a pocket at its side and all at its bottom;

FIG. 17 loading live stem cells to the micro-cages heterogeneously integrated to the anchoring soft machine top surface, FIG. 17a, assembling cell micro-cages to the anchoring soft machine, the tenon at the cage bottom was plugged into the mortise at the voxel of the anchoring machine, uncured polymer was applied for bonding, FIG. 17b, cells were seeded to the cell cages, FIG. 17c, the whole device was put into an incubator for 24 h for cell attachment.

FIG. 1a to d show steps carried out on fabricating a magnetic deformable machine 10. The magnetic machine 10 comprising a plurality of heterogeneous voxels 12, 12', 12".

The deformable 3D magnetic machine 10 shown, e.g. in FIG. 1d, has a size of less than 10000 mm, namely of about 4 mm. Some of the plurality of voxels 12, 12', 12" are bonded one to another with a bonding agent 14, wherein each voxel 12, 12', 12" is of predefined shape, size, has predefined magnetic properties and predefined material properties, e.g., Young's modulus, magnetization profile, stiffness, mechanical strength, durability, etc.

A respective side length of the magnetic machine 10 may have a size of less than 100 mm, in particular less than 5 mm and in the present example of FIG. 1d has a side length of 4 mm. Each voxel 12, 12', 12" has a 3D shape with a size of a respective side length of the 3D shape being selected in the range of 2500 mm to 5 nm, especially in the range of 25 mm to 1 μm, in the present example the side length along an edge 20 of the voxel amounts to 25 μm.

As indicated in FIG. 1a the voxels 12 are of rectangular 3D shape and the voxels 12' comprise a mixture of triangular and rectangular 3D shapes. Generally speaking the voxels 12, 12', 12" can be rectangular 3D voxels 12, 12', 12", round 3D voxels 12, 12', 12", for example spherical voxels, polygonal 3D voxels 12, 12', 12", triangular voxels 12, 12', 12", arbitrary 3D-shaped voxels 12, 12', 12" and combinations of the foregoing.

The magnetic machine 10 may be a cargo (e.g., drug, stem cell, gene, imaging agent, T-cell, macrophage) delivery device which can transport the cargo and release it by deforming or opening the magnetic machine 10 at a target site. Alternatively, the magnetic machine 10 may be one of an anchoring device, a stent, a soft peristaltic or other type of liquid pump, a soft cubic frame, an information encryption device, a deformable metamaterial, a shape-adaptable or shape-programmable robot, a gripper, a foldable device, a clogging device, a swimming robot, an organ model, a synthetic heart or other organ, and a shrinkable ring flower.

A non-magnetic voxel material of at least some of the non-magnetic voxels 12, 12', 12" of the magnetic machine 10 may be respectively selected from the group of materials consisting of elastomers, thermoplastic elastomers, rubbers, duroplastics, thermoplastics, e.g., polydimethylsiloxane, aliphatic aromatic copolyester or modified polyester, or modified copolyester, polyurethane elastomer, silicone rubber, natural rubber, latex, styrene ethylene butylene styrene, butyl rubber, fluorosilicone rubber, polyester, nylon, thermoplastic polyurethane; biodegradable synthetic material, e.g., polyglycolide polylactides, poly(caprolactone), poly(dioxanone), poly(ethylene glycol)diacrylate, poly(N-isopropylacrylamide); biomaterial, e.g., gelatin, chitosan, alginate, agarose, hyaluronic acid derivatives, chitosan, fibrin glue, elastin, cellulose, fibronectin, collagen, silk; hydrogel; ionic gel; liquid crystal polymer, elastomer or gel; shape memory polymer; photoresist polymer, e.g., SU-8; biological protein, e.g., squid ring teeth protein; fabric material; nonmagnetic metal; silicon; silica; glass; wood; carbon fibre; and derivates and combinations of the foregoing.

A material of at least some of the magnetic voxels 12, 12', 12" may be selected from the group of members consisting of magnetic materials present in bulk, particle form, disc form, wire form, fiber form or in the form of Janus particles, such as magnetic materials of chromium dioxide ($CrO_2$), samarium-cobalt (SmCo), neodymium-iron-boron (NdFeB), cobalt (Co), ferrite, permalloy (NiFe), carbon steel, tungsten steel, Alnico, iron, stainless steel, nickel (Ni), iron platinum (FePt), iron oxide, barium ferrite, magnetite; combinations or composites of the foregoing; and/or voxels 12, 12', 12" coated with magnetic films or layers made of above magnetic materials or their combinations, a magnetic composite material where aforementioned magnetic voxel materials are uniformly or non-uniformly embedded inside or covered or deposited on aforementioned non-magnetic voxel materials; and/or combinations of the foregoing.

A material of the bonding agent 14 is selected from the group of members consisting of uncured silicone rubber, PDMS, polyurethane, modified copolyester, silicone rubber and other uncured polymer of the aforementioned materials, temperature curable polymers, UV or another wavelength light curable polymers, chemically curable polymers, wax, adhesive tape, super glue, surgical glue, various kind of biological polymers e.g., gelatin, desoxyribonucleic acid (DNA) and based bonding agent, and combinations of the foregoing.

The magnetic voxels 12 may have any arbitrary 3D magnetization profile, such as for uniform magnetic voxels 12, 12', 12", where each voxel may have an average surface magnetic field strength selected in the range of 0 to 1 T, preferably selected in the range of 0 to 50 mT, with each voxel 12 having a predefined orientation of the magnetic field strength, for example in parallel to a face 18 of the respective voxel 12, 12', 12" or perpendicular to a face 18 of a respective voxel 12, 12', 12", or inclined with respect to one or more faces 18 of the respective voxel 12, 12', 12".

For non-uniform magnetic voxels 12, 12', 12", each voxel 12, 12', 12" may have a non-uniform magnetization distribution throughout the voxel 12, 12', 12" with varying magnetic orientations throughout the voxel 12, 12', 12".

On carrying out the method, deformation characteristics of the magnetic machine to be fabricated have to be defined. This means that e.g. an application of the magnetic machine 10 has to be defined, as well as possibly a working environment of the application respectively of the magnetic machine 10. This may also include selecting a size of the magnetic machine 10 and possibly a shape of the magnetic machine 10.

For example, if the magnetic machine 10 is to be used as a cargo delivery device 10, e.g. to transport a cargo 16 in the form of a drug via the esophagus to the stomach of a patient, then the magnetic machine 10 may be designed having the shape of a capsule 10 that can open at second position, namely a target site, in order to deliver the drug at the second position. The deformation can be brought about by e.g. inflating the magnetic machine 10 such that the cargo 16 can exit the magnetic machine 10, by compressing the magnetic machine 10 in order to squeeze out the cargo 16, or by opening a part of the magnetic machine 10 by opening a flap or the like.

Thus, in order to load the cargo 16, unload the cargo 16, i.e. deliver the drug, the magnetic machine 10 can be deformed due to its deformation capabilities through the application of a magnetic field. It should be noted in this connection that the magnetic field used to deform the magnetic machine 10 is different to the magnetic field that is applied to move the magnetic machine 10 from one position to another.

In order to move the magnetic machine 10 from a first position to a second position magnetic forces are used to move the magnetic machine 10. Moreover, a different magnetic field can then be used to actuate the deformation of the magnetic machine 10 in order to bring about a change in shape and/or size of the magnetic machine 10. For this purpose, it may also be necessary to define deformation parameters of the magnetic machine 10.

Having defined the application of the magnetic machine 10 and the deformation characteristics of the magnetic machine 10, a blueprint of the magnetic machine with reference to the deformation characteristics of the magnetic machine 10 is produced. The blueprint typically comprises a number of the respective plurality of voxels 12, 12', 12" used to form the magnetic machine 10, an arrangement of the respective voxels 12, 12', 12" used to form the magnetic machine 10, properties of the respective voxels 12, 12', 12" used to form the magnetic machine 10, and an arrangement of the curing agent at the plurality of voxels 12, 12', 12" used to form the magnetic machine 10.

It should be noted in this connection that the step of producing the blueprint of the magnetic machine 10 comprises at least one of the steps selected from the group of members consisting of:
  selecting materials of different voxels 12, 12', 12" to define a stiffness property of the magnetic machine 10;
  selecting one or more materials for the respective voxels 12, 12', 12" of the magnetic machine 10;
  selecting uniform or non-uniform 3D magnetization profiles of magnetic voxels 12, 12', 12" to define magnetic torque- or force-based deformation properties of the magnetic machine 10;
  selecting a size of the respective voxel 12, 12', 12";
  selecting a shape of the respective voxel 12, 12', 12";

selecting a magnetic property of the respective voxel 12, 12', 12";

selecting a material property of the respective voxel 12, 12', 12";

simulating a behaviour and/or deformation of the magnetic machine 10 on the basis of the blueprint;

adapting the blueprint of the magnetic machine 10 in dependence on results of a simulation of a behaviour and/or deformation of the magnetic machine 10;

and combinations of the foregoing.

Once the blueprint has been produced the voxels 12, 12', 12" are provided. One, preferably some, of the voxels 12, 12', 12" are magnetic and one or more of the voxels 12, 12', 12" of the plurality of voxels 12, 12', 12" has a Young's modulus of less than 500 MPa, in some instances one or more of the voxels 12, 12', 12" of the plurality of voxels 12, 12', 12" has a Young's modulus of less than 5 MPa, in very special cases one or more of the voxels 12, 12', 12" of the plurality of voxels 12, 12', 12" may have a Young's modulus of less than 100 kPa.

The voxels 12, 12', 12" are bonded one to another using a bonding agent 14 in accordance with the produced blueprint to assemble the magnetic machine 10. The step of bonding the plurality of voxels 12, 12', 12" one to another may take place at one or more faces 18 of each voxel 12, 12', 12". Additionally or alternatively, the step of bonding the plurality of voxels 12, 12', 12" one to another may take place at one or more edges 20 of the voxels 12, 12', 12".

In this connection the step of bonding the plurality of voxels 12, 12', 12" one to another comprises bonding one voxel 12, 12', 12" to another voxel 12, 12', 12" in subsequent steps. Additionally or alternatively, the step of bonding the plurality of voxels 12, 12', 12" one to another comprises bonding one group of voxels 12, 12', 12" group wise to another. Following the bonding of the voxels 12, 12', 12", the bonding agent is cured.

In this connection it should be noted that at least some of the voxels 12, 12', 12" of the magnetic machine 10 may be invisible to imaging techniques while at the same time being visible to tracking techniques or vice versa.

The step of curing the bonding agent 14 may take place at room or another specific temperature and within the environment in which the step of bonding takes place, wherein the step of curing the bonding agent 14 can take place by ultraviolet (UV) or another wavelength light source, or the step of curing the bonding agent 14 can take place within an oven, or at a hot plate.

FIG. 1a to d shows the heterogeneous integration-based 3D fabrication of small-scale magnetic soft machines 10. FIG. 1a shows that voxels 12, 12' with different materials, shapes, and magnetization profiles $\vec{m}_v$ (varying in both magnitude and orientation) are used as the building blocks for soft magnetic machines 10 (also known as magnetic machines 10). The various voxels 12, 12' are integrated together by the bonding agent 14 which is subsequently cured to ensure a good connection between the various voxels 12, 12'.

FIG. 1b shows that the bonding agent 14 is applied to connect neighboring voxels in two different ways: face bonding and edge bonding, which respond to the external magnetic field $\vec{B}_c$ differently. On face bonding, the bonding agent 14 is applied onto the faces 18 of the respective voxels 12, 12' to be bonded one to another. In contrast to which, on edge bonding, the bonding agent 14 is applied at edges 20 of the respective voxels 12, 12', i.e. at positions of each voxel where two or more faces 18 adjoin one another.

FIG. 1c shows an example soft magnetic machine 10 design with two interconnected circular rings. The magnetic machine 10 is fabricated by assembling a number of heterogeneous voxels 12, 12' at designated 3D positions and orientations. The insets show the places where two bonding options are used, respectively. In this connection it should be noted that the bonding agent 14 in face-bonding connections is omitted in all schematics for easier visibility both in FIG. 1c and the majority of the following Figures (see e.g. FIG. 3).

FIG. 1d shows experimental results of the fabricated soft magnetic machine 10. The experimental results show a 3D device with metamaterial characteristic having a negative Poisson's ratio, agreeing with the designed shape-morphing behavior. The lower of the two images in FIG. 1d shows how the magnetic machine can deform on the application of a magnetic field, by contraction in comparison to the expanded state shown in the upper of the two images of FIG. 1d.

To describe the capabilities of the proposed fabrication method, an exemplar soft magnetic machine 10 was designed. The magnetic machine 10 is composed of two interconnected circular rings with a 3D metamaterial characteristic (FIG. 1). The circular rings have a diameter of around 1 mm and consist of voxels 12, 12', 12" that were made of three kinds of elastomers with different Young's moduli (i.e., stiffnesses): Dragonskin, Ecoflex-10 silicone rubber, and polydimethylsiloxane (PDMS). These voxels 12, 12', 12" of diverse magnetic and non-magnetic soft materials with various shapes and stiffnesses were batch-fabricated using soft lithography techniques (see FIG. 5). Magnetic voxels 12, 12', 12", made of soft elastomers (e.g., silicone rubber) with embedded hard magnetic microparticles (MMPs; e.g., NdFeB microparticles), were pre-magnetized to program their individual local magnetic moments $\vec{m}_v$. These voxels 12, 12', 12" were precisely assembled together with the bonding agent 14 (i.e., liquid non-crosslinked soft elastomer), which was applied to connect neighboring voxels 12, 12', 12" on their faces 18 or edges 20 (see FIG. 1b), inducing different shape-morphing behaviors.

The programmed 3D geometry and magnetization profile of this soft machine 10 can be seen in FIG. 1c. When an external uniform magnetic field $\vec{B}_c$ ($|\vec{B}_c|$=50 mT) was applied, each ring shrunk in its radial direction and the whole soft machine 10 behaved as a negative Poisson's ratio metamaterial (FIG. 1d). The deformation characterization of one of the rings under different $\vec{B}_c$ will be explained in the following (see also FIG. 6). FIG. 1 shows that the proposed assembly-based strategy has the unique advantage of freely integrating different materials heterogeneously in high resolution in comparison with the previous methods and achieving uncoupled, arbitrary, and 3D geometries and magnetization profiles, which could previously not be achieved.

To demonstrate the resolution (i.e., the minimum size of a voxel 12, 12', 12") of the proposed fabrication method, a checkerboard was assembled by four 35 µm side-length cubic voxels 12, 12', 12" (FIG. 2a), which is less than half of the resolution produced by the current 3D printing methods of magnetic soft machines 10. Such resolution can be further improved in the future down to sub-10 µm and even sub-µm scale by using nanoscale magnetic particles embedded inside soft synthetic or biological material-based voxels, DNA type of programmable biological bonding agents, and optical tweezers-type precision micro/nanomanipulation systems. With such a high fabrication resolution, each voxel 12, 12', 12" can further have a local magnetic moment $\vec{m}_v$. $\vec{m}_v$ can point to an arbitrary 3D direction (FIG. 2b). Besides assuming a uniform (constant) magnetization, $\vec{m}_v$ could also be programmed to be spatially variable. Also, $|\vec{m}_v|$ can have any value from zero to the maximum value capped by the magnetic properties of the MMPs. This maximal magnitude could be tuned by the MMP concentration in a given voxel and the magnitude of the field $|\vec{B}_m|$ used to magnetize the voxel (FIG. 2c).

To showcase the capability of the proposed fabrication strategy to program a high-fidelity 3D magnetization profile with abrupt changes, a hollow cubic machine 10 was made of two-hundred-and-eighteen 100 µm side-length cubic voxels (FIG. 2d). This kind of out-of-plane abrupt changes in the magnetization profile is challenging to achieve using extrusion-based or UV lithography-based 3D printing methods, because the pre-magnetized MMPs employed in these methods tend to stay within the 2D geometric planes and are loath to take abrupt direction changes. Moreover, this kind of fully sealed hollow structure cannot be fabricated by the previously reported UV lithography-based methods, since printing the top surface requires a supporting material and the uncured photoresist cannot be drained out from the water-tight surface. Each face of the fabricated hollow cube has an encoded letter or symbol, i.e., "MPI-IS", in its respective magnetization profile. Under the inspection of a magnetic field imaging instrument (e.g., a magneto-optical sensor), the programmed magnetization profiles showed clear changes between adjacent voxels 12, 12', 12" and delivered legible information, validating the ability to encode accurate magnetization profiles down to the voxel-scale level. Since the magnetization profiles programmed on hard MMPs are invisible to the naked eye and hard to be erased, programming invisible complex patterns into magnetic soft machines has the potential to be used in information storage and encryption.

FIG. 1e shows representative steps of the jig-assisted assembly process for one of the 3D rings shown in FIG. 1c. First, the magnetic voxels 12 were plugged into a slit-shaped jig 100 and covered with a cap 102. Bonding agent 14 was applied via a hole 103 of the cap 102 followed by removing the extra bonding agent 14 to form the edge bonding using a scraper 106.

Next, magnetic and non-magnetic voxels 12, 12' were plugged into a 2D jig 108 fabricated by two-photon polymerization (TPP) or mold-casting. The 2D jig 108 having a negative shape of one of the rings shown in FIG. 1c and thus defining a basic shape of this ring of the machine 10. The magnetic and non-magnetic voxels 12, 12' were assembled in the jig 108 by face bonding to form a ring. It is also possible to only fill half a ring of the jig 108 with magnetic and non-magnetic voxels 12, 12' in order to form a half ring.

Finally, the ring and two half rings were plugged into a 3D jig 110 (fabricated by TPP-based 3D microprinting) defining the shape of the completed machine shown in FIG. 1c. The three parts of the machine 10 are assembled in the jig and then a bonding agent is applied to the respective faces 18 in order to create a 3D soft machine 10 by face bonding.

FIGS. 2a to 2d shows the resolution and versatility of the proposed 3D fabrication strategy. FIG. 2a shows a checkerboard assembly of four 35 µm side-length cubic magnetic voxels 12. A scanning electron microscope (SEM, LEO Gemini 1530 VP) image shows the high-fidelity shape of the voxels 12. The checkerboard has a heterogeneous magnetization profile that was verified by the measurement of the normal component of its near-surface magnetic field $\vec{B}_v$. The SEM images are taken at 3 kV acceleration voltage. Artificial coloring is added in GNU Image Manipulation Program (GIMP) manually, defining the part borders using the Lasso Tool.

Figure 2A:
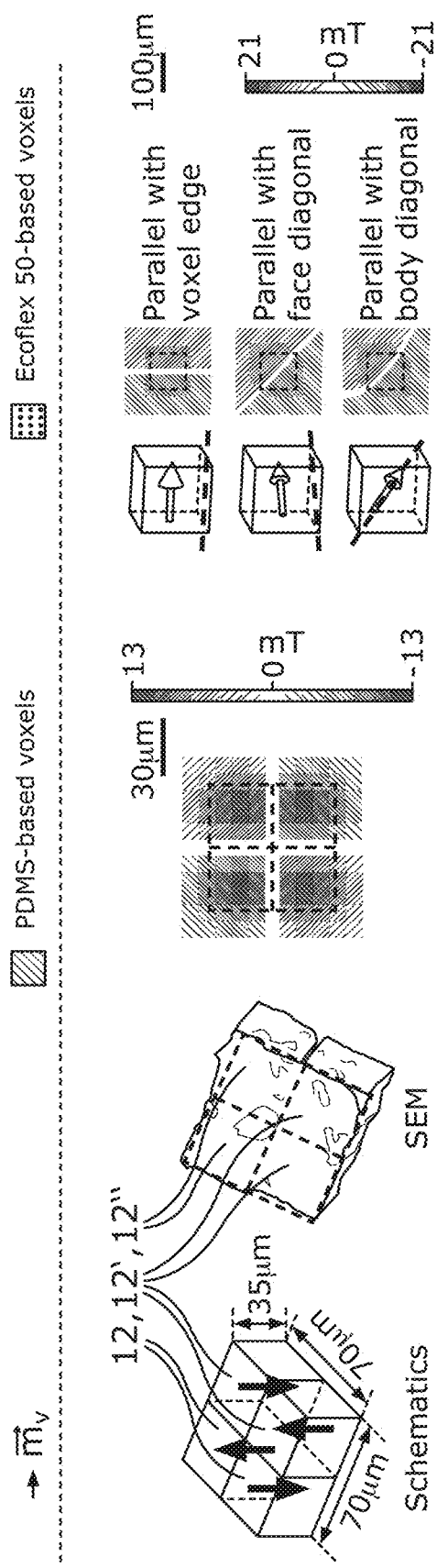
FIG. 2b shows three 100 µm side-length cubic voxels 12 that were magnetized to have $\vec{m}_v$ with different 3D directions. Their respective $\vec{m}_v$ were verified by the measurement of their $\vec{B}_v$.
FIG. 2c shows the measurement of the magnetic field component $\vec{B}_v$ of 100 µm side-length cubic magnetic voxels 12 with different MMP concentrations and various magnetizing field strengths. Four samples having weight ratios of MMPs of 0.0%, 33.3%, 50.0%, and 66.7%, respectively are shown.
Figure 2B:
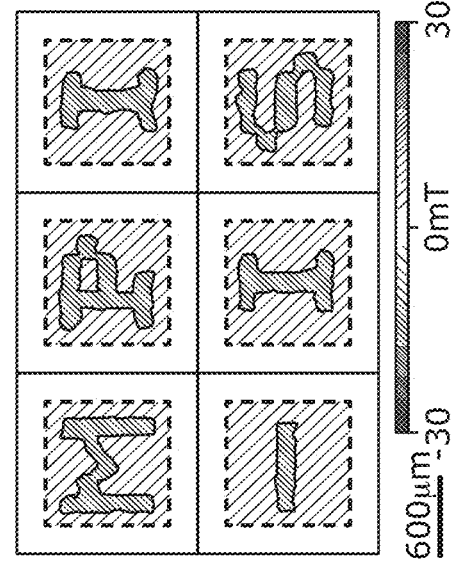
Figure 2D:
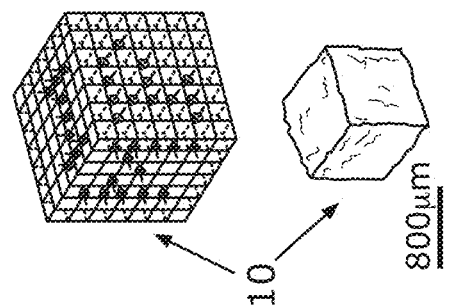

FIG. 2d shows a cubic soft machine having letters and symbols programmed into the magnetization profiles of its six faces 18, as a demonstration of potential information encryption application. The clear edges of the measured $\vec{B}_v$ suggest abrupt magnetization profile change between adjacent voxels 12, 12', 12". The invisible information to the naked eye is revealed by imaging each face using a magnetic-field imaging (magneto-optical sensor) instrument (MagView S, Matesy GmbH).

Figure 3C:
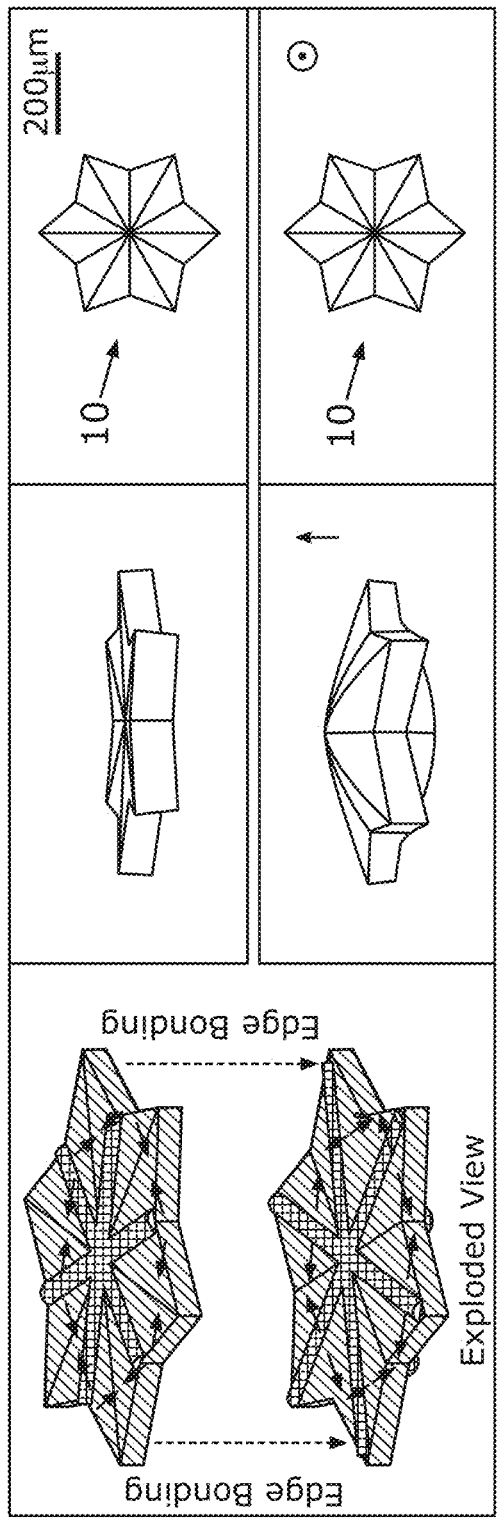

FIG. 3a to d shows miniature magnetic soft machines 10 demonstrating different diverse characteristics. FIG. 3a shows a hollow cubic device 10a exhibiting a 3D metamaterial characteristic of a negative Poisson's ratio: it shrinks in all three dimensions in the presence of $\vec{B}_c$. FIG. 3b shows a flower-shaped soft machine 10b with complex stiffness distribution. Its petals bloom in sequence in an increasingly strong magnetic field strength. FIG. 3c shows a starfish-shaped machine 10c with directional joint bending is made by two layers of magnetic voxels. Its flat body expands vertically and shrinks horizontally under a uniform magnetic field.

Figure 3D:
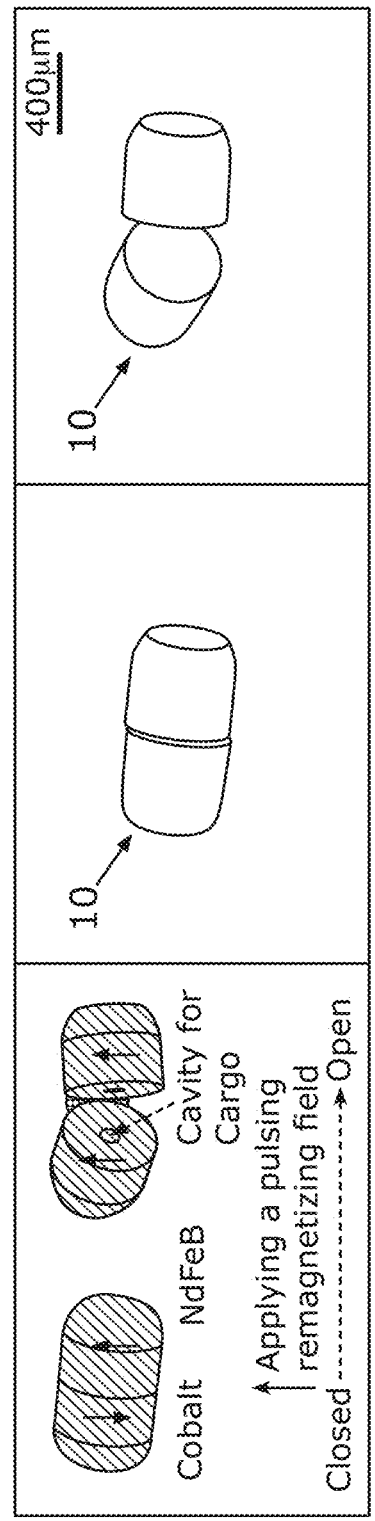

FIG. 3d shows a capsule-shaped device 10d with two cylindrical voxels/parts embedded with different coercivity MMPs to enable reconfigurable magnetization. It is kept closed due to the attractive magnetic interactions between its two parts. After a pulsing re-magnetizing field, the part with lower coercivity MMPs reversed its magnetic moment direction, changing the magnetic interaction from attraction to repulsion, which opens the capsule. This device 10d showcases the programmable re-magnetization capability by using voxels with different magnetic materials.

Such capsules can be used to deliver liquid drugs 16 to a target position in human bodies, such as in stomach or gastrointestinal (GI) tract, with minimal invasion. Thus, on defining deformation characteristics of the magnetic machine 10 and on producing a blueprint of the magnetic machine 10 with reference to the deformation characteristics of the magnetic machine 10, it is found that the magnetic machine 10 may have the following characteristics:

1. It has a hollow shape to load the drugs.
2. It is soft enough to squeeze out the content and safely interact with human tissues.
3. It is controlled by the external magnetic field for both locomotion and drug-releasing control.
4. Biocompatible.

In order to achieve the characteristics mentioned above, the blueprint of the magnetic machine 10 is designed to be a hollow spherical-shaped capsule composed of nine soft rings. The overall size of the magnetic machine can be determined regarding different applications. The magnetization of each ring of the magnetic machine 10 is designed so that the capsule can release the drug 16 by squeezing the chamber when the strength of the exerted global magnetic field $|\vec{B}_c|$ exceeds a critical value, and roll around on the uneven surface when rotating the magnetic field while keeping its strength $|\vec{B}_c|$ small. The diameter of the orifice is specifically designed to hold the drug during the rolling. Each ring is formed by a single voxel with each capsule being formed by a plurality of ring shaped voxels and two or more plate-shaped voxels. In the present example two plate-shaped voxels and 7 ring-shaped voxels are used to form the capsule. The materials used for the respective voxels may be elastomers, thermoplastic elastomers, rubbers, duroplastics, thermoplastics, e.g., polydimethylsiloxane, aliphatic aromatic copolyester or modified polyester, or modified copolyester, polyurethane elastomer, silicone rubber, natural rubber, latex, styrene ethylene butylene styrene, butyl rubber, fluorosilicone rubber, polyester, nylon, thermoplastic polyurethane; biodegradable synthetic material, e.g., polyglycolide polylactides, poly(caprolactone), poly(dioxanone), poly(ethylene glycol)diacrylate, poly(N-isopropylacrylamide); biomaterial, e.g., gelatin, chitosan, alginate, agarose, hyaluronic acid derivatives, chitosan, fibrin glue, elastin, cellulose, fibronectin, collagen, silk; hydrogel; ionic gel; liquid crystal polymer, elastomer or gel; shape memory polymer; photoresist polymer, e.g., SU-8; biological protein, e.g., squid ring teeth protein; fabric material; and derivates and combinations of the foregoing.

The unprecedented versatility of the proposed fabrication method enables the realization of a number of critical design features of soft machines that are challenging to fabricate before. To demonstrate such enabled critical features, first, a cubic bare-edge frame with negative Poisson's ratio in 3D was created by assembling sixty-eight 100 µm side-length cubic voxels 12, 12', 12" which were built of Ecoflex 0050 to make sure a large deformation under an achievable magnetic field (FIG. 3a). This kind of shape, i.e., a hollow cube with bare edges, is difficult to fabricate using the existing methods without supporting materials. With a IBI of 370 mT, the cube shrunk 11% horizontally (along both x and y axes) and 6% vertically (along z axis), exhibiting a 3D metamaterial characteristic. Using voxels 12, 12', 12" with different moduli could further tune the deformation of this structure.

Second, complex stiffness distribution could further broaden the design space of soft machines 10. The assembly approach makes available the capability of freely selecting building materials with a wide range of moduli. As a demonstration, a flower-like machine 10 with a sequential petal blooming response was created (FIG. 3b). The machine (~1 mm diameter) was made by one-hundred-and-twenty-six 100 µm side-length cubic magnetic voxels and a central hexagonal non-magnetic voxel. While the magnetization profile for each of its petal is the same (FIG. 8), its voxels 12, 12', 12" were made of two kinds of polymer materials: Ecoflex 0050 silicone rubber (relatively soft) and PDMS (relatively stiff). These two voxel 12, 12', 12" types with carefully selected stiffness values were utilized to fine-tune the stiffness distribution of the magnetic machine 10. As a result, three petals of the magnetic machine 10 fully opened at 40 mT and the other three opened at 90 mT (FIG. 3b), which is further confirmed by a simulation analysis.

Next, the edge-bonding technique breaks the bending symmetry, giving the material the ability to implement directional joint bending. For illustration, a starfish-like origami shaped magnetic machine 10c was created (FIG. 3c). It was made of twenty-four triangular flat magnetic voxels 12, 12', 12". And the joint bent towards the side with the bonding agent 14, marked with pink color in the illustration. All voxels 12, 12', 12" were magnetic with a 1:3 mass ratio of polymer versus MMPs. In the presence of $\vec{B}_c$, the magnetic machine 10c expanded vertically from its initial flat shape while concurrently shrinking horizontally.

Finally, the possibility of using multi-materials enables reconfigurable magnetization profiles. Using two different kinds of MMP materials (NdFeB and Cobalt) with different coercivity values, a capsule-shaped soft machine, consisting of two cylindrical voxels/parts combined by edge bonding, was prototyped (FIG. 3d). It remained closed in the non-activated state owing to the local magnetic attraction between its two parts. To change the magnetization direction of one of its parts, a pulsing re-magnetizing field (peak magnitude of 295 mT, pulse decays to half of its peak value in 1.33 ms) is applied, which is strong and fast enough to reverse the magnetic direction of the Cobalt part with lower coercivity while not affecting the NdFeB part with higher coercivity. Thus, the local magnetic interaction was switched from attraction to repulsion in situ, opening the capsule and maintaining this activated state in a stable manner even when $\vec{B}_c$ is absent. Such a device can be used to deliver internal cargo in a gentle way (with no ejection flow stress) so that fragile cargos, such as stem cells and genes, can be delivered in a target location. Also, it has the potential to be used to collect the local biological fluid sample from the body (e.g., microbiota sample from the intestines) as a fluidic biopsy tool in the future. This machine showcases the capability of our fabrication method to integrate multiple kinds of MMP types in the same machine to realize reprogrammable magnetization profiles for reconfigurable soft machine designs.

Figure 4A:
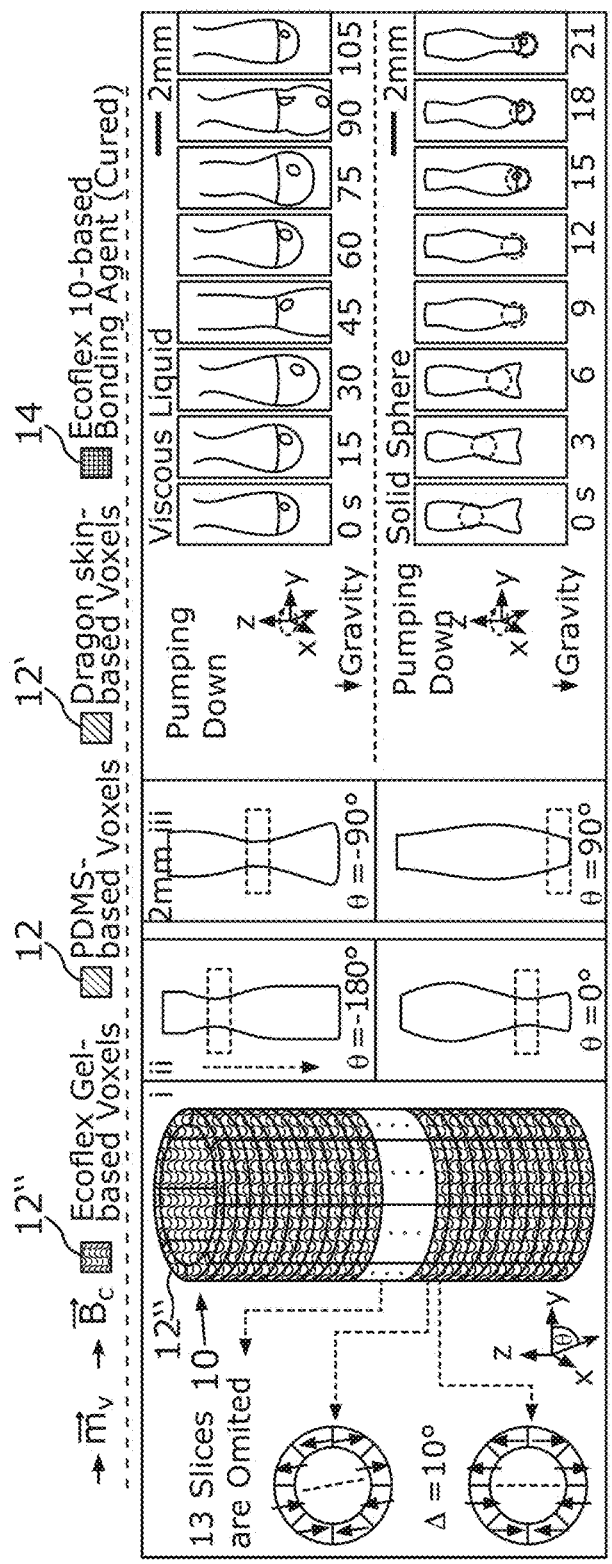

FIG. 4 shows miniature magnetic soft machines 10 with potential biomedical functionalities. FIG. 4a shows an intestine-inspired peristaltic soft pump as a magnetic machine 10. The tubular pump forms traveling wave-like deformation on its body under a rotating $\vec{B}_c$ in the x-y plane. When placed at the bottom of a reservoir, the machine pumps a viscous liquid (e.g., PDMS base here) and transports a 1 mm diameter solid polystyrene sphere when its peristaltic wave propagates downwards.

Thus the desire is to create a device 10 that functions as a miniature peristaltic pump and pumps various kinds of liquid and solid. Such peristaltic pumps require the following characteristics:
1. It can pump liquid and solid.
2. It has a miniature body and thus can work in small and constrained environments.

On forming the blueprint on this basis, peristaltic deformation was selected as the method to realize the desired pumping functionality. The device generally has a tube like shape and peristaltic deformation can be generated by a deformation pattern that propagates along the length of the tube.

In order to achieve a propagating behavior, the tube is divided into circular slices along its length. All slices of the blueprint have similar magnetization profiles. But a phase change is added between the magnetization profiles of adjacent slices. To use the phase change for propagating deformation, the actuation magnetic field is chosen to be a rotating magnetic field with a rotating axis collinear with the length of the tube. In a rotating magnetic field, each slice deforms and restores periodically. But as a result of the phase change, the deformation of different slices are synchronized with a time delay between slices, resulting in a propagating phenomenon. For this design between 4 and 32 voxels may be used per slice, the materials of the respective voxels may be selected as described herein and the side length of a respective voxel 12, 12', 12" may selected in the range of 35 µm to 10 mm.

Figure 4B:
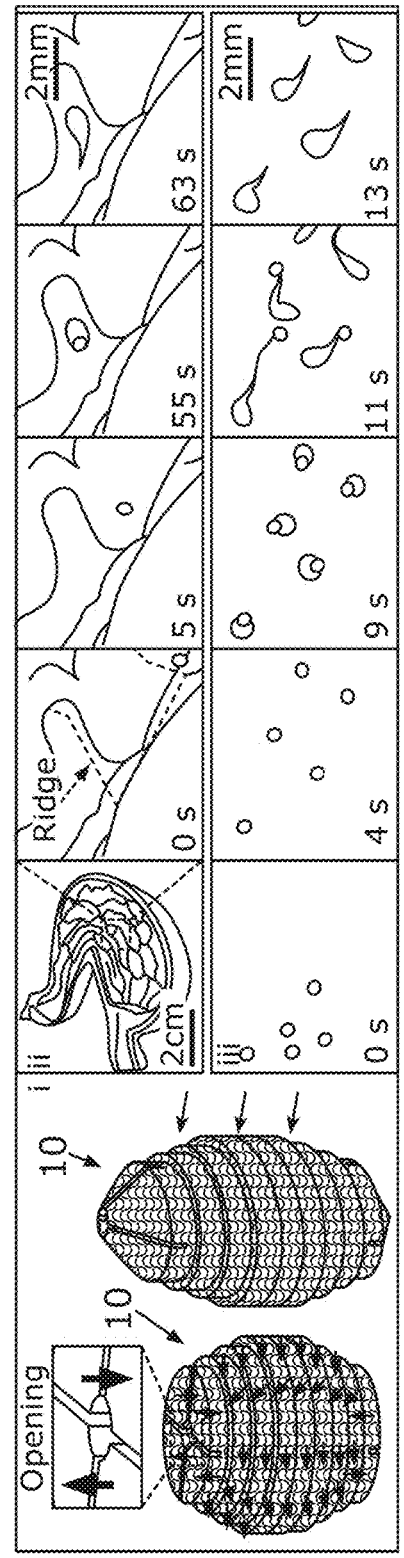

FIG. 4b shows a miniature soft capsule as a magnetic machine 10. After applying a critical magnetic field $\vec{B}_c$, it is able to eject its internal liquid cargo on-demand through its designed top opening. The capsule is rolled on a stomach phantom surface and released a food dye on-demand. Five of such devices are moved and activated together to release the internal dummy drug liquids.

Figure 4C:
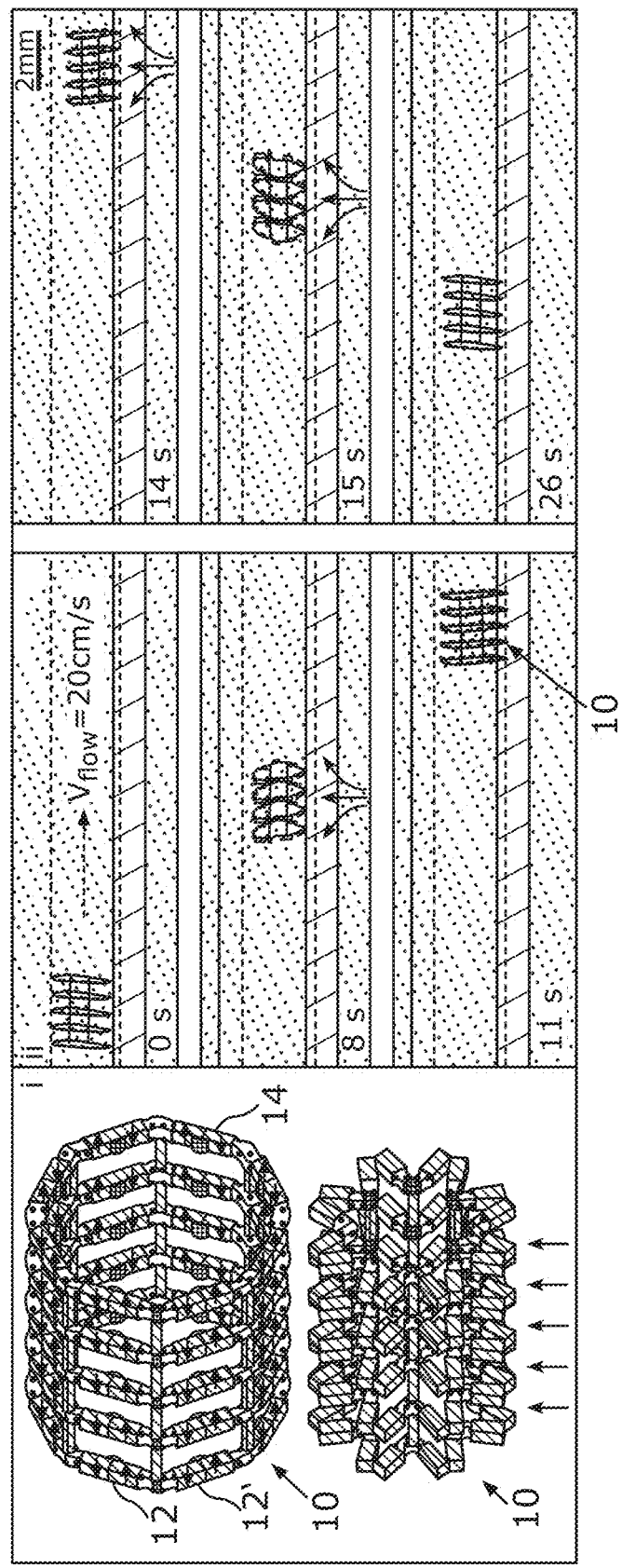

FIG. 4c shows a surface-anchoring device as a magnetic machine 10. It can anchor and release on-demand inside a tube with a fluid (water) flow of 20 cm/s. The design of the device 10 and its response to $\vec{B}_c$ are schematically illustrated. The device anchors itself in a tube and resists the fluid flow in the absence of $\vec{B}_c$. Once $\vec{B}_c$ is applied, it releases itself and moves by fluid flow and/or the externally applied magnetic field gradient OBS (created by an external permanent magnet) to anchor in a target position within the tube. The bonding agent in face-bonding connections is omitted in all schematics for easier visibility.

In order to anchor the anchoring device inside a blood vessel, the miniature device is required to have the following characteristics.
1. It can be moved and anchored inside a tubular structure on-demand.
2. It can withstand high-speed blood flow.

To achieve these goals, a blueprint of the magnetic machine 10 comprises multiple shrinkable rings connected through linking bars. Each ring has a diameter slightly larger than the cross-section of the targeted working space so that it can anchor itself when no magnetic field is applied. The magnetization of each ring is specifically determined so that it can shrink drastically when an externally magnetic field $\vec{B}_c$ is applied, releasing itself from the anchoring position. Another advantage of such design is that it does not hinder the flow and therefore suffers minimal fluid drag. The number of voxels used to form each ring may be in the range of 24 to 120 and the average side length of each voxel may be in the range of 35 µm to 10 mm. The materials used for the respective voxels may be any of the materials mentioned in this document.

Endowed by the capabilities to realize the above four critical characteristics, three new wireless miniature magnetic soft machines 10 are presented exhibiting potential medical functionalities. These examples confirm that the proposed fabrication strategy could greatly extend the feasible design space of magnetic soft machines to satisfy the needs of a variety of potential real-world biomedical and other applications. In the first demonstration, an intestine-inspired tubular soft peristaltic pump was developed. Thirty-seven vertically stacked circular ring-shaped horizontal slices (slice thickness: 100 µm, outer diameter: 1.2 mm, inner diameter: 1.0 mm) of the machine had specific magnetization profiles that could shrink and expand periodically with a specific phase difference (e.g., $\vec{m}_v$ of the stacked voxel 12, 12', 12" between neighboring slices was rotated 10° in the x-y plane) in response to a rotating $\vec{B}_c$ in the x-y plane to create a traveling wave along the tubular soft pump (see FIG. 5). Due to the programmed phase change in the magnetization profiles of neighboring slices, the magnetic machine 10 formed an axially traveling wave-like deformation on its body (FIG. 4a). Such a traveling wave could pump fluids as well as transport solid objects forward or backward, depending on the traveling wave direction (FIG. 4a, and FIG. 5). The magnetic machine 10 was mounted vertically and horizontally, and it was controlled to pump in opposite directions, to isolate environmental factors such as gravity. Results confirmed that the observed pumping behavior was indeed caused by the traveling wave-like deformation of the body of the magnetic machine 10. Such pumping at the small scale can have various "lab-on-a-chip" device applications (e.g., clinical assays) and can create ureter models with peristalsis for surgical training. Moreover, it could potentially have future medical applications by forming tiny tubular (e.g., intestine or ureter) wireless implants inside human bodies that can actively pump internal biological fluids.

The second demonstration showed a hollow spherical-shaped miniature capsule (largest dimension: 600 µm), which was wirelessly rolled on uneven surfaces (i.e., a stomach phantom), moved to a target location, ejected out its enclosed liquid cargo, which is food dye here and could be replaced by drugs, genes, or imaging agents in the future, once activated at the desired location, and finally moved away from the working environment (FIG. 4b). Such wireless miniature capsules that can carry and administer cargoes on-demand locally are promising for future targeted drug delivery applications in cancer therapy and the treatment of other diseases. When $\vec{B}_c$ was applied, the capsule shrunk and compressed itself. When $|\vec{B}_c|$ was small (<100 mT for this specific design), the orifice on the tip of the capsule was closed. Once $|\vec{B}_c|$ exceeded a threshold value (>100 mT for this specific design), the pressure established inside the capsule was large enough to open the orifice and ejected the dummy liquid drug out. In both cases, the net magnetic moment, $\vec{m}_{net}$, of the capsule allowed it to be rolled around on uneven surfaces and moved over obstacles by $\vec{B}_c$. In the Methods section, liquids of three different viscosities were loaded into the capsule and the required critical $|\vec{B}_c|$ is reported (see FIG. 10). Moreover, five such capsules 10 were deployed as a team, where they moved and delivered the liquid cargo simultaneously. Such a team of capsules could enable higher delivery efficiency and be potentially controlled independently using nonuniform magnetic fields or heterogeneous robot designs.

As the last device demonstration, a surface anchoring device, as a magnetic machine 10 (outer diameter: 1.68 mm, length: 1.70 mm) was created, which could be on-demand released, moved, and anchored inside a tube with an internal fluidic flow (FIG. 4c). Such a device could be potentially used inside blood vessels in the future, to reach target sites deep in the body and perform minimally invasive interventions. The anchoring device has a diameter slightly larger than the cross-section of the targeted working space (inner diameter of the tube in this case). This design makes it possible to exert forces to the tube walls once it is deployed. When no $\vec{B}_c$ was applied, the device 10 anchored itself inside the tube and resisted the liquid (e.g., water) flow with a speed of 20-45 cm/s (at 0 s in FIG. 4c). With $\vec{B}_c$ applied, the machine 10 could shrink to a smaller size than the inner diameter of the tube, release itself from its anchoring position, and move with the fluidic flow in the tube. To better position the anchoring device 10, a proper spatial gradient of $\vec{B}_c$ ($\nabla \vec{B}_c$), which can be created by an external permanent magnet, could also be used to move the device along with (at 8 s in FIG. 4c) or against (at 14-15 s in FIG. 4c) the fluid flow. Once $\vec{B}_c$ is removed, the device restored its expanded shape due to its stored elastic energy and anchored itself again inside the tube (at 26 s in FIG. 4c) (see also FIG. 11). The inner diameter of the glass tube (1.62 mm) and the flow velocities (20 cm/s for the dynamic anchoring test, 45 cm/s for the static anchoring test) used in the experiments are within the range of the clinical measurements to the lumen diameters and the blood flow velocities of the human coronary arteries. To render it more medically functional in the future, this soft device could be loaded with drugs that can be released for an extended period of time in a target vessel region after anchoring. When the drug has been depleted, the device could release itself from its anchoring location and be retrieved from the body. Moreover, such a device could be potentially used as a wireless stent in the cardiovascular system.

Figure 5A:
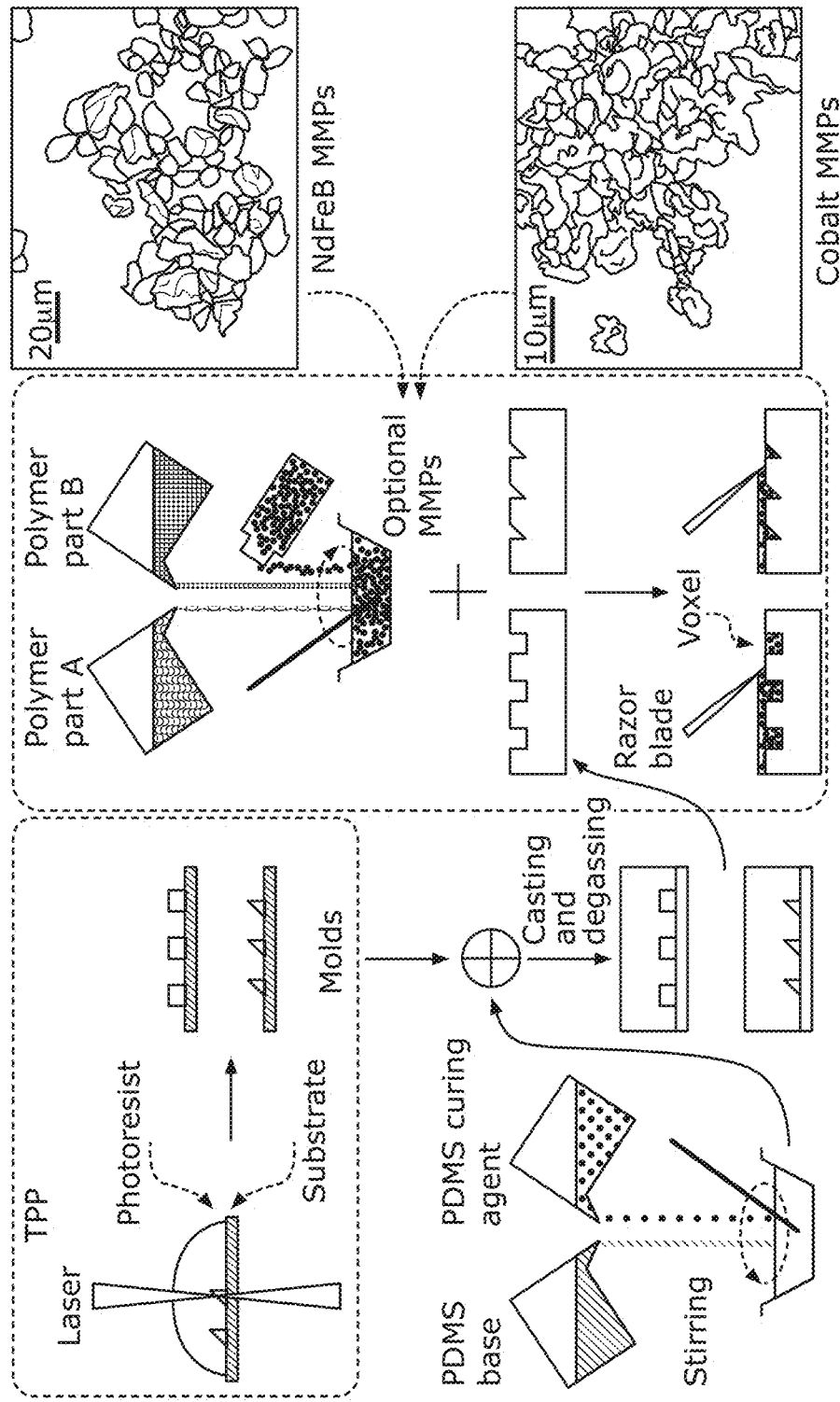
Figure 5B:
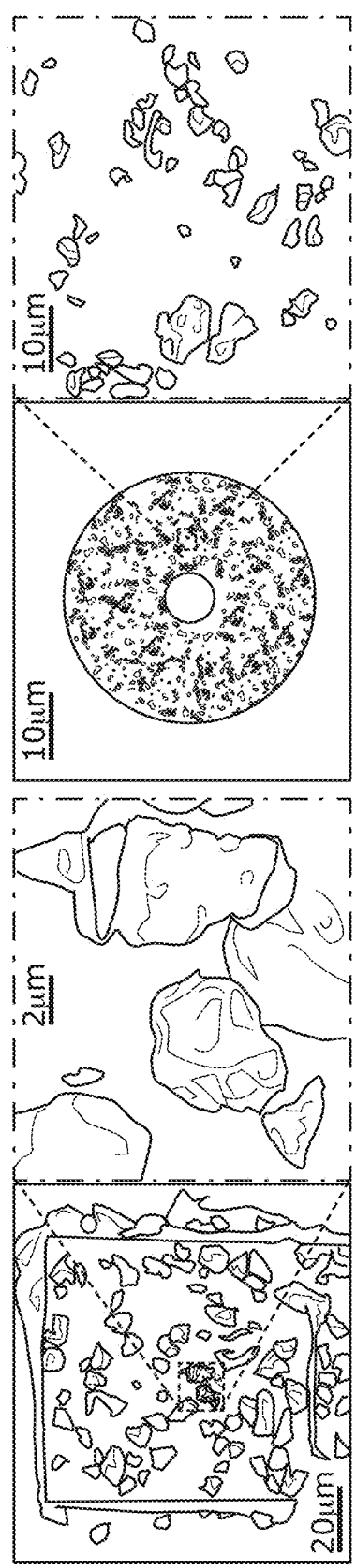

FIG. 5 shows a schematic illustration of the proposed fabrication strategy for prototyping various magnetic soft machines 10. FIG. 5a shows an illustration of the fabrication process for voxels 12, 12', 12" using photolithography, TPP, and mold-casting techniques. FIG. 5b shows SEM images and schematic illustrations of some example voxels 12, 12', 12" with various shapes fabricated using the proposed strategy. FIG. 5c shows that, after curing, magnetic voxels 12, 12', 12" were oriented to a desired 3D angle and then magnetized inside a vibrating sample magnetometer (VSM; Microsense EZ7) with a high (up to 1.8 T) uniform magnetic field to program $\vec{m}_v$ with a desired 3D magnetization strength and direction. FIG. 5d shows a number of voxels 12, 12', 12" assembled together with bonding agents 14 being applied in either face-bonding or edge-bonding approaches.

Figure 6B:
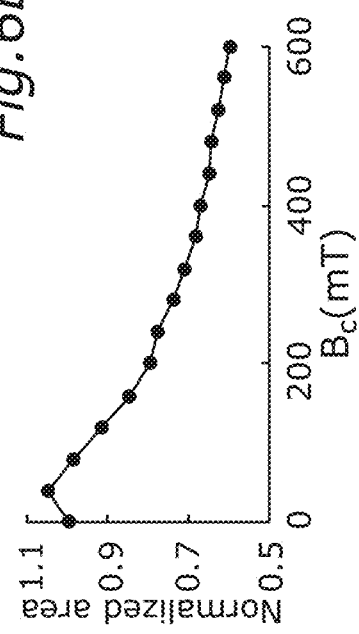
Figure 6C:
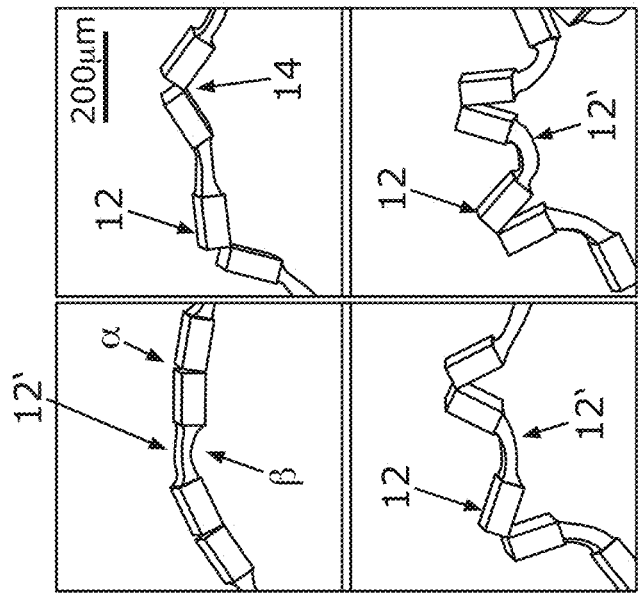
Figure 6A:
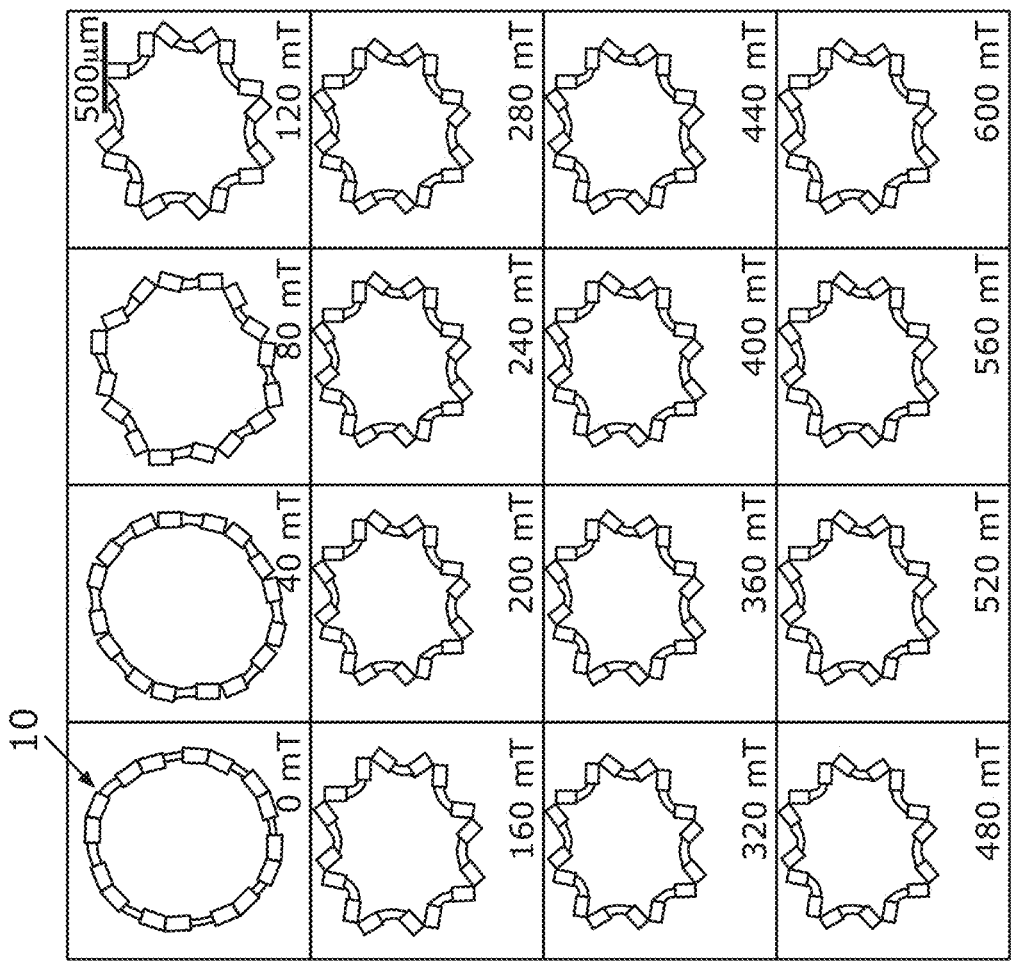

FIG. 6 shows the deformation of the shrinkable ring under increasing applied $\vec{B}_c$. FIG. 6a shows experiment snapshots of the shrinkage process. FIG. 6b shows a detailed view of the bending of α and β joints. FIG. 6c shows the relation between the normalized area and the applied $\vec{B}_c$ magnitude. The experiment was conducted on the water surface to eliminate the friction. The normalized area is defined by the ratio of the enclosed area between the current state and the state when $\vec{B}_c$ is turned off.

Figure 7A:
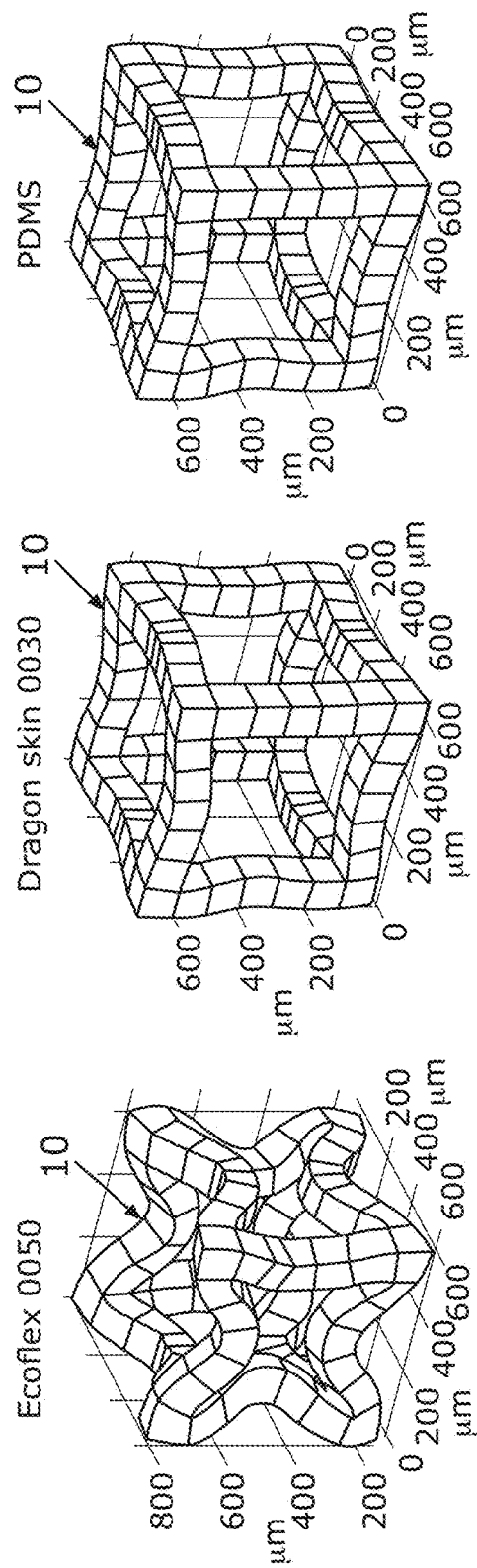
Figure 7B:
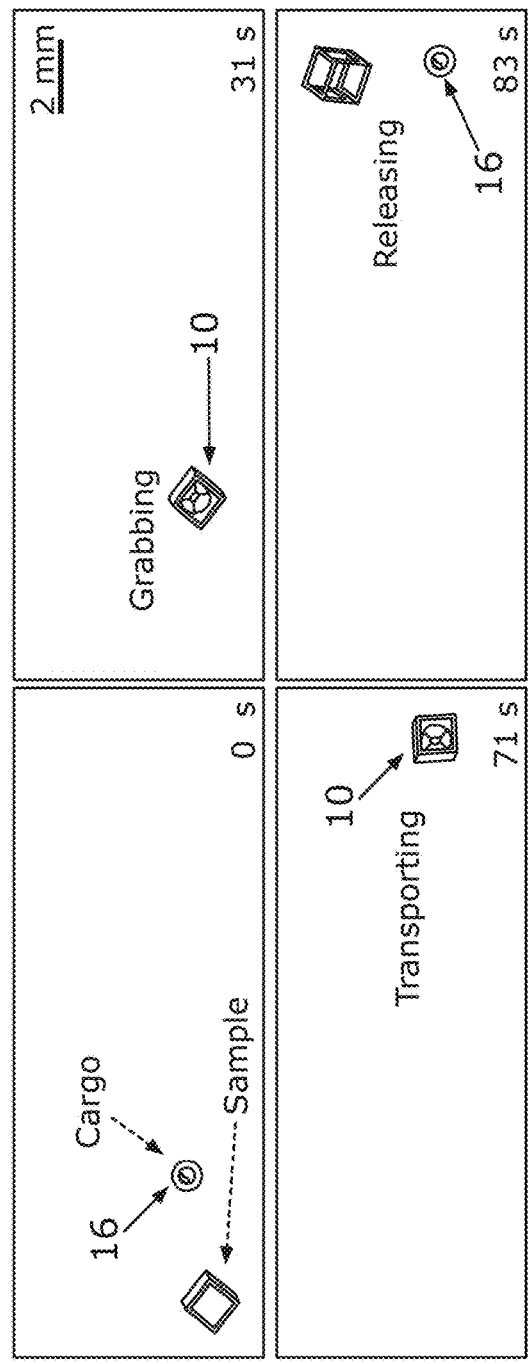

FIG. 7 shows finite element analysis (FEA) simulation and experimental demonstration of the soft cubic frame. FIG. 7a shows a deformation analysis of the cubic frame made of different materials. FIG. 7b shows experimental results of the machine grabbing, transporting, and releasing a ball of soldering iron within glycerol to a target location.

FIG. 8 shows schematic illustrations and FEA simulation of the flower-like soft machine. FIG. 8a shows schematic illustrations of the magnetization profile of the flower-like soft machine. FIG. 8b shows the FEA simulation of the petal structure deformation. The deformations of a softer (left) and a stiffer (right) petal were simulated. The applied magnetic field $\vec{B}_c$ was 40 mT in both cases.

Figure 9A:
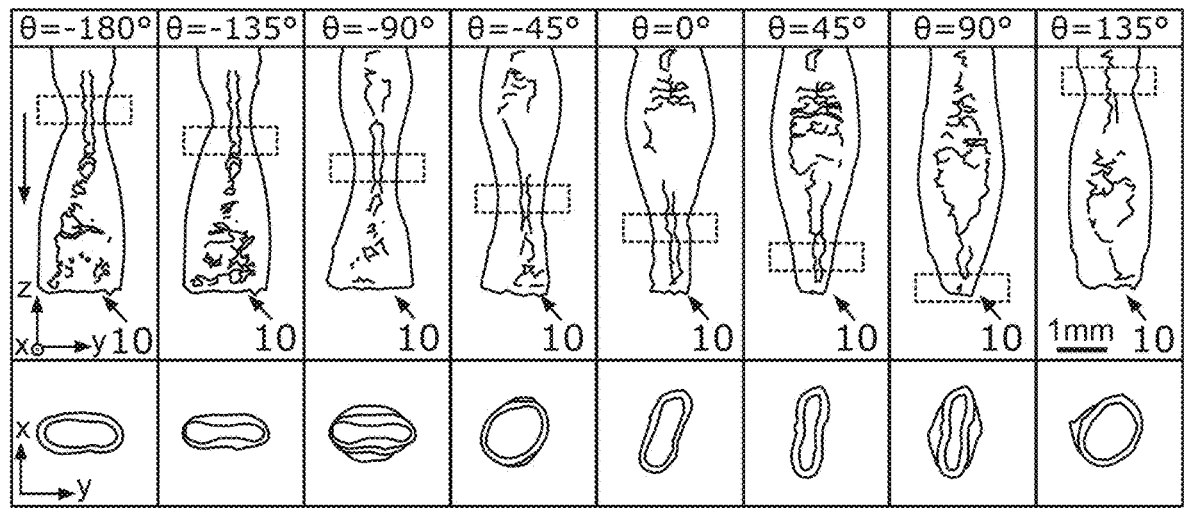
Figure 9B:
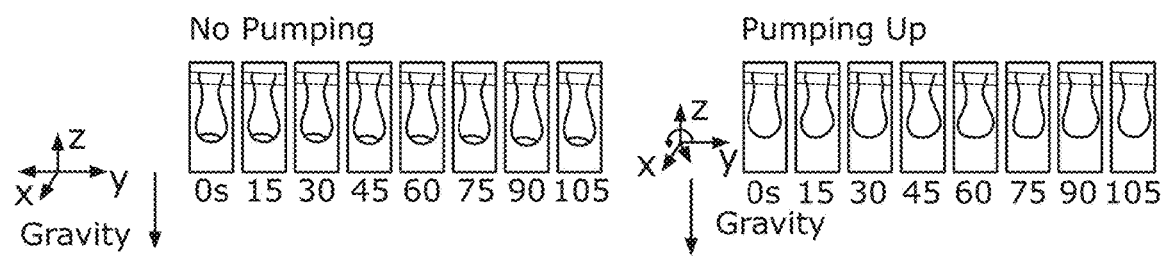
Figure 9B:
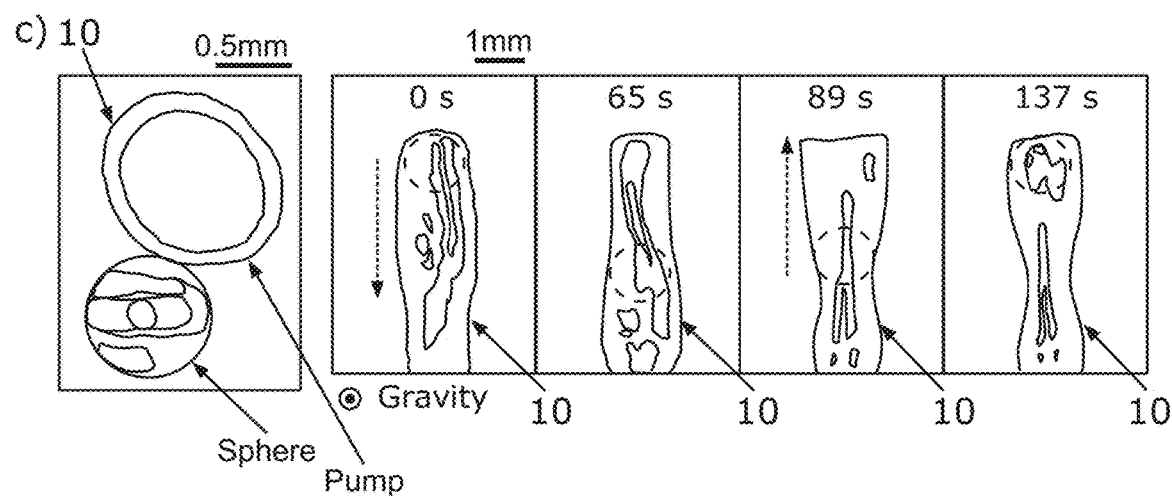

FIG. 9 shows observations of the side and top profiles of the peristaltic pump and the design and results of a modified version of the soft pump. FIG. 9a shows the observed side and top profiles of the peristaltic pump in a rotating $\vec{B}_c$. Angle θ is defined in FIG. 4. FIG. 9b shows comparison between the experimental results of different pumping direc-tions with viscous liquid. FIG. 9c shows that this machine transports a solid polystyrene sphere in air. The sphere location can be identified in Supplementary Video 1.

Figure 10:
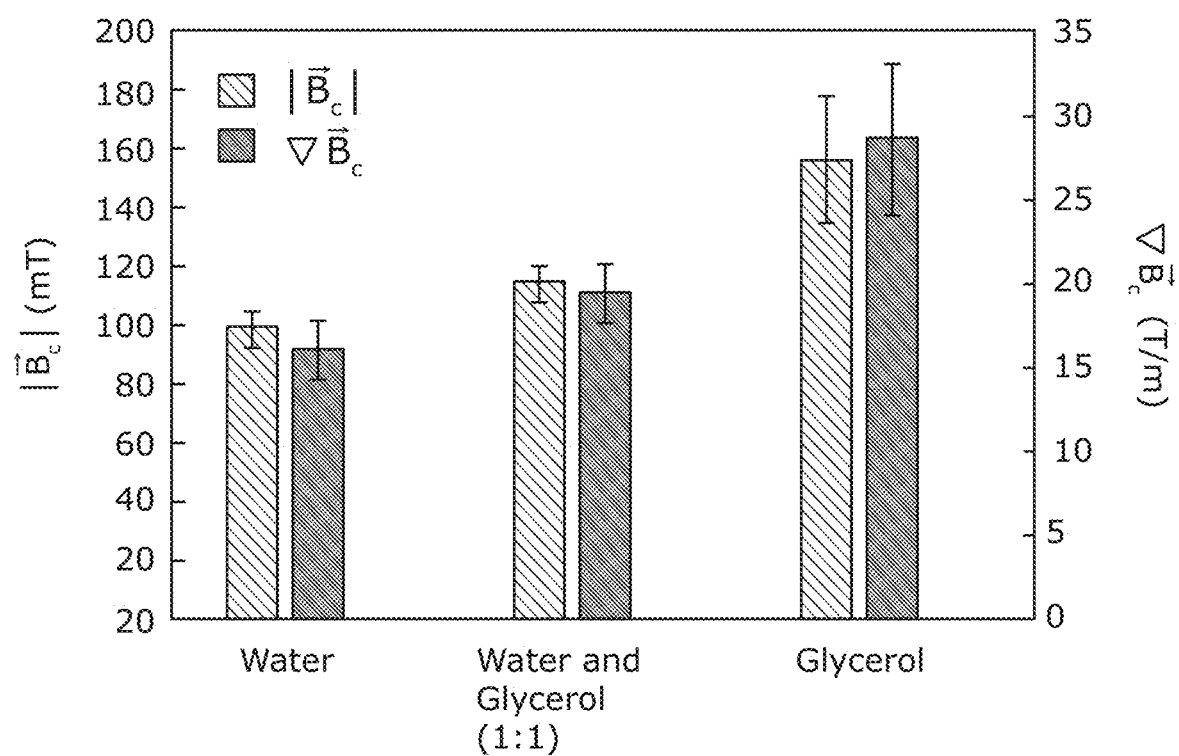

FIG. 10 shows measured critical $\vec{B}_c$ magnitude and $\vec{B}_c$ spatial gradient ($\nabla \vec{B}_c$) values that could eject the loaded liquid fluids out of the soft miniature capsule. Three samples with different viscosities were used.

FIG. 11 shows the deformation of the anchoring device in a tube. FIG. 11a shows the relation between the normalized area and the applied $\vec{B}_c$ magnitude. The normalized area is defined by the ratio of the enclosed area between the current state and the state when $\vec{B}_c$ is absent. The experiment was conducted in a glass tube. FIG. 11b shows the anchoring device could recover to its initial configuration by repeatedly applying $\vec{B}_c$ with a small magnitude. The red arrows indicate the direction of $\vec{B}_c$.

On precision assembly-based 3D fabrication of the magnetic machine 10, voxels 12, 12', 12" are initially designed in Solidworks (Dassault Systèmes). The designs are then fabricated into positive molds with protruding features using two approaches: two-photon polymerization (TPP) and photolithography. IPS (Nanoscribe GmbH) and SU8 (MicroChem) were used in TPP and photolithography, respectively. TPP has the advantages of being more accurate in the out-of-plane dimension and of allowing non-uniform thickness. Photolithography has the advantages of being more time- and cost-efficient. Then, negative molds were made by casting PDMS (Sylgard 184, Dow Chemical Company) with a 5:1 mass ratio between the base and the curing agents. These molds were treated by silane to facilitate voxel curing and releasing. As the fundamental building block, voxels of various materials and shapes were fabricated by casting uncured polymer with optional MMPs into these shape-defining negative molds. The voxels were cured in batches in the negative molds. The curing temperature and time required by the polymer manual were followed. This voxel fabrication process is schematically illustrated in FIG. 5a. The multiple kinds of polymer used in this work include Ecoflex 0010 (Smooth-On), Ecoflex 0030 (Smooth-On), Ecoflex 0050 (Smooth-On), Ecoflex Gel (Smooth-On), Dragon Skin 30 (Smooth-On), and PDMS. FIG. 5b shows some example voxels with a variety of geometries we are able to fabricate.

The method of fabricating the voxels 12, 12', 12" and also of the Jigs 100, 108, 110, 112 will be discussed in the following in detail.

Magnetic voxels 12, 12', 12" had MMPs (neodymium-iron-boron (NdFeB) hard magnetic microparticles; MQP-15-7, Magnequench; average diameter of 5 μm) mixed in the uncured polymer at a mass ratio that corresponds to a desired MMP concentration. In this work, the mass ratio between the polymer and the MMPs is 1:1 unless otherwise specified. After curing, voxels 12, 12', 12" were taken out of the molds manually using tweezers. Magnetic voxels 12, 12', 12" were posed at designed 3D orientations and magnetized by a vibrating sample magnetometer (VSM; EZ7, Microsense) to generate voxel magnetic moments $\vec{m}_v$ with 3D preprogrammed strength and orientation (FIG. 5c). The magnetizing field had a strength of 1.8 T unless otherwise specified. Finally, magnetic and non-magnetic voxels 12, 12', 12" were assembled together with the bonding agent 14 applied to connect neighboring voxels 12, 12', 12". Both the position and orientation of each voxel 12, 12', 12" were controlled in the assembly process, resulting in a heterogeneous 3D geometry and 3D magnetization profile of the final magnetic machine 10. The bonding agent 14 is the uncured liquid soft elastomer that cures in contact with the voxels that it connects.

Bonding agents 14 were used when assembling voxels into their respective designated positions of the fabricated 3D soft machines (FIG. 5*d*). The bonding agents 14 were selected as the uncured liquid soft elastomers that could cure in contact with the neighboring voxels 12, 12', 12". The functionality of bonding agents 14 is to connect neighboring voxels 12, 12', 12" and integrate them to form a synthetic 3D magnetic machine 10. In this work, we employed two approaches to apply the bonding agents 14:

The selected bonding agent 14 was applied to the entire area of a face 18 of a voxel 12, 12', 12". Then, a second voxel 12, 12', 12" was brought to the vicinity of the first voxel 12, 12', 12" and aligned in a way such that the bonding agent 14 was in the middle of two faces 18. The two voxels 12, 12', 12" were moved towards each other until contact happened. The bonding agent 14 cured between the faces 18 of two voxels 12, 12', 12" and integrated them into a synthetic piece. The connection formed by this approach is symmetric, meaning that it does not have a direction preference in bending. The connected voxels 12, 12', 12" form a continuous soft body without explicit joints. A special case of face bonding is that the two faces 18 form an acute angle, instead of being parallel with each other. The bonding agent 14 not only connects the neighboring voxels 12, 12', 12" but also functions as a voxel 12, 12', 12" and complements the geometry of the final machine by itself. This situation happens when a voxel 12, 12', 12" made of the same elastomer of the bonding agent 14 is needed at the joint position but it is too small to be effectively fabricated and assembled.

To create asymmetric connections, the bonding agent 14 was applied at the side of the contacting faces 18 of two neighboring voxels 12, 12', 12". With no bonding agent 14 between their contacting faces 18, the two adjacent voxels 12, 12', 12" can easily disengage from each other once an appropriate torque is present. However, the bonding agent 14 applied at the edge 20, where two or more faces meet, fixes the voxels 12, 12', 12" at one side, breaking the bending symmetry by making it much easier for the joint to open from the opposite side to the bonding agent 14. Thus, the voxels 12, 12', 12" disengage and the joint opens when a torque in the preferred direction is applied, while the voxels 12, 12', 12" compress into each other and joint remains closed when the torque direction reverses. An opening joint allows a large deformation to be achieved using a relatively small torque. In contrast, a closed joint forces the whole soft body to bend and therefore makes the bending much more difficult, resulting in smaller deformations under the same torque amplitude.

The two bonding approaches were selected case-by-case for each connection between voxels with considerations of the desired shape-morphing behavior at the specific connection in the given machine. Most machines utilized both approaches in their fabrication processes.

This means that the bonding agent 14, like the voxels 12, 12', 12" can contribute to the deformation characteristics of the machine. By placing appropriate bonding agents 14 at predefined positions besides specific voxels 12, 12', 12", hinge like features can be introduced into the magnetic machine 10 about which and relative to which the magnetic machine 10 can deform. As indicated e.g. in FIG. 1*d* on application of a magnetic field the lower image shows a magnetic machine 10 deformed in comparison to that shown in the upper image. The deformation is possible because the relatively soft material voxels 12, 12', 12" enable a flexion of the magnetic machine 10 relative to the relatively hard voxels 12, 12', 12", by moving the magnetized—generally speaking harder—voxels 12, 12', 12", relative to the unmagnetized—generally speaking softer—voxels 12, 12', 12".

In this connection it should be noted that the relatively soft material voxels 12, 12', 12" have a Young's modulus which is less than a Young's of the relatively hard material. It should further be noted that a Young's modulus of the relatively soft material is typically selected to be at least 5 kPa less than a Young's modulus of the relatively hard material.

After the fabrication, the prototype magnetic machines 10 were placed inside their designated test setup, such as inside a circular tube, and observed with an optical microscope. A handhold permanent magnet (Neodymium, N42, nickel-plated, Supermagnete) was used to produce a magnetic field vector in arbitrary 3D directions within the workspace. The observed sample deformation and motion were captured with a video camera (Point Grey Research Inc.) and a high-speed camera (Phantom Cinemag II v641). Each sample was tested reversibly multiple times without any observable signs of performance deterioration.

In this work, the heterogeneous integration of voxels was performed manually with tweezers under a stereomicroscope. While providing great flexibility and versatility, manual operation limits the efficiency and repeatability of the fabricated machines, which further prevents voxels of dimensional values smaller than 35 μm to be effectively utilized. It is desired to replace the manual fabrication process with teleoperated or automated micromanipulators in the future for higher accuracy, repeatability, and speed. To validate the feasibility of this research direction, a preliminary demonstration of assembling four 100 μm side-length cubic magnetic voxels into a checkerboard pattern using two teleoperated micromanipulators was demonstrated.

The shrinking process of the ring (see e.g. FIG. 1*c*) was investigated in a vibrating sample magnetometer (VSM, EZ7, Microsense), which can provide a uniform magnetic field $\vec{B}_c$. The ring was placed on the water surface so as to realize an inplane deformation. The results shown in FIG. 6 demonstrate a nonlinear relationship between the external magnetic field and the deformation, quantified with the normalized area (FIG. 6*c*), which is the ratio between the current and the original enclosed area. α joint was designed to have a smaller bending stiffness than β joint and initiated the deformation of the ring (FIG. 6*b*). The bending of both α and β joints reduced the circumference of the ring, inducing shrinkage in all directions.

The Ecoflex 0050 used to build the cubic frame guarantees a large deformation of the device, which can be shown through the simulation results in FIG. 7*a*. Here we used the neo-Hookean model to model the strain-stress relationship of the material. Three materials used in the paper, i.e., Ecoflex 0050 (shear modulus: 27.6 kPa, bulk modulus: 2 GPa), Dragon skin 0030 (shear modulus: 197.6 kPa, bulk modulus: 2 GPa), and PDMS (shear modulus: 290 kPa, bulk modulus: 1 GPa) were chosen to be compared. At the uniform magnetic field, each voxel 12, 12', 12" of the frame is assumed to tend to align with the applied field by a torque, which is further decoupled into force acting on the voxel boundary surfaces. Only the cubic frame made of Ecoflex 0050 shows significant shrink under the magnetic field of 200 mT. The cubic frame has a non-zero net magnetic moment. As a result, it can be rolled on a surface in a rotating magnetic field. With a hollow inner space and the 3D metamaterial characteristics, the machine 10 was controlled to grasp a cargo, roll around for transporting, and release it at a target location (FIG. 7b).

The influence of patterning voxels 12, 12', 12" with different material properties (see FIG. 8a) on flower pedal bending can be further analyzed through simulation. $\vec{B}_c$ was applied downwards in the simulation, which would not initiate the bending since the magnetization direction of the petals was set to align vertically and no torque would act on it at the beginning. Therefore, a small disturbance was introduced to start the bending process. FIG. 8b shows the simulation results of the softer and stiffer petals under the magnetic field of 40 mT, which demonstrates that the effective bending stiffness of the whole structure of the magnetic machine can be tuned by patterning voxels made of different materials.

The tubular soft peristaltic pump designed as a magnetic machine 10 relies on the continuous phase change of $\vec{m}_v$ across its stacked rings. The value of this phase change was selected as 10° to balance the smoothness of the traveling wave-based shape deformation and the amount of stacks required to create observable pumping effects. A larger phase change angle (e.g., 20°) would discretize the deformation further, while a smaller angle value (e.g., 5°) would require a bigger number of stacked rings to generate a traveling wave-like deformation for pumping liquids and transporting solids. In the presence of $\vec{B}_c$, each ring assumes a different deformation profile that is decided by the relative angle between its $\vec{m}_v$ and the global $\vec{B}_c$. When $\vec{B}_c$ rotates, this angle of any specific ring varies continuously and induce periodic deformation of that ring. As a result, the traveling wave-based shape deformation of the tubular machine 10 propagates along its axial direction, whose propagation direction is determined by the rotating direction of $\vec{B}_c$. The side and top profiles of the peristaltic pump in a rotating $\vec{B}_c$ are shown in FIG. 9a.

To characterize how much $\vec{B}_c$ magnitude and $\vec{B}_c$ spatial gradient ($\nabla \vec{B}_c$) are needed to eject the dummy liquid drug 16 loaded inside the miniature capsule 10, an experiment was conducted and shown in FIG. 10. A full analysis of this critical value requires a detailed investigation in the magnetic deformation of the miniature capsule, the sealing of the orifice (since Ecoflex Gel adheres to itself), the properties of the loaden fluid, and the fluid around the capsule. In the scope of this work, one only focused on varying the viscosity of the liquid inside the capsule while keeping everything else constant. Specifically, the same capsule was pre-filled with food dye (we assume the viscosity is similar to water, viscosity≈8.955×10$^{-7}$ m$^2$/s at 25° C.), food dye/glycerol solution at 1:1 ratio (viscosity≈6.018×10$^{-6}$ m$^2$/s at 25° C.), and pure glycerol (viscosity≈7.201×10$^{-4}$ m$^2$/s at 25° C.). Then, the capsule was placed inside a fluid tank and a permanent magnet was used to approach it while recording down the critical $|\vec{B}_c|$ and $|\nabla \vec{B}_c|$ required to squeeze out the liquid inside. As the result shows in FIG. 10, it requires larger $|\vec{B}_c|$ and $|\nabla \vec{B}_c|$ to release a liquid drug with a higher viscosity.

To characterize the shrinking performance of the surface anchoring device, an experiment was conducted to find the relation between $\vec{B}_c$ and the normalized area. The anchoring device 10 was placed in a glass tube with an inner diameter of 1.62 mm, which is the same as the one used in FIG. 4c.

A VSM was used to apply the uniform $\vec{B}_c$. Different from the shrinking process of the shrinkable ring floating on the water surface, the shrinkage of the anchoring device 10 has a critical $|\vec{B}_c|$ (about 150 mT), surpassing it increases the shrinkage speed significantly (FIG. 11a). This observation may be caused by the constraint of the inner tube wall and the adhesion between the inner tube wall and the outer surface of the anchoring device. $|\vec{B}_c|$ eventually saturated (about 220 mT) so that the device 10 would not shrink more even with a larger $|\vec{B}_c|$. At this stage, the device 10 would not fully restore to its original configuration after switching off $\vec{B}_c$, and significant out-of-plane deformations of each ring were observed (first row in FIG. 11b). To recover the device 10 to its initial configuration, one can simply apply $\vec{B}_c$ with small amplitudes repeatedly from varying directions. The second row of FIG. 11b shows one feasible path to restore the device.

In summary, a number of functional miniature magnetic soft machines 10 have been presented that are difficult to fabricate using existing fabrication techniques. Thanks to the bottom-up nature of the proposed heterogeneous precision assembly-based fabrication strategy, the constituent materials, 3D geometries, and 3D magnetization profiles of these soft machines 10 are fully decoupled from each other and can be individually and independently designed. In contrast, the previously reported 3D printing-based methods suffer from the severe limitations to the design space posed by the rheological properties, local magnetic interactions between MMPs, and the layer-by-layer approach.

The presented strategy can incorporate multiple materials at high resolutions (down to 35 μm along each dimension) as an advantage compared with extrusion- and UV lithography-based techniques. The presented devices 10 extend the search space of wireless magnetic soft machines 10 by enabling sophisticated 3D designs, enriching the repertoire of advanced functionalities required in real-world medical and other potential applications. The current employed manual assembly process limits the achievable maximum device prototyping speed, resolution, and precision, which could be further improved by using teleoperated or automatic micromanipulation systems (see Methods section). While two MMPs, i.e., NdFeB and cobalt, were used in this work, other magnetic hard or soft micro- and nanoparticles can be selected to better accommodate specific application requirements. For example, biocompatible and biodegradable magnetic particles, such as iron oxide nanoparticles, can be used in future in-vivo medical applications.

FIG. 8 shows the design and fabrication of the flower-shaped machine 10. This machine 10 showcases the stiffness distribution enabled by the versatility of the proposed fabrication method. The flower shaped machine 10 was made of 127 magnetic voxels 12. The central hexagonal voxel 12 and 51 magnetic voxels 12 were made of PDMS (Sylgard 184, Dow Corning, base and curing agents mixed at 10:1 mass ratio) with embedded MMPs (NdFeB, MQP-15-7, Magnequench) at 1:1 mass ratio. The remaining 75 voxels 12 were made of Ecoflex 50 (Smooth-On, part A and B mixed at 1:1 mass ratio) with embedded MMPs (NdFeB, MQP-15-7, Magnequench) at 1:1 mass ratio. The measured Young's modulus of these two kinds of voxels 12 are 0.96 MPa and 98 kPa, respectively.

The batch-fabricated voxels 12 were magnetized in a uniform 1.8 T magnetic field generated by a VSM (Microsense EZ7) in a jig 112 for magnetization. The resultant magnetization of the voxels 12 are calculated to be 78 kA/m for PDMS-based voxels 12 and 80 kA/m for Ecoflex 50-based voxels 12, based on the MMPs' density (7.61 g/cm3 provided by the manufacturer, NdFeB, MQP-15-7, Magnequench), the polymer density (1.07 g/mL provided by the manufacturer, Ecoflex 0050, Smooth-On; 1.03 g/mL provided by the manufacturer, Sylgard 184, Dow Corning), and the remanent magnetization of the MMPs (FIG. S1). With the above design and voxel configurations, simulation shows that the machine 10 does deform towards desired shape, and patterning voxels 12 with different material properties does change the overall bending stiffness (FIG. 8b).

Figure 8C:
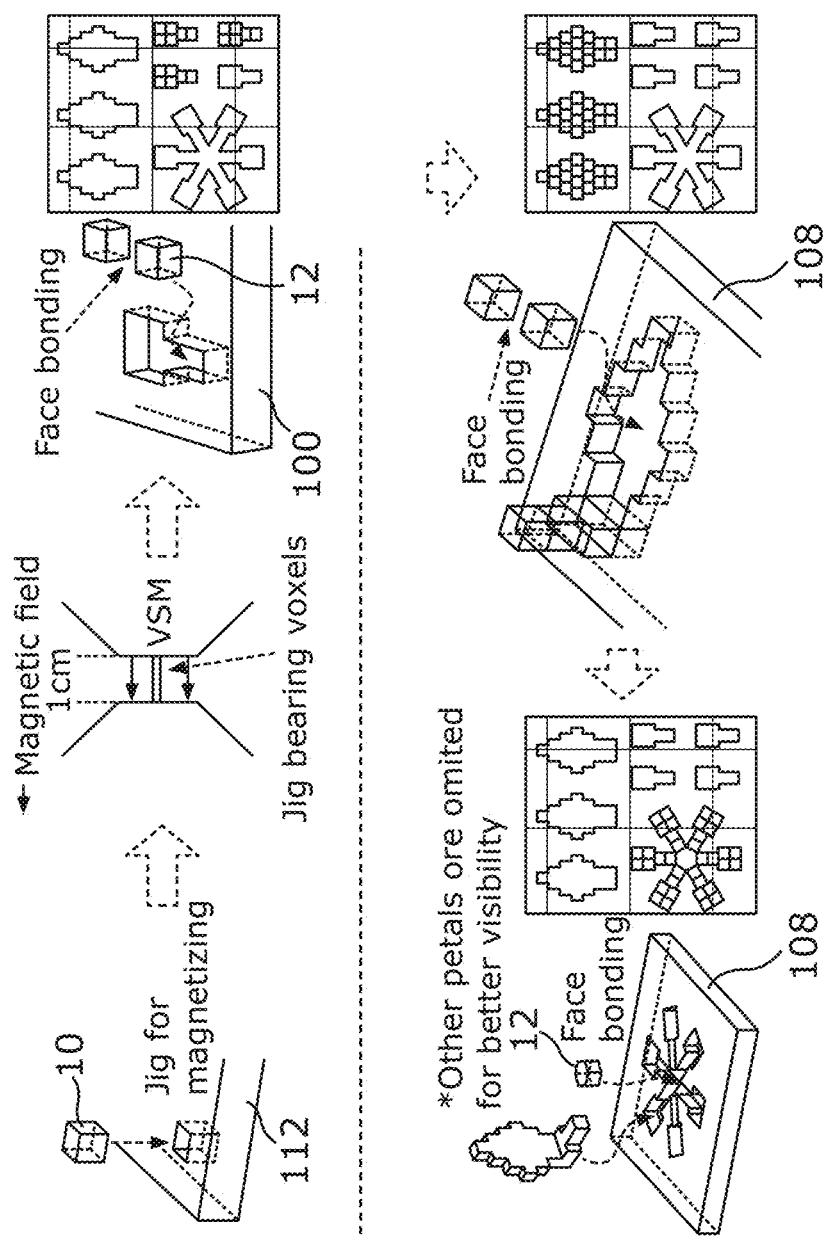

In FIG. 8c, the designs of the assistant jigs 100, 108, 112 and their respective functionalities are schematically illustrated, together with a sketch of its assembly process. Initially the voxels 12 are magnetized in the jig 112 for magnetization, then the individual voxels 12 are placed in a jig and are face bonded using uncured silicone (Ecoflex 0050, Smooth-On, part A and B mixed at 1:1 mass ratio) as the bonding agent 14 to form a part of the flower-shaped machine 10.

Magnetic voxels are magnetized using a vibrating sample magnetometer (VSM) in a magnetic field of strength >1 T. For this purpose a handheld permanent magnet (cube magnet 12 mm, Neodymium, N48, nickel-plated, Webcraft GmbH) was brought near the sample to exert the desired magnetic fields along the vertical direction. This process is only carried out once for a magnetization of the voxels. This process is only repeated if the magnetic orientation of the voxels is to be reprogrammed.

In comparison to this Permanent magnets may be used to induce shape-morphing of the devices 10. The magnetic field generated by the magnets are within a range of 0-300 mT. This magnetic field is not intended to, and also not able to, change the magnetization of the device. Instead, this field exerts distributed magnetic torques on the device 10 and cause deformation thereof.

Once the parts have been assembled these can be placed in the jig 108 for forming components of the flower-shaped machine 10. Following this and similar to the embodiment shown in FIG. 1e, the components can be assembled in a jig 108 and bonded one to another in order to form the flower-shaped machine 10.

Figure 12A:
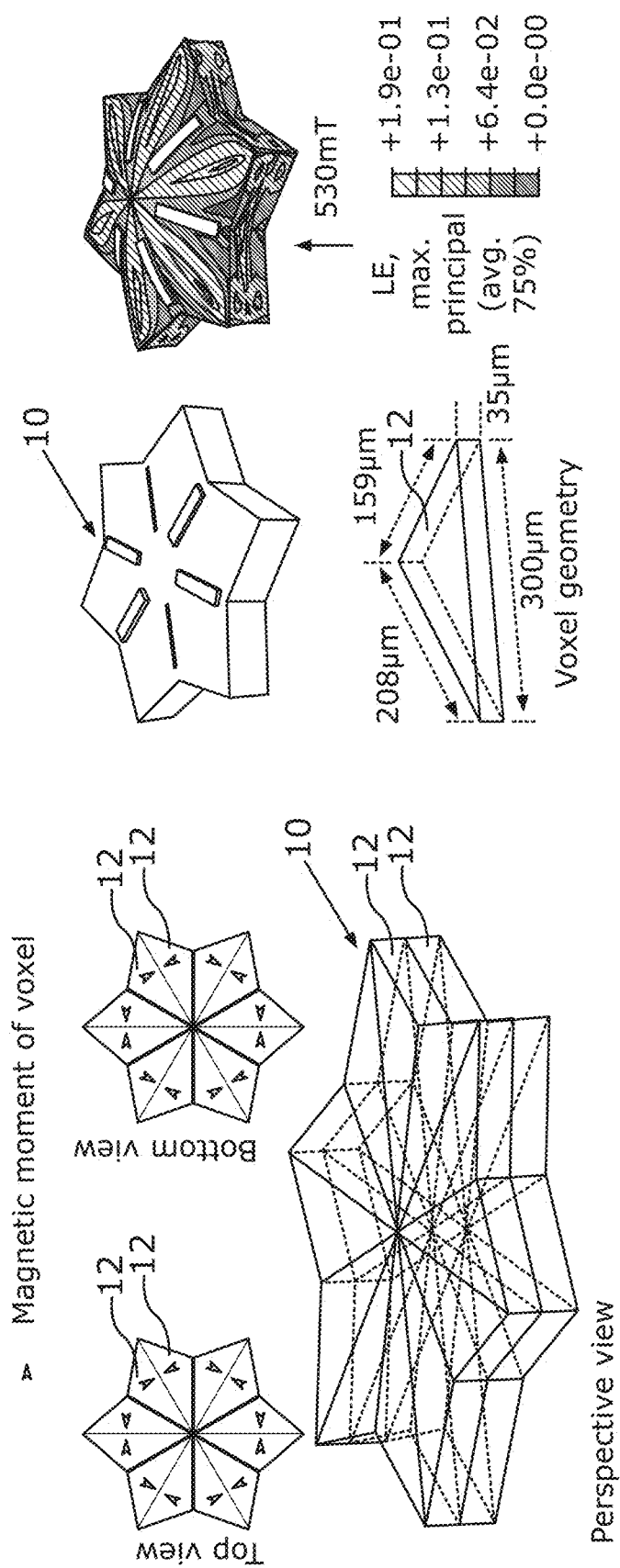

FIG. 12a shows the design of the starfish-shaped machine 10. This machine 10 showcases that the edge bonding technique breaks the bending symmetry and causes directional joint bending. It was made of 24 identical triangular flat magnetic voxels 12. PDMS (Sylgard 184, Dow Corning, base and curing agents mixed at 10:1 mass ratio) was employed as the base polymer and MMPs (NdFeB, MQP-15-7, Magnequenchs) were uniformly mixed into the polymer at a mass ratio of 1:3.

The voxels 12 were batch-fabricated via the mold-casting technique. The fabricated voxels 12 were magnetized in a uniform 1.8 T magnetic field generated by a VSM (Microsense EZ7). The resultant magnetization of the voxels 12 are calculated to be 188 kA/m, based on the MMPs' density, the polymer density, and the remanent magnetization of the MMPs. With the above design and voxel configurations, simulation shows that the machine does deform towards desired shape (FIG. 12a).

Figure 12B:
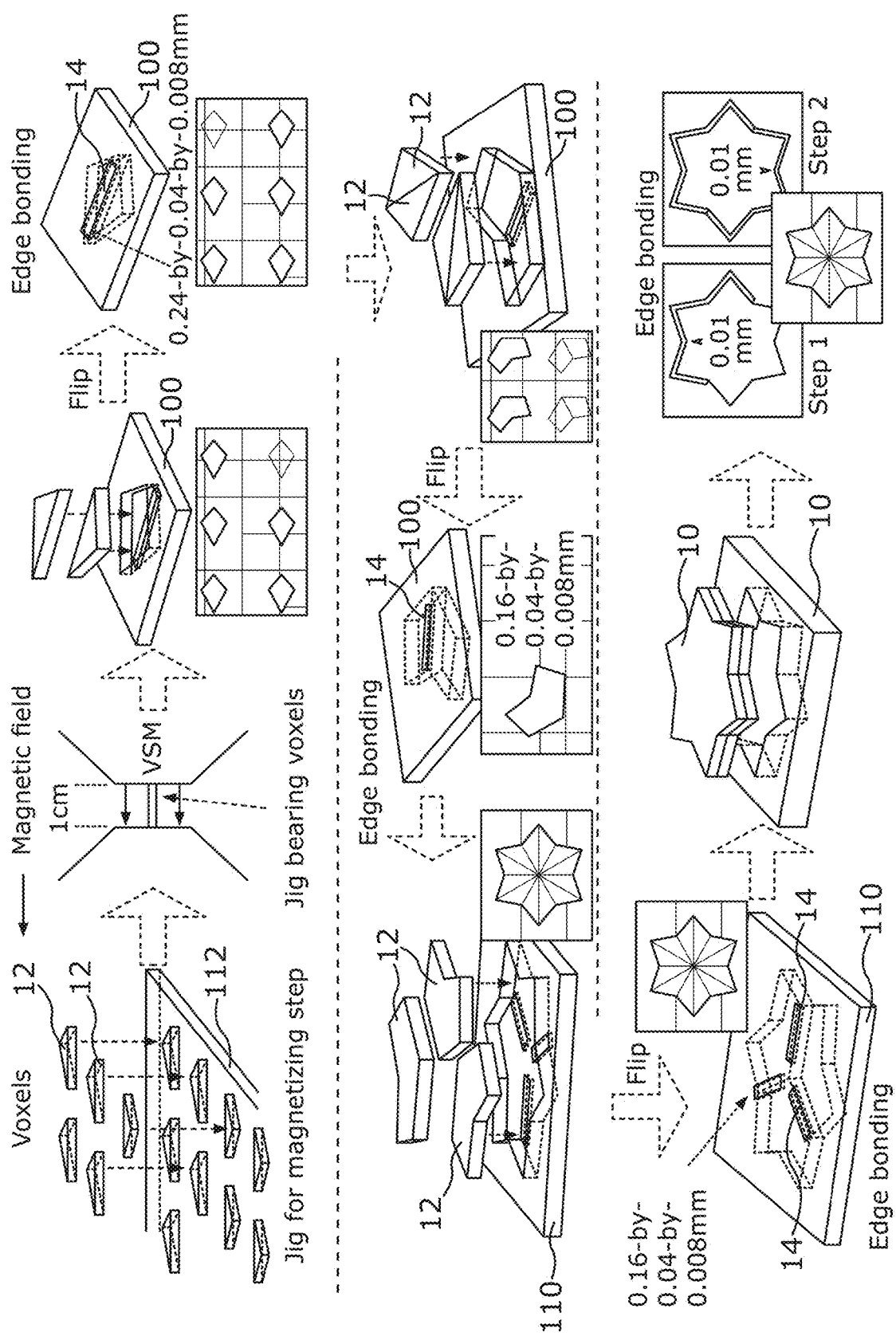

In FIG. 12b, the designs of the assistant jigs 100, 110 and their respective functionalities are schematically illustrated, together with a sketch of its assembly process. The jig 112 having a triangular shape for the individual voxels 12 of the star-fish shaped machine 10, The jig 100 being used to connect two of the triangular shaped voxels 12 one to another using a bonding agent 14. The magnetic voxels 12 were edge bonded using uncured silicone (Ecoflex 0010, Smooth-On, part A and B mixed at 1:1 mass ratio) as the bonding agent 14.

A further jig 100 can then be used to connect two of the already connected triangular shaped voxels 12 one to another using a bonding agent 14. Finally the parts of the starfish shaped machine are assembled in the jig forming a negative mold of the starfish shaped machine so that the individual parts can once again be bonded one to another using a bonding agent 14.

A handheld permanent magnet (cube magnet 12 mm, Neodymium, N48, nickelplated, Webcraft GmbH) was brought near the sample to exert the desired magnetic field of 500 mT along the vertical direction.

FIGS. 13a and 13b show the design and fabrication of the capsule-shaped machine 10. This machine 10 achieves its functionality via a reconfigurable magnetization profile, which is enabled by the flexibility of the proposed method to work with different MMPs. The machine 10 has two magnetic parts, one of which contains NdFeB (MQP-15-7, Magnequench, coercivity value=6120 Oe), and the other one contains Cobalt (Sigma-Aldrich, average diameter of 2 µm, coercivity value=209 Oe). The machine 10 was made of 2 magnetic and 2 nonmagnetic voxels 12, 12'. The 2 magnetic voxels 12 were geometrically identical. One voxel 12 was made of PDMS (Sylgard 184, Dow Corning, base and curing agents mixed at 10:1 mass ratio) mixed with NdFeB at 1:3 mass ratio. The other voxel 12 was made of PDMS mixed with Cobalt at 1:1 mass ratio.

Both magnetic voxels 12 were magnetized in a 1.8 T uniform magnetic field generated by a VSM (EZ7, Microsense) in the magnetizing jig 112 having a negative shape of the magnetic voxels 12. The theoretical resultant magnetization of the two magnetic voxels 12 are 188 kA/m (NdFeB) and 10 kA/m (Cobalt), respectively.

The theoretical values were calculated based on the MMPs' density, the polymer density, and the remanent magnetization of the MMPs.

In FIG. 13b, the designs of the assistant jigs 112, 110 and their respective functionalities are schematically illustrated, together with a sketch of the assembly process of this machine 10.

The jigs 112, 110 like for the jigs 100, 108, 110, 112 of the other embodiments having a respective negative shape of the voxel 12, part or component of the respective machine 10 that is currently being formed.

The 2 nonmagnetic voxels 12' were face bonded with the magnetic voxels 12 using uncured PDMS (Sylgard 184, Dow Corning, base and curing agents mixed at 10:1 mass ratio) as the bonding agent 14. The two magnetic voxels were edge bonded using uncured silicone (Ecoflex 0010, Smooth-On, part A and B mixed at 1:1 mass ratio) as the bonding agent 14.

In the scenario when a different chamber size is desired while the overall machine size cannot be altered, the strength of the magnetic attraction/repulsion could be maintained via increasing the MMPs' concentration, which leads to stronger magnetic moment. In addition, the geometry of the device 10 could also be altered to increase or decrease the contact area between the two body parts and therefore to tune the strength of the magnetic interaction. Taking the current design as an example, using a square cross section, instead of the current circular one, will offer a 28% boost in the contact area. Alternatively, if we change the design to make the capsule open longitudinally, instead of transversally, there will be a 94% increase in the contact area. Overall, there are multiple ways of enlarging the chamber size, for the sake of increasing the dosage per capsule, while not sacrificing the magnetic strength of the capsule, thanks to the flexibility of the proposed method.

In the reported experiment, the capillary effect and the hydrophobicity of the materials played a negligible role in the performance. If, in future configurations, these factors become more important, negative effects could be overcome if they emerge in the testing stage using one or more strategies enabled by the versatility of the proposed method. For example, with a longitudinal opening instead of a transversal one, the device will be less affected by the capillary effect, and the material exchange between its chamber and the environment will be easier. Again, the versatility of the proposed fabrication method grants users with much more freedom in designing the device and makes it easier to find custom designs suitable for specific tasks. The hydrophobicity of the silicone rubbers used in this device could be altered by surface treating techniques, such as plasma treatment. Should biological fluids need to be retrieved from the body instead of drug delivery, preloading the cargo area with cotton or tissues in addition to plasma treating the silicon rubber would also help.

In the reported experiment, the proposed capsule-shape machine was re-magnetized by a pulsing magnetic field that was vertically applied. The pulsing magnetic field was generated by a custom-made electromagnetic coil systems made of 18 turns of 1 mm diameter copper coil. Each turn has a diameter of 19 mm. A cylindrical soft iron (16 mm diameter, 3 cm length) was placed inside the coil system to enhance the field strength. The coil system and the iron cylinder were aligned at one end. A 4.3 mF capacitor charged to 180 V was connected to the electromagnetic coil system, resulting in a pulsing magnetic field with a peak magnitude of 295 mT that decays to half of its peak value in 1.33 ms. In the reported experiment, the sample was not fixed and free to move when the field was applied. The pulsing magnetic field was first applied vertically. Then, a vertical magnetic field, created by a handheld permanent magnet, was applied before the pulsing magnetic field to align the sample vertically. This specific pose made the magnetic direction of the NdFeB part to be the same with the subsequent pulsing magnetic field, in order to stabilize the sample during the re-magnetization.

The direction of the pulsing magnetic field is fixed by the physical setup, which often cannot be easily changed in real time. Thus, an aligning action prior to re-magnetization has been widely utilized in the re-magnetizing studies reported so far to bring the sample to the desired orientation as a more cost-effective option, instead of changing the setup to create a pulsing field that fits the current sample orientation. The sample orientation decides what the magnetic direction of the Cobalt part is after re-magnetization and further the final magnetization profile. In realistic scenarios, another magnetic field (weaker and slower than the pulsing one) is often used to manipulate the location and orientation of the sample in its workspace, because the wireless controllability is often also desired besides the re-configurable magnetization profile for realistic applications. This controlling magnetic field could easily be used to perform this aligning action.

The pulsing magnetic field was strong and fast enough to reverse the magnetic direction of the Cobalt part even when the machine was not mechanically fixed.

When the pulse was applied, the alignment between the magnetic field and the NdFeB part provided a stabilizing force which held the device in place, while the Cobalt part was being re-magnetized. Even in the cases when the pulsing magnetic field was intentionally slowed down, the sample will not fly away because the NdFeB part is magnetically stronger than the Cobalt part. Instead, the Cobalt part will be twisted to align to the applied magnetic field, which still opens the capsule.

Figure 14A:
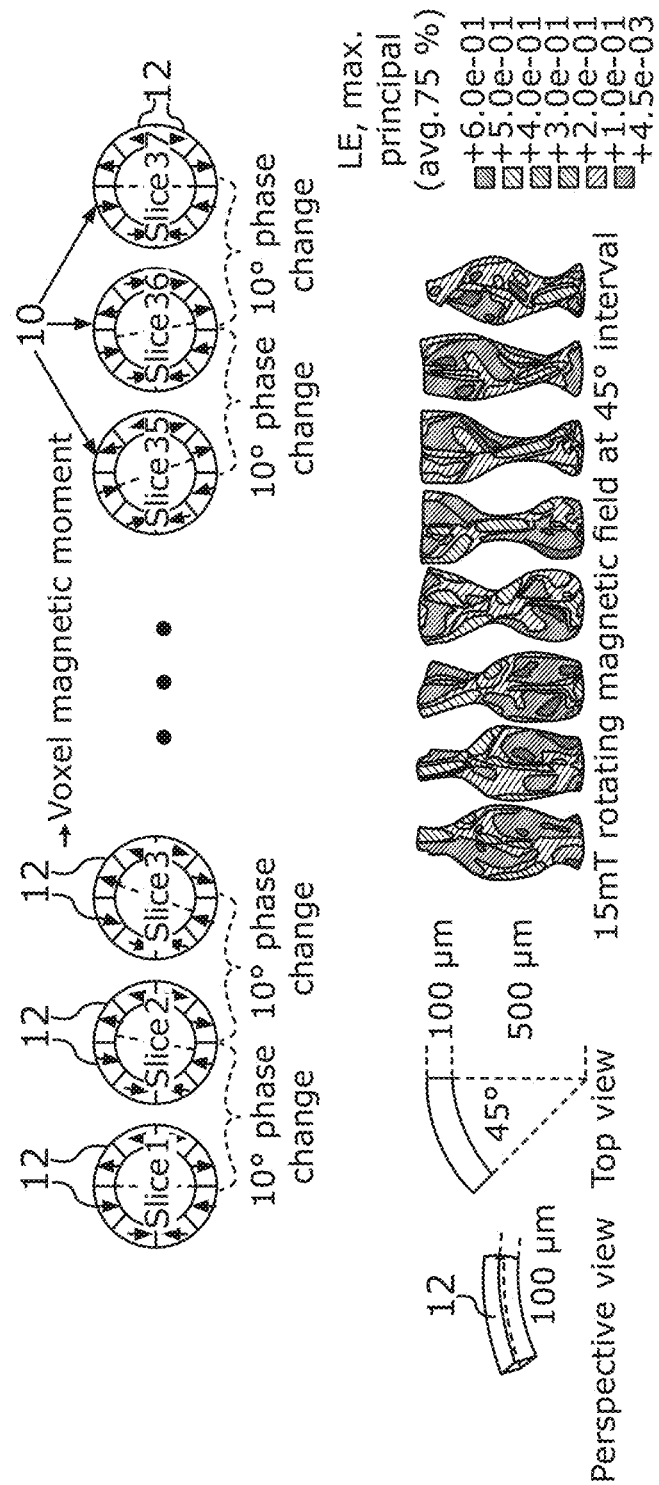

FIG. 14a shows the design of a peristaltic pump. This machine exhibits the functionalities of pumping both liquid and solid small-scale objects using a continuously spatiotemporal varying deformation formed on its body in response to a rotating $\vec{B}_c$. The pump was made of 296 geometrically identical magnetic voxels 12 based on an elastic polymer (Ecoflex Gel, Smooth-On, part A and B mixed at 1:1 mass ratio) with embedded MMPs (NdFeB, MQP-15-7, Magnequench) at a mass ratio of 1:1. The voxels 12 were batch-fabricated using the mold-casting technique. Then the voxels 12 were placed inside an assistant jig 112 for the magnetizing step, which fixed the orientation of each voxel 12 within the VSM (EZ7, Microsense). The VSM generated a 1.8 T magnetic field that magnetized the voxels 12, resulting in a theoretical magnetization value of 74 kA/m. This value was calculated by the polymer density (0.98 g/cm3 provided by the manufacturer, Smooth-On) and the MMPs' density (7.61 g/cm3 provided by the manufacturer, NdFeB, MQP-15-7, Magnequench), in conjunction with the remanent magnetization measured of NdFeB (FIG. S1) after being magnetized at 1.8 T.

Figure 14B:
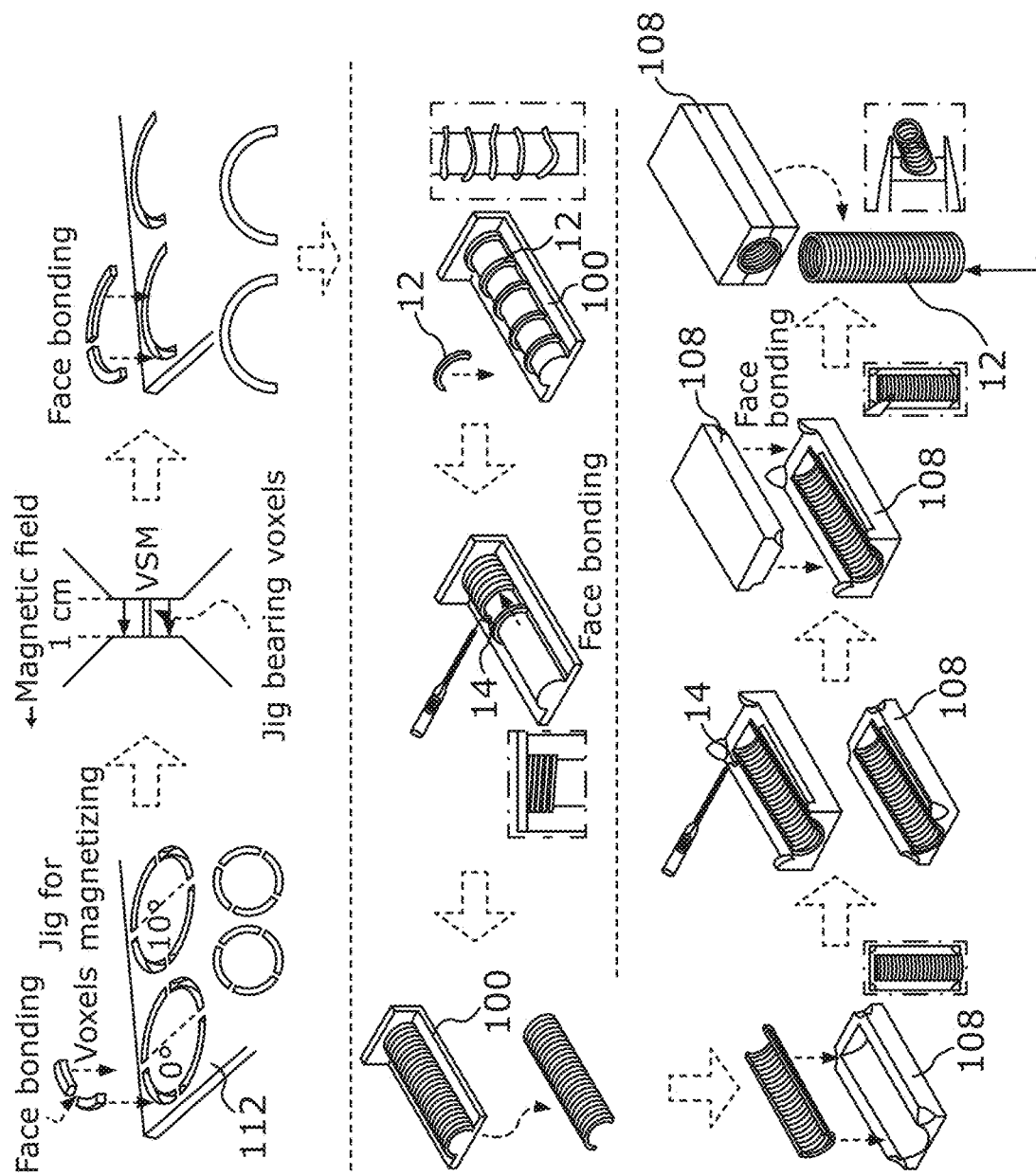

In FIG. 14b, the designs of the assistant jigs 100, 112, 108 and the assembly process are schematically illustrated. Face bonding method was employed to connect neighboring voxels 12 together, with uncured polymer (Ecoflex Gel, Smooth-On, part A and B mixed at 1:1 mass ratio) as the bonding agent 14. Initially individual voxels having a semicircular outer shape are assembled on the jig 100 and face bonded one to another to form a half of a hollow cylinder. This process is repeated to form second half hollow cylinder. Following which the two halve hollow cylinders are placed in a jig 108 and bonded one to another using a bonding agent 14 in order to form the machine 10.

A rotating uniform magnetic field $\vec{B}_c$ was used to activate the proposed peristaltic pump, which was created by a custom-made Halbach cylinder. This cylinder was mounted on a stepping motor (MOONS') that drove the cylinder to rotate with respect to its central axis, causing $\vec{B}_c$ to rotate. The motor was driven by a motor driver (EasyDriver by Brian Schmalz) controlled by a microcontroller (Arduino UNO), which regulated its rotating speed and direction. This setup was powered by a power supply (EX355P-USB, Aim-TTi).

As illustrated in FIGS. 12 to 15 various Jigs 100, 108, 110 and 112 can be used to magnetize voxels 12, to connect voxels 12, 12', 12" one to another in a pre-defined orientation with a bonding agent 14 to form parts and/or components of the machine and to finally assemble the machine from a plurality of the parts and/or components in the desired orientation.

The respective voxels 12, 12', 12" may be magnetized prior to being bonded to its neighbouring voxel 12, 12', 12", while being bonded to its neighbouring voxel 12, 12', 12", or after having been bonded to its neighbouring voxel 12, 12', 12". The step of bonding the plurality of voxels 12, 12', 12" one to another may comprise the step of providing a jig 100, 108, 110, 112 having a negative shape of at least a part of the magnetic deformable machine 10 and placing a pre-defined amount of the plurality of voxels 12, 12', 12" into said jig 100, 108, 110, 112 and then bonding the pre-defined amount of the plurality of voxels 12, 12', 12" in said jig 100, 108, 110, 112.

One or more of the pre-defined amount of the plurality of voxels 12, 12', 12" may be placed into the jig 100, 108, 110, 112 at one point in time by means of a robot (not shown). The robot may be a pick and place robot adapted to grip the respective voxel 12, 12', 12" from a supply container and to place the respective voxel 12, 12', 12" in one of the jigs 100, 108, 110, 112. Following the step of bonding the robot can then grip the part or component of the machine and transport this to a further jig 100, 108, 110, 112 for forming the machine 10 or a further part or component of the machine 10 etc.

One or more of the pre-defined amount of the plurality of voxels 12, 12', 12" may be magnetized prior to being placed into said jig 100, 108, 110, 112, or after having been placed into said jig 100, 108, 110, 112 and having been bonded to its neighbouring voxels 12, 12', 12".

As the fundamental building blocks, voxels 12, 12', 12" of various magnetic and non-magnetic materials and shapes can be fabricated by casting uncured polymer with optional magnetic microparticles (MMPs) into reusable shape-defining negative molds. The voxels 12, 12', 12" were cured in batches in these molds. Prior to this step, positive molds with protruding features were designed in Solidworks (Dassault Systemes) and created using two-photon polymerization (TPP, Photonic Professional GT, Nanoscribe GmbH). TPP is used in the current study as it can create high-fidelity three-dimensional (3D) geometries for fast-prototyping and quick iterations. The photoresists IP-S and IP-Q (Nanoscribe GmbH) were used. Polydimethylsiloxane (PDMS, Sylgard 184, Dow Corning, base and curing agents mixed at 5:1 mass ratio) was cast to these positive molds to create negative molds with corresponding concave features. Vacuum degassing was performed in this step to remove any trapped air. These negative molds were silanized by Trichloro(1H,1H,2H,2H-perfluorooctyl)silane (PFOCTS, Merck KGaA) to facilitate crosslinking of the soft polymers and releasing of the voxels, and then used to fabricate voxels 12, 12', 12". All the molds could be used repeatedly to reduce costs and improve efficiency. This voxel fabrication process is schematically illustrated in FIG. 5a.

Figure 2C:
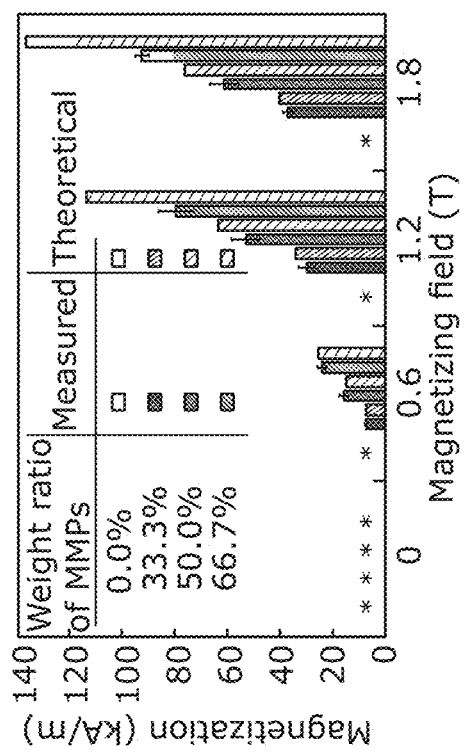

The molds can be fabricated via TPP and general photolithography techniques. However, since the molds are reusable and many voxels 12, 12', 12" can be fabricated in one molding process, it is unnecessary to fabricate batches of molds, while the iteration of the mold design is more critical. Additionally, it should be noted that creating complex 3D geometries is challenging for the photolithography technique. Therefore, it should only be considered as an option when a design is compatible. With the molds ready, the selected base materials were mixed with the selected magnetic microparticles (MMPs) or magnetic nanoparticles (MNPs), e.g., neodymium-iron-boron (NdFeB, MQP-15-7, Magnequench, average diameter of 5 μm), at a certain mass ratio, which could be tuned to achieve different magnetic moment strength (FIG. 2c). The materials discussed in the foregoing can be used to form the voxels 12, 12', 12". The fluidic mixture was cast on the negative molds and vacuum degassed to remove any trapped air. The excess mixture was removed using razor blades. The mixture within the molds cured into voxels with the designed geometric features. The curing temperature and time required by the polymer manuals were followed. These cured voxels 12, 12', 12" were then taken out by tweezers or needles from the molds for the next step.

Base materials used in this work include platinum-catalyzed silicone (Ecoflex series, including 0010-0050 and Gel), PDMS, urethane plastic, and gelatin. The strain-stress relationship of the materials used by these devices were characterized via tensile tests of samples according to ASTM D412 on a universal testing machine (Instron 5942, Instron, Norwood, MA). Besides the material selections, the geometric features of individual voxels could also be designed. FIG. 16c shows some example voxels 12, 12', 12" with a variety of geometries that we are able to fabricate. Being able to make various voxel geometries could potentially save time and cost in fabrication. The reasons are a) they can make better geometric profiles for a device 10, e.g., it is difficult to create a smooth surface using generic cubic voxels 12, 12', 12" for the peristaltic pump 10; and b) when feasible, a larger voxel 12, 12', 12" with non-generic geometries could replace a group of generic voxels 12, 12', 12" in a device to improve the fabrication efficiency, e.g., the employment of ring voxels 12, 12', 12" in the capsule 10 saves time in fabrication in comparison with the case of using a group of generic cubic voxels.

Figure 15C:
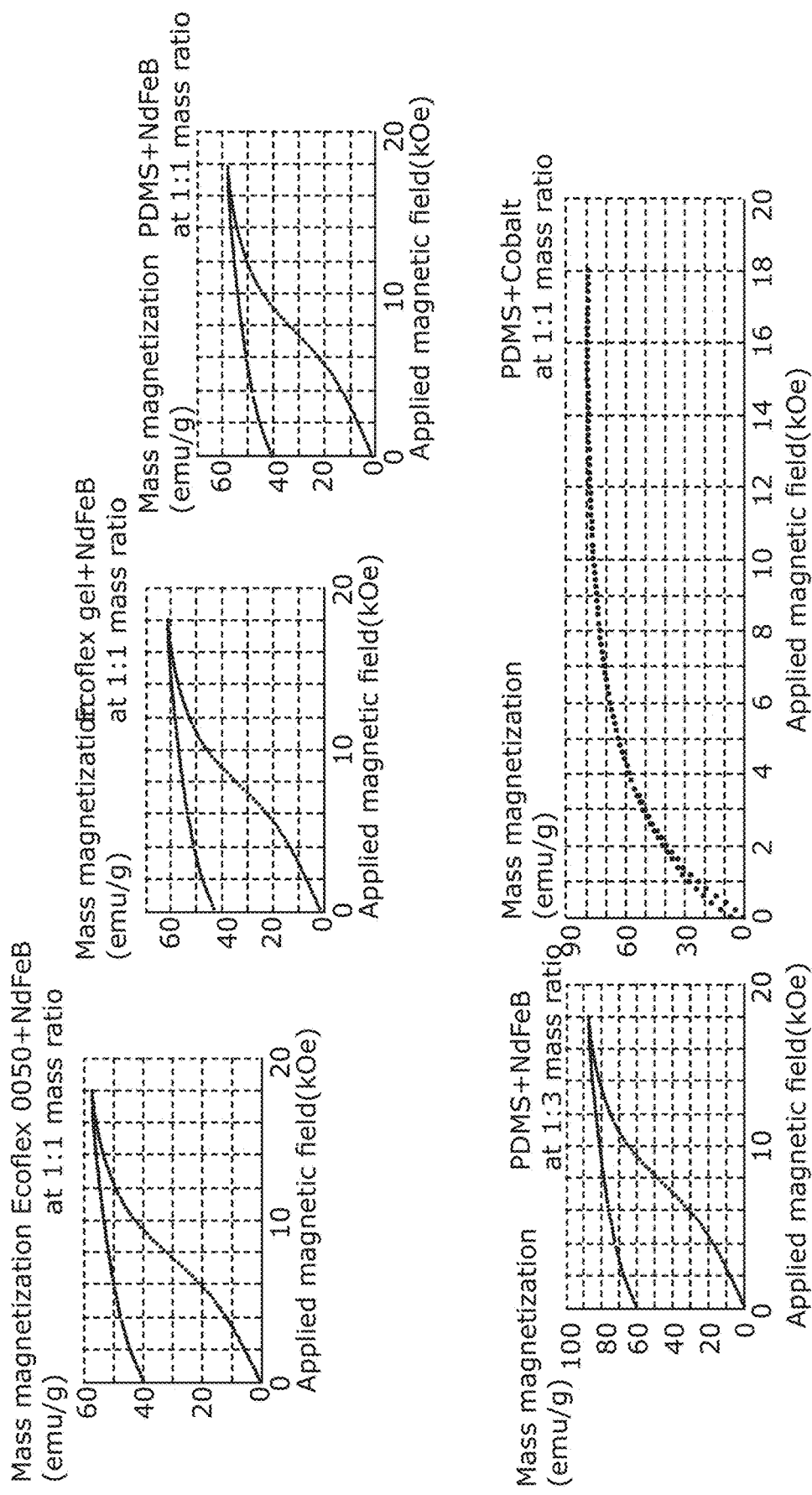

Magnetic voxels 12, 12', 12" were positioned at desired 3D orientations, with the help of assistant jigs, and magnetized by a vibrating sample magnetometer (VSM, EZ7, Microsense) to program voxel magnetic moments $\vec{m}_v$ with 3D strength and orientation (FIG. 5d). The magnetizing field had a strength of 1.8 T unless otherwise specified. Concurrently, the strength of $\vec{m}_v$ was controlled by the MMPs' concentration in the voxels as well as the strength of $\vec{B}_m$, which was accurately controlled via the graphic user interface of the VSM. Exemplary voxels 12, 12', 12" with different MMPs' concentration and magnetized along different directions were imaged in FIG. 15a. The magnetic properties of the bare MMPs were also experimentally measured (FIG. 15b).

The VSM created $\vec{B}_m$ within the gap between its two parallel circular plates, which were located 1 cm apart from each other. The direction of $\vec{B}_m$ was perpendicular to the circular plates, and its strength was controlled by the control terminal of the VSM. The voxels 12, 12', 12" were fixed to their corresponding orientations in a jig for magnetization 112. And the jig 112 was fixed to a cubic acrylic plate that is 1 cm wide. This cubic acrylic plate was clamped by the two circular plates of the VSM, leaving the voxels 12, 12', 12" located at the geometric center of the gap. $\vec{B}_m$ was then generated by the VSM to magnetize the voxels 12, 12', 12". The VSM was instructed to ramp up to the desired strength of $\vec{B}m$ at 0.2 T/s, stay at the desired strength (1.8 T for example) for 2 s, and then ramp down to 0 at −0.2 T/s.

The assistant jigs 112 could also fix the deformation of a voxel 12, 12', 12" or a group of voxels 12, 12', 12" in this step, to program a varying magnetization profile on the body of a voxel 12, 12', 12" or a group of voxels 12, 12', 12". In general, voxels were magnetized prior to being assembled together for the maximum fabrication versatility. But in some designs, a group of voxels 12, 12', 12" could be assembled first and then magnetized to improve the efficiency, such as the capsule in FIG. 13 and the anchoring device 10 in FIG. 11. The two approaches were both demonstrated using the exemplar 3D ring (FIG. 1).

Magnetic and non-magnetic voxels 12, 12', 12" were assembled together with the bonding agent 14 applied to connect neighboring voxels 12, 12', 12". Both the position and orientation of each voxel 12, 12', 12" were controlled in the assembly process using assistant jigs 100, 108, 110, 112, resulting in a 3D geometry and magnetization profile of the final machine 10. Such mechanical fixing helps to overcome the magnetic interaction between the voxels 100, 108, 110, 112.

Two approaches were employed, i.e., face bonding and edge bonding, to bond voxels 12, 12', 12" together to form synthetic 3D soft machines 10. Bonding agents 14 were used to form the inter-voxel bonds that fixe ach voxel 12, 12', 12" at its designated position. The bonding agents were selected as the uncured liquid soft elastomers that could cure in contact with the neighboring voxels. In the rare cases where such an appropriate elastomer is not available, mechanical interlocking structures could be applied. Various kinds of glues, such as universal glues and optical glues, could also be used as alternatives. The energy dissipation induced by the mechanical interlocking structures and the compatibility of various glues to the voxels 12, 12', 12" will need to be fully investigated in the future. Details of the fabrication process for all reported machines, including the material designs and the magnetizing field strength are discussed in the foregoing.

The assembly process was carried out under a stereomicroscope (ZEISS Stemi 508, Carl Zeiss Microscopy GmbH) with magnification value ranging between 6.3× and 50×. The zoom and focus of the microscope could be easily adjusted by two sets of rotary knobs symmetrically located at both its left and right sides. This microscope allows the user to quickly adjust the zoom and the focus of the field of view, which is especially useful when assembling 3D structures. Besides the microscope, tweezers (5-SA Outils Rubis S A, Switzerland) or iron needles (Agani 30G needles, Terumo) were used as the primary handheld tools to perform the assembly. The latter one is preferable in cases when the tweezer tip was too large for some voxels 12, 12', 12", such as the smallest voxels 12, 12', 12" reported in this study in cubic shapes with 35 µm side length. A 0.03 mm diameter copper wire was nested within a Seque/Pro capillary tip (Bio-Rad Laboratories) as a tool to apply the bonding agent 14 at the desired location to form face bonding or edge bonding. In addition, magnetized iron needles were occasionally used to distinguish the $\vec{m}_v$ direction of a voxel 12, 12', 12" during the operation. All the aforementioned instruments are low cost and easy to access for most people in academia and industry.

Assistant jigs 100, 108, 110, 112 were employed in the assembly step. The jigs 100, 108, 110, 112 provide guideline and reference for the fabrication and help fix the relative positions and orientations of the voxels 12, 12', 12" being worked on, which controls the fabrication precision and enhances its repeatability. These jigs 100, 108, 110, 112 could be used repeatedly after fabrication.

Figure 1E:
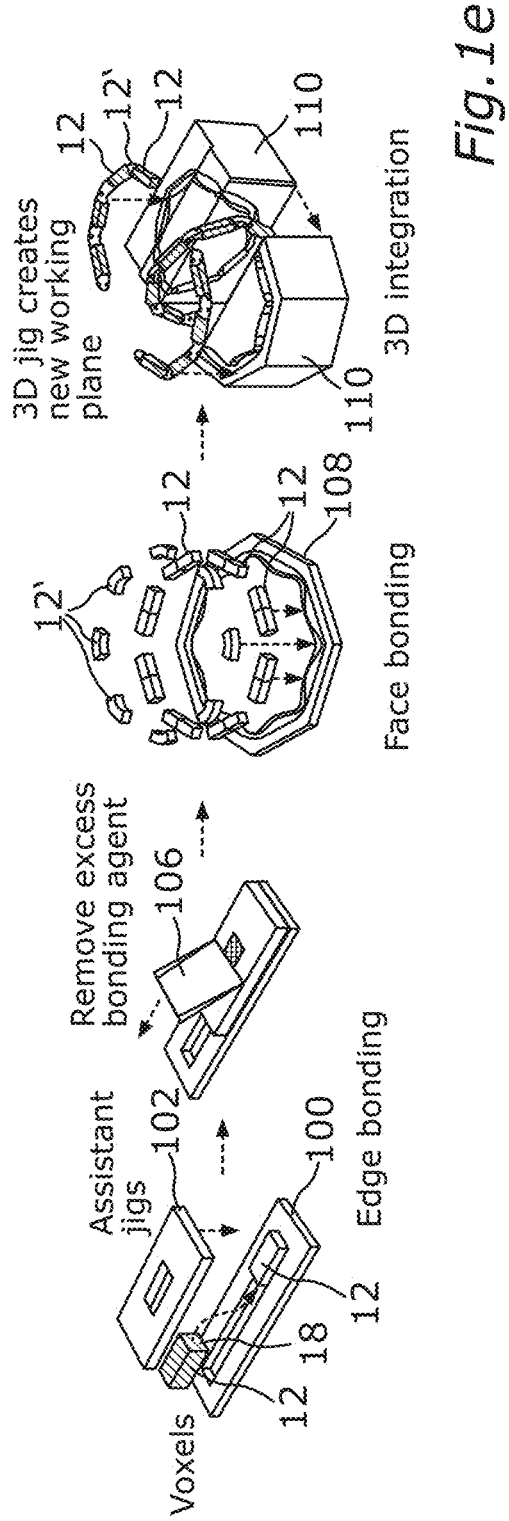

The jigs 100, 108, 110, 112 are either 2D or 3D. The 2D jigs are similar with the molds in the mold-casting step, with concave features that accommodate corresponding parts, such as the jigs used to assemble the ring (FIG. 1) or one layer of the peristaltic pump (FIGS. 9 & 15). Dimensions of the jigs 100, 108, 110, 112 were based on the designs of the parts made of multiple voxels 12, 12', 12". However, the size of the concave features should be designed to be slightly larger than the outline of the corresponding parts to make sure the parts can be freely inserted. The jigs 100, 108, 110, 112 were created via two-photon polymerization (TPP), i.e., 3D-microprinting, directly or mold-casting techniques. In the latter, the molds were made by casting PDMS (Sylgard 184, Dow Corning, base and curing agents mixed at 5:1 mass ratio) to the structures created by TPP to form negative molds. The 3D jigs have out-of-plane features to support the 3D parts by creating a new working plane (FIG. 1e). They were directly made via TPP with special objectives (10× and 25×, Nanoscribe GmbH) designed for printing relatively large features (compared with the traditional size-scale of TPP). These jigs 100, 108, 110, 112 were designed similarly with the scaffold for building construction. One typical example is the jig 100, 108, 110, 112 used to assemble the 3D ring (FIG. 1). The reported jig designs 100, 108, 110, 112 are by no means the only feasible ones. Jig designs, just like the machine 10 designs in this field, are mostly heuristically created and based on experiences as well as trial and error.

Face bonding was utilized to bring two voxels 12, 12', 12" together "face-to-face" with bonding agent 14 in the middle to form a continuous structure without explicit joints. The bonding interface plays a minimum role in affecting the shape-morphing behavior of the device 10, leaving the material properties, such as the Young's modulus, to dominate the deformation. The amount of bonding agent 14 was considered to be negligible because excess agent was squeezed away by pushing two voxels 12, 12', 12" together. Moreover, there was no observable difference between a face bonded and a bulk-casted beam.

Figure 16A:
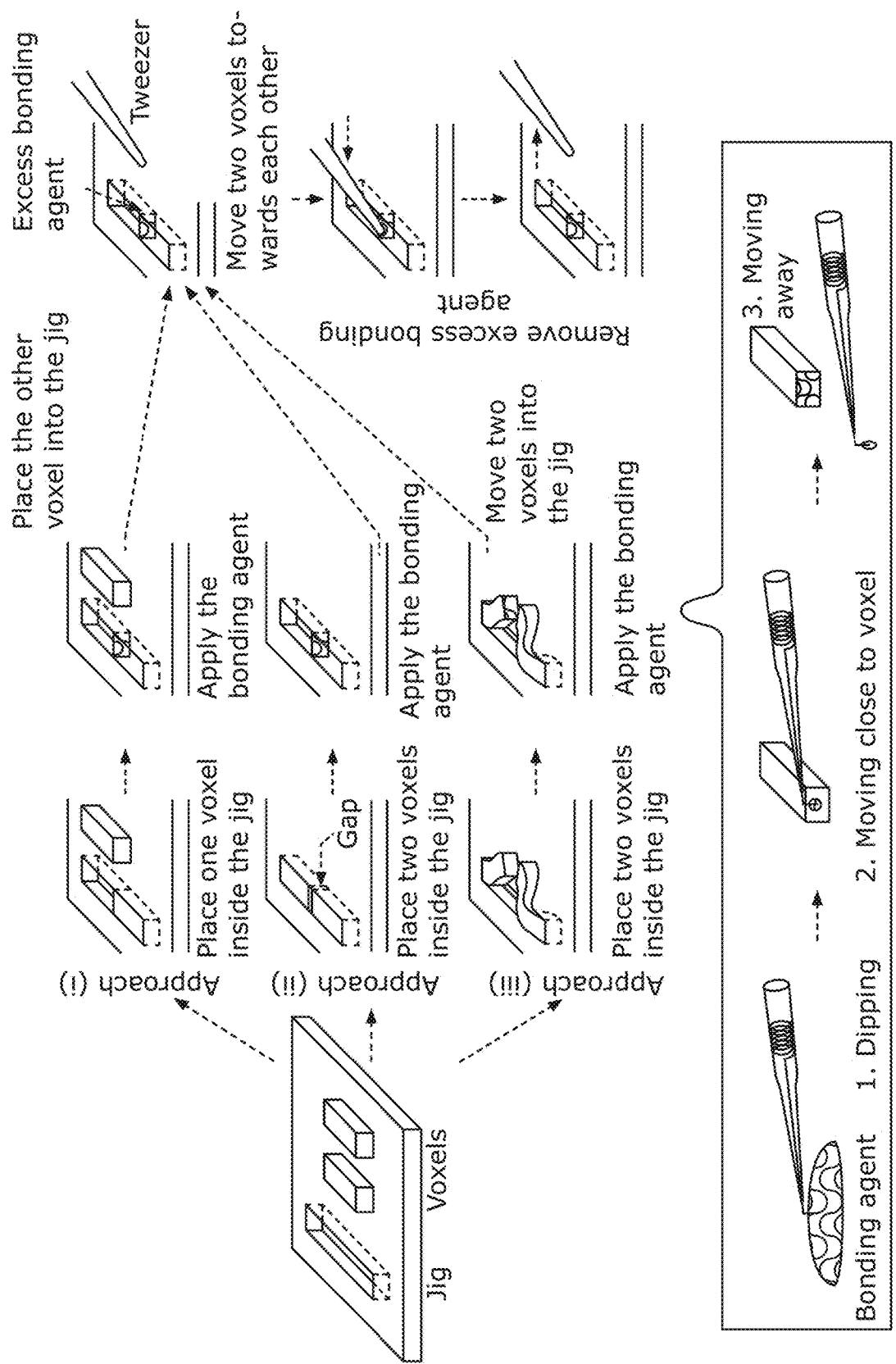

FIG. 16a illustrates the implementation process. There are three approaches:

(i) One voxel 12, 12', 12" was placed in the jig 100, 108, 110, 112 while the other one 12, 12', 12" was placed in the vicinity but outside the jig 100, 108, 110, 112.

(ii) The other voxel 12, 12', 12" could also be placed in the jig 100, 108, 110, 112 with a distance being left between the two voxels 12, 12', 12".

(iii) The two voxels 12, 12', 12" could be placed in the jig 100, 108, 110, 112 with their contacting ends being left outside the jig 100, 108, 110, 112, especially for soft voxels 12, 12', 12". A 0.03 mm-diameter copper wire was nested within a Seque/Pro capillary tip (Bio-Rad Laboratories) as a tool to dip into the bonding agent 14 and take some at its tip. The wire was moved close to the surface of a voxel 12, 12', 12" until the liquid bonding agent 14 touched the surface 18. Then the wire was moved away. The small amount of bonding agent 14 at the voxel surface 18 spread across the entire face area automatically. Next, the second voxel 12, 12', 12" was (i) placed in the jig 100, 108, 110, 112 or (ii) moved in the jig 100, 108, 110, 112 towards the first voxel 12, 12', 12". In the third case, (iii) the parts of the two voxels 12, 12', 12" outside the jig 100, 108, 110, 112 were pushed into the jig 100, 108, 110, 112. The two voxels 12, 12', 12" were in close contact with each other and excess of the applied bonding agent 14 would be squeezed out. A tweezer or a needle was used to remove the extra bonding agent 14 that had been squeezed out of the jig 100, 108, 110, 112. Face bonding is symmetric, meaning that it does not have a direction preference in bending.

Figure 16B:
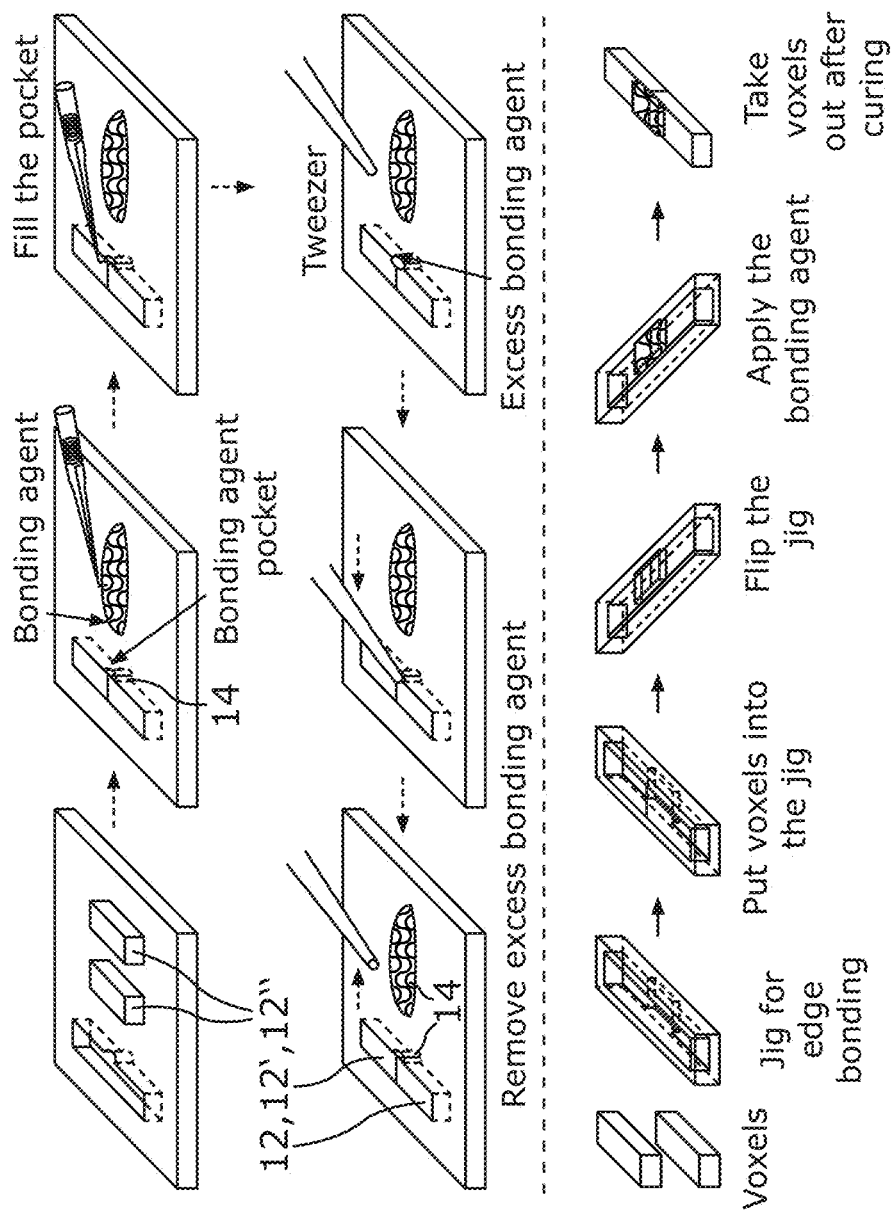

Edge bonding joined two neighboring voxels 12, 12', 12" by forming an explicit joint and creating an asymmetric connection. To form an edge bonding, the bonding agent 14 was applied at one side of the contacting faces 18 of two voxels 12, 12', 12". Specifically, two voxels 12, 12', 12" could be placed in a jig 100, 108, 110, 112 that has an extra space on the side or the bottom (FIG. 16b). Similar with the mold-casting technique, the bonding agent 14 was casted into this pocket and excess bonding agent 14 was removed by a tweezer or a needle. The amount of bonding agent 14 in edge bonding was controlled by the shape of the assistant jig 100, 108, 110, 112.

With no bonding agent 14 between their contacting faces 18, the two voxels 12, 12', 12" could easily disengage from each other during deformation. As a typical example shown in FIG. 1b, the bonding agent 14 applied at the top edge fixed the voxels 12, 12', 12" at the top side, breaking the bending symmetry by making it much easier for the joint to open from the bottom side. With this design, the voxels 12, 12', 12" disengaged and the joint opened when $\vec{B}_c$ pointed up. Such an open joint (the middle case in FIG. 1b "Edge bonding") allowed a large deformation to be achieved using a relatively small torque. When $\vec{B}_c$ was reversed, the voxels 12, 12', 12" compressed into each other and the joint remained closed. Such a closed joint (the third case in FIG. 1b "Edge bonding") forced the whole soft body to bend and therefore made the bending much more difficult, resulting in smaller deformations under the same torque magnitude.

Edge bonding is specifically designed to create large deformation under weak magnetic actuation and to break the deformation symmetry. It is not designed to bear much load along its preferred deformation direction. Nevertheless, its loadbearing capacity is not affected along the opposite direction. Conventionally, a large deformation needs a strong actuating magnetic field or soft body material. This asymmetric edge bonding approach enables large deformation at relatively weak actuating magnetic field, giving more freedom for designing shape-morphing devices.

After voxels 12, 12', 12" were assembled together, the whole device 10 was stored at a designated temperature for the curing of the bonding agents 14. These temperatures were determined by the curing requirements provided by the corresponding manufacturers of the selected bonding agents 14. Non-magnetic hot plates and ovens were used to provide an environment at a certain temperature for this step.

After the fabrication, the prototype machines 10 were placed inside their designated test setups, such as inside a circular tube for the anchoring device (FIG. 11), and observed with an optical microscope. Handhold permanent magnets (Neodymium, nickel-plated, Supermagnete) were used to produce a magnetic field in arbitrary 3D directions within the workspace. The observed sample deformation and motion were captured with a video camera (Point Grey Research Inc.) and a high-speed camera (Phantom Cinemag II v641). Each sample was tested multiple times without any observable signs of performance deterioration.

Human adipose-derived mesenchymal stem cells 120 (haMSCs, ATCC) were cultured in a humidified, 37° C., 5% $CO_2$ environment using 75 cm2 polystyrene cell culture flasks containing MSC basal medium (ATCC) supplemented with mesenchymal stem cell growth kit for low serum (ATCC), 2% fetal bovine serum (FBS, Gibco), penicillin (25 UI mL−1) and streptomycin (25 μg mL−1). Cell were split before they reached to 80% confluence by 0.25% Tyrpin-EDTA (Gibco) solution.

To capture the stem cells 120, micro-cages 122 3D-printed by TPP were heterogeneously integrated to an anchoring machine (FIG. 17a), which is one half of the six-ring anchoring machine 10. The cage 122 was made of biocompatible commercial IP-Visio photoresin (Nanoscribe GmbH) that is specially designed for cell culture and tissue engineering. The cage 122 was designed with a tenon so that it could fit into the corresponding mortise on the anchoring machine 10. During the assembly, a small amount of uncured silicone elastomer (Ecoflex 0010) was first applied into the mortise of the voxel 12, 12', 12" before the cage 122 was inserted. Before seeding the cells, the whole device was put into 1× phosphate-buffered saline (PBS) solution and sterilized under UV for 1 h. After the sterilization, the whole device was incubated in 25 μg·mL−1 fibronectin solution in 1×PBS for 2 h at 37° C. to increase the cell adhesion to the micro cages 122. Following the fibronectin treatment, the whole device 10 was washed with PBS and the cells 120 in suspension were seeded from the top (in 50 μL volume) with a density of 1.5×106 cells 120 per mL. The device 10 with the entrapped cells 120 was then transferred to humidified, 37° C., 5% $CO_2$ environment.

To investigate the viability of cells after 24 h of cell entrapment, LIVE/DEAD® viability/cytotoxicity kit was used to stain live and dead cells based on the manufacturer's fluorescence microscopy protocol. Briefly, vial of live green was thawed and mixed with the dead red component to create 2× working solution, which was then added to the well containing the anchoring device 10 with an equal volume of growth medium. Device 10 and cells 120 were incubated with the solution for 30 min at room temperature before imaging. A spinning-disk confocal microscope (Nikon Instruments Inc., Eclipse Ti-E) was used to image the live and dead cells 120.

Cell adhesion and retention in the micro-cages 122 could be further controlled by creating an artificial cell niche within the cages in the future. Decorating the inner surface of the micro-cages 122 with natural extracellular matrix derived cell-adhesive peptides and proteins can enable regulating the cell fate and behavior. Also, recapitulating the physical properties of native stem cell environments by tuning the mechanical properties of the cages can support the stability and retention of the cells 120 during the device 10 transport.

2. Resolution and Capability of Creating Arbitrary 3D Magnetization Profiles

The proposed fabrication approach is able to create machines 10 with 3D-to-3D shape-morphing capability at a higher resolution compared with previous methods. To characterize the resolution of the proposed fabrication method, a checkerboard was assembled by four 35 μm side-length cubic voxels 12, 12', 12" (FIG. 2a), which is less than half of the resolution produced by the current 3D printing methods of magnetic soft machines. The fabrication resolution is defined to be the 3D size of the smallest voxel 12, 12', 12" that could be assembled precisely and repeatedly.

This definition is based on the fact that the proposed method is able to vary the material as well as the magnetic properties of the resultant machine down to an individual voxel in 3D.

At such a high fabrication resolution, each voxel can have a local magnetic moment $\vec{m}_v$, which can point to an arbitrary 3D direction (FIG. 2b). Besides assuming a uniform (constant) magnetization, $\vec{m}_v$ on relatively large voxels 12, 12', 12" could also be programmed to be spatially varying by assuming a certain deformation in the magnetizing process. Also, $|\vec{m}_v|$ can have any value from zero to the maximum value capped by the magnetic properties of the MMPs. The exact value of $|\vec{m}_v|$ could be tuned by the MMP concentration in a given voxel 12, 12', 12" and the magnitude of the field $|\vec{B}_m|$ used to magnetize the voxel 12, 12', 12". The measured magnetization values of the voxels 12, 12', 12" with different mass ratios of MMPs (0.0%, 33.3%, 50.0%, and 66.7%) are shown in FIG. 2c, together with a comparison with corresponding theoretical values. The results show that $|\vec{m}_v|$ could be tailored by varying the MMPs' concentration as well as the strength of the magnetizing magnetic field $\vec{B}_m$.

What is claimed is:

1. A method of fabricating a magnetic deformable machine comprising a plurality of heterogeneous voxels of different characteristics, properties and compositions, the method comprising the following sequence of steps:

defining deformation characteristics of the magnetic machine;

producing a blueprint of the magnetic machine with reference to the deformation characteristics of the magnetic machine and with reference to how the individual voxels are assembled relative to one another and bonded to one another;

providing the plurality of individual voxels according to said blueprint, of which at least some are magnetic and with at least some voxels of the plurality of voxels having a Young's modulus of less than 500 MPa;

bonding the plurality of voxels one to another using a bonding agent in accordance with the produced blueprint to assemble the magnetic machine; and curing the bonding agent, wherein the step of bonding the plurality of voxels one to another comprises bonding one voxel to another voxel in subsequent steps for attaching individual voxels to one another in subsequent steps.

2. The method in accordance with claim 1,
wherein the step of defining deformation characteristics of the magnetic machine comprises at least one of the steps selected from the group of members consisting of:
defining an application of the magnetic machine;
defining a working environment of the application respectively of the magnetic machine;
defining deformation parameters of the magnetic machine;
selecting a size of the magnetic machine;
selecting a shape of the magnetic machine;
and combinations of the foregoing.

3. The method in accordance with claim 1,
wherein the blueprint comprises a number of the respective plurality of voxels used to form the magnetic machine, an arrangement of the respective voxels used to form the magnetic machine, properties of the respective voxels used to form the magnetic machine, and an arrangement of the curing agent at the plurality of voxels used to form the magnetic machine, respectively wherein the blueprint comprises a number of the respective plurality of voxels used to form the magnetic machine, an arrangement of the respective voxels used to form the magnetic machine, properties of the respective voxels used to form the magnetic machine, and an arrangement of the curing agent at the plurality of voxels used to form the magnetic machine and wherein the properties are chosen from the group consisting of Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, and stimulus response biocompatibility, biological or other degradability or solubility, visibility in a specific imaging technique, immune response property, protein absorption property, enzyme response property and temporary or permanent adhesion to other voxels, biological tissues or other surfaces.

4. The method in accordance with claim 3,
wherein the stimulus response is a response to one of pH, chemicals, temperature, humidity, flow, pressure and glucose; and/or
wherein the specific imaging technique is one of fluorescence imaging, near-infrared imaging, magnetic resonance imaging, positron emission tomography, ultrasound imaging, photoacoustic imaging, fluoroscopy and computed tomography.

5. The method in accordance with claim 1,
wherein the step of producing the blueprint of the magnetic machine comprises at least one of the steps selected from the group of members consisting of:
selecting materials of different voxels to define a stiffness property of the magnetic machine;
selecting one or more materials for the respective voxels of the magnetic machine;
selecting uniform or non-uniform 3D magnetization profiles of magnetic voxels to define magnetic torque- or force-based deformation properties of the magnetic machine;
selecting a size of the respective voxel;
selecting a shape of the respective voxel;
selecting a magnetic property of the respective voxel;
selecting a material property of the respective voxel;
simulating a behaviour and/or deformation of the magnetic machine on the basis of the blueprint;
magnetizing one or more of the respective voxels;
adapting the blueprint of the magnetic machine in dependence on results of a simulation of a behaviour and/or deformation of the magnetic machine;
and combinations of the foregoing.

6. The method in accordance with claim 1,
wherein each voxel has a 3D shape and is of predefined shape, size, has predefined magnetic properties and predefined material properties, and/or
wherein the respective voxel is magnetized prior to being bonded to its neighbouring voxel, while being bonded to its neighbouring voxel, or after having been bonded to its neighbouring voxel.

7. The method in accordance with claim 6,
wherein the predefined material properties are chosen from the group consisting of Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, stimulus response, biocompatibility, biological or other degradability or solubility, visibility in a specific imaging technique, immune response property, protein absorption property, enzyme response property and temporary or permanent adhesion to other voxels, biological tissues or other surfaces.

8. The method in accordance with claim 7,
wherein the stimulus response is a response to one of pH, chemicals, temperature, humidity, flow, pressure, glucose; and/or
wherein the specific imaging technique is one of fluorescence imaging, near-infrared imaging, magnetic resonance imaging, positron emission tomography, ultrasound imaging, photoacoustic imaging, fluoroscopy and computed tomography.

9. The method in accordance with claim 1,
wherein magnetization profiles of the magnetic voxels of the magnetic machine are visible by a magnetic sensing or imaging technique, respectively wherein magnetization profiles of the magnetic voxels of the magnetic machine are visible by a magnetic sensing or imaging technique and wherein the magnetic sensing or imaging technique is magneto-optical sensing using the Kerr and/or Faraday effect, magnetic force microscopy and/or magnetic x-ray microscopy.

10. The method in accordance with claim 1,
wherein the step of bonding the plurality of voxels one to another takes place at one or more faces and/or one or more edges of the voxels.

11. The method in accordance with claim 1,
wherein the step of bonding the plurality of voxels one to another comprises bonding one group of voxels group wise to another.

12. The method in accordance with claim 1,
wherein the step of bonding the plurality of voxels one to another comprises the step of providing a jig having a negative shape of at least a part of the magnetic deformable machine and placing a pre-defined amount of the plurality of voxels into said jig and then bonding the pre-defined amount of the plurality of voxels in said jig.

13. The method in accordance with claim 12,
wherein one or more of the pre-defined amount of the plurality of voxels are placed into the jig at one point in time by means of a robot; and/or
wherein one or more of the pre-defined amount of the plurality of voxels is magnetized prior to being placed into said jig, or after having been placed into said jig and having been bonded to its neighbouring voxels.

14. The method in accordance with claim 1,
wherein the step of curing the bonding agent takes place at room or another specific temperature and within the environment in which the step of bonding takes place,
wherein the step of curing the bonding agent takes place by ultraviolet or another wavelength light source, or
wherein the step of curing the bonding agent takes place within an oven, or at a hot plate.

15. The method in accordance with claim 1,
wherein a respective side length of the magnetic machine has a size of less than 10000 mm, respectively wherein the respective side length of the magnetic machine has a size of less than 100 mm.

16. The method in accordance with claim 1,
wherein each voxel has a 3D shape with a size of a respective side length of the 3D shape being selected in the range of 2500 mm to 5 nm, respectively wherein each voxel has a 3D shape with a size of a respective side length of the 3D shape being selected in the range of 25 mm to 1 µm.

17. The method in accordance with claim 1,
wherein each voxel has a shape selected from the group of members consisting of square voxels, rectangular voxels, round voxels, polygonal voxels, triangular voxels, and any arbitrary 3D-shaped voxels and combinations of the foregoing.

18. A deformable 3D magnetic machine, the magnetic machine having a size of less than 10000 mm, the magnetic machine comprising a plurality of voxels of which at least some are magnetic, with at least some of the voxels having a Young's modulus of less than 500 MPa, the plurality of voxels being bonded one to another with a bonding agent, wherein each voxel is of predefined shape, size, has predefined magnetic properties and predefined material properties.

19. The deformable 3D magnetic machine in accordance with claim 18,
wherein the predefined magnetic and/or material properties are at least one of Young's modulus, magnetization profile, stiffness, mechanical strength, durability, deformation, maximum strain or stress, drug or other molecule loading capability, remote heating property, porosity, gas, liquid or molecule permeability, electrical or heat conductivity, thermal expansion, liquid swelling property, stimulus response, biocompatibility, biological or other degradability or solubility, visibility in a specific imaging technique, immune response property, protein absorption property, enzyme response property and temporary or permanent adhesion to other voxels, biological tissues or other surfaces.

20. The deformable 3D magnetic machine in accordance with claim 19,
wherein the stimulus response is a response to pH, chemicals, temperature, humidity, flow, pressure and/or glucose; and/or
wherein the visibility in a specific imaging technique is chosen from the group consisting of fluorescence imaging, near-infrared imaging, magnetic resonance imaging, positron emission tomography, ultrasound imaging, photoacoustic imaging, fluoroscopy and computed tomography.

21. The deformable 3D magnetic machine in accordance with claim 18,
wherein a respective side length of the magnetic machine has a size of less than 100 mm; and/or
wherein each voxel has a 3D shape with a size of a respective side length of the 3D shape being selected in the range of 2500 mm to 5 nm; and/or
wherein each voxel can have a shape selected from the group of members consisting of square voxels, rectangular voxels, round voxels, polygonal voxels, triangular voxels, arbitrary 3D-shaped voxels and combinations of the foregoing.

22. The deformable 3D magnetic machine in accordance with claim 18,
wherein the magnetic machine is a cargo delivery device which can transport the cargo and release it by deforming or opening the magnetic machine at a target site; or
wherein the magnetic machine is one of an anchoring device, a stent, a soft peristaltic or other type of liquid pump, a soft cubic frame, an information encryption device, a deformable metamaterial, a shape-adaptable or shape-programmable robot, a gripper, a foldable device, a clogging device, a swimming robot, an organ model, a synthetic heart or other organ, and a shrinkable ring flower, respectively wherein wherein the magnetic machine is a cargo delivery device which can transport the cargo and release it by deforming or opening the magnetic machine at a target site and wherein the cargo is a drug, stem cell, gene, imaging agent, T-cell and/or macrophage.

23. The deformable 3D magnetic machine in accordance with claim 18,
wherein a non-magnetic material of at least some of the non-magnetic voxels of the magnetic machine is respectively selected from the group of materials consisting of elastomers, thermoplastic elastomers, rubbers, duroplastics, thermoplastics; biodegradable synthetic material; biomaterial; liquid crystal polymer, elastomer or gel; shape memory polymer; photoresist polymer; biological protein; fabric material; non-magnetic metal; silicon; silica; glass; wood; carbon fibre; and derivates and combinations of the foregoing; and/or wherein a magnetic material of at least some of the magnetic voxels is selected from the group of members consisting of magnetic materials present in bulk, particle form, disc form, wire form, fiber form or in the form of Janus particles, combinations or composites of the foregoing; and/or voxels coated with magnetic films or layers made of above magnetic materials or their combinations; and/or wherein a magnetic composite material where aforementioned magnetic voxel materials are uniformly or non-uniformly embedded inside or covered or deposited on aforementioned non-magnetic voxel materials; and/or combinations of the foregoing; and/or wherein a material of the bonding agent is selected from the group of members consisting of uncured silicone rubber, PDMS, polyurethane, modified copolyester, silicone rubber and other uncured polymer of the aforementioned materials, temperature curable polymers, UV or another wavelength light curable polymers, chemically curable polymers, wax, adhesive tape, super glue, surgical glue, various kind of biological polymers, and combinations of the foregoing.

24. The deformable 3D magnetic machine in accordance with claim 18, wherein the magnetic voxels have any arbitrary 3D magnetization profile, where each voxel has an average surface magnetic field strength selected in the range of 0 to 1 T with each voxel having a predefined orientation of the magnetic field strength.

25. The deformable 3D magnetic machine in accordance with claim 24, wherein for non-uniform magnetic voxels, each voxel has a non-uniform magnetization distribution throughout the voxel with varying magnetic orientations throughout the voxel; and/or wherein the magnetic field strength selected in the range of 0 to 50 mT.

26. The deformable 3D magnetic machine in accordance with claim 24, wherein the predefined orientation of the magnetic field strength is chosen in parallel to a face of the respective voxel or perpendicular to a face of a respective voxel, or inclined with respect to one or more faces of the respective voxel.

* * * * *